US012633076B2

(12) United States Patent
King et al.

(10) Patent No.: US 12,633,076 B2
(45) Date of Patent: May 19, 2026

(54) PROFILER TOOL FOR ASSESSING IMPACT OF SHAPE ON A CONTINUOUS AND/OR CATEGORICAL RESPONSE

(71) Applicant: JMP Statistical Discovery LLC, Cary, NC (US)

(72) Inventors: Caleb Bridges King, Roanoke, VA (US); Shiraz Sky Alibhai, Durham, NC (US)

(73) Assignee: JMP STATISTICAL DISCOVERY LLC, Cary, NC (US)

( * ) Notice: Subject to any disclaimer, the term of this patent is extended or adjusted under 35 U.S.C. 154(b) by 121 days.

(21) Appl. No.: 19/098,005

(22) Filed: Apr. 2, 2025

(65) Prior Publication Data

US 2025/0316041 A1 Oct. 9, 2025

Related U.S. Application Data

(60) Provisional application No. 63/725,330, filed on Nov. 26, 2024, provisional application No. 63/574,691, filed on Apr. 4, 2024.

(51) Int. Cl.
*G06T 19/20* (2011.01)
*G06F 3/04845* (2022.01)
(Continued)

(52) U.S. Cl.
CPC .............. *G06T 19/20* (2013.01); *G06T 7/543* (2017.01); *G06T 7/74* (2017.01); *G06V 10/764* (2022.01);
(Continued)

(58) Field of Classification Search
CPC ........... G06T 19/20; G06T 19/00; G06T 7/74; G06T 7/73; G06T 7/70; G06T 7/543;
(Continued)

(56) References Cited

U.S. PATENT DOCUMENTS 11,194,940 B2    12/2021    Morgan et al.
11,561,690 B2    1/2023    Lekivetz et al.
(Continued)

OTHER PUBLICATIONS

Hollingsworth, S., et al. "Molecular dynamics simulation for all", Sep. 19, 2018, pp. 1-49, Author Manuscript.
(Continued)

*Primary Examiner* — Hwei-Min Lu
(74) *Attorney, Agent, or Firm* — COATS & BENNETT, PLLC

(57) ABSTRACT

A computing device displays, in a graphical user interface, a graphical representation of position information. The position information defines a first representation of a shape of at least two dimensions. The device obtains a computer model that predicts an initial response according to the first representation input to the computer model. The device receives, via the graphical user interface, a manipulation of the graphical representation that changes the position information to define a second representation of the shape of the at least two dimensions. The device generates an updated response according to the second representation input to the computer model.

28 Claims, 36 Drawing Sheets
(9 of 36 Drawing Sheet(s) Filed in Color)

(51) Int. Cl.

| | | |
|---|---|---|
| *G06T 7/543* | (2017.01) | |
| *G06T 7/73* | (2017.01) | |
| *G06V 10/764* | (2022.01) | |
| *G06V 10/77* | (2022.01) | |

(52) U.S. Cl.
CPC ...... *G06V 10/7715* (2022.01); *G06F 3/04845* (2013.01); *G06T 2200/24* (2013.01); *G06T 2207/20081* (2013.01); *G06T 2207/20084* (2013.01); *G06T 2219/2016* (2013.01); *G06T 2219/2021* (2013.01)

(58) Field of Classification Search
CPC .................. G06T 7/50; G06T 2200/24; G06T 2207/20084; G06T 2207/20081; G06T 2219/2021; G06T 2219/2016; G06T 2219/20; G06T 2219/00; G06V 10/7715; G06V 10/764; G06V 10/77; G06V 10/70; G06F 3/04845
USPC .................................................. 715/767, 764
See application file for complete search history.

(56) References Cited

U.S. PATENT DOCUMENTS

| | | | |
|---|---|---|---|
| 11,586,675 | B1 | 2/2023 | Sall |
| 11,854,127 | B2 | 12/2023 | King et al. |
| 2002/0031246 | A1* | 3/2002 | Kawano .................. G06T 7/194 |
| | | | 382/132 |
| 2003/0030637 | A1* | 2/2003 | Grinstein ............... G16B 40/20 |
| | | | 707/E17.058 |
| 2004/0252879 | A1* | 12/2004 | Tiemeyer ............... G06V 10/70 |
| | | | 356/237.4 |
| 2009/0080747 | A1* | 3/2009 | Lu .............................. G06T 7/12 |
| | | | 382/131 |
| 2014/0229881 | A1* | 8/2014 | Schadewaldt ........... G06T 19/00 |
| | | | 715/771 |
| 2014/0358825 | A1* | 12/2014 | Phillipps ................ G06N 20/20 |
| | | | 706/11 |
| 2018/0089763 | A1* | 3/2018 | Okazaki .................. G06N 3/045 |
| 2019/0035149 | A1* | 1/2019 | Chen .................... G06V 40/166 |
| 2019/0155973 | A1* | 5/2019 | Morczinek ............. G06V 20/13 |
| 2020/0315589 | A1* | 10/2020 | Stavros ................ A61B 8/5223 |
| 2021/0073449 | A1* | 3/2021 | Segev ..................... G06F 30/27 |
| 2021/0093281 | A1* | 4/2021 | Madabhushi .......... G16H 50/20 |
| 2021/0366618 | A1* | 11/2021 | Schoedl ................. G16H 50/20 |
| 2022/0284609 | A1* | 9/2022 | Shree ......................... G06T 7/33 |
| 2023/0274051 | A1 | 8/2023 | King et al. |
| 2023/0281347 | A1 | 9/2023 | Jones et al. |

OTHER PUBLICATIONS

Unknown, "ShapeWorks", Mar. 2024, Retrieved on 2025-03-38, pp. 1-483, retrieved from Internet: https://sciinstitute.github.io/ShapeWorks/latest/index.html, ShapeWorks.

* cited by examiner

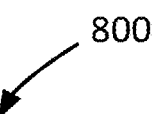

800

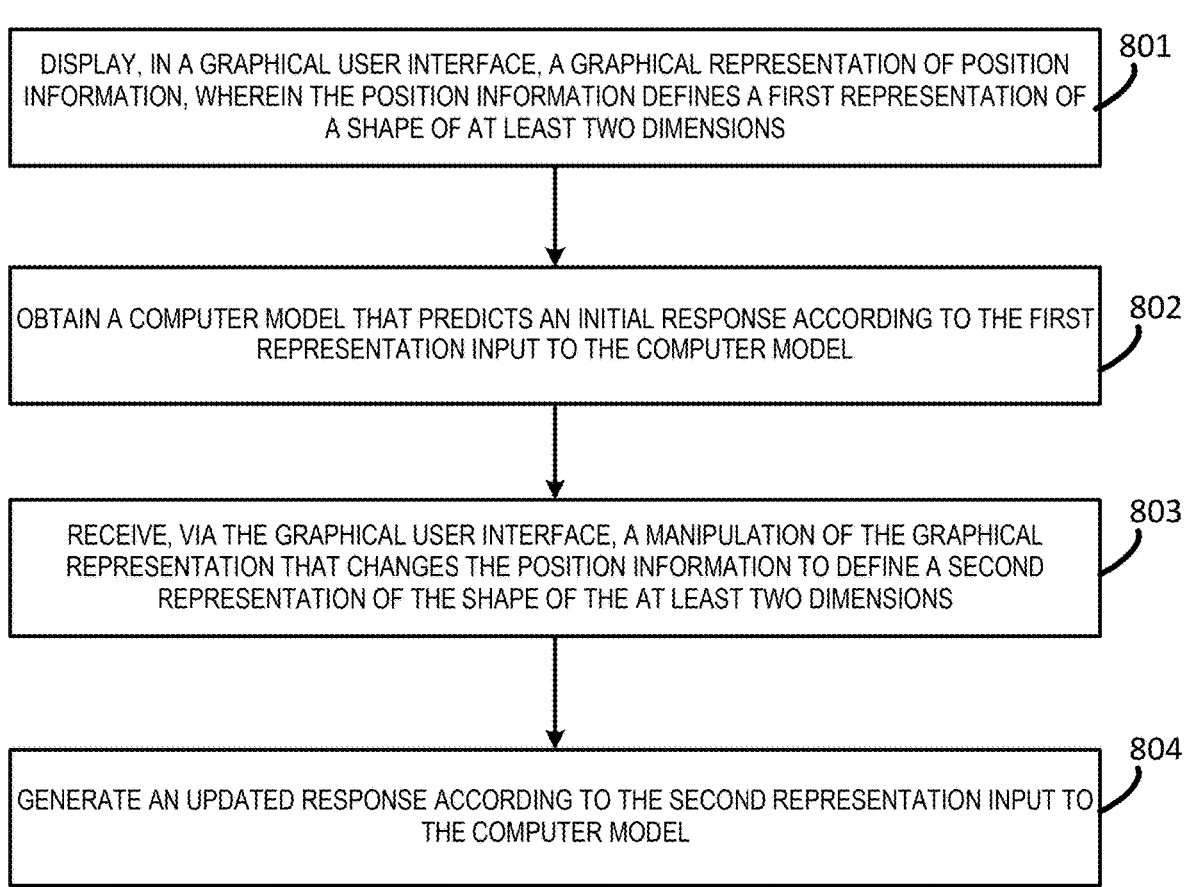

DISPLAY, IN A GRAPHICAL USER INTERFACE, A GRAPHICAL REPRESENTATION OF POSITION INFORMATION, WHEREIN THE POSITION INFORMATION DEFINES A FIRST REPRESENTATION OF A SHAPE OF AT LEAST TWO DIMENSIONS

801

OBTAIN A COMPUTER MODEL THAT PREDICTS AN INITIAL RESPONSE ACCORDING TO THE FIRST REPRESENTATION INPUT TO THE COMPUTER MODEL

802

RECEIVE, VIA THE GRAPHICAL USER INTERFACE, A MANIPULATION OF THE GRAPHICAL REPRESENTATION THAT CHANGES THE POSITION INFORMATION TO DEFINE A SECOND REPRESENTATION OF THE SHAPE OF THE AT LEAST TWO DIMENSIONS

803

GENERATE AN UPDATED RESPONSE ACCORDING TO THE SECOND REPRESENTATION INPUT TO THE COMPUTER MODEL

| Shape ID | Aligned[X] 1 | Aligned[X] 2 | Aligned[X] 23 | Aligned[Y] 1 | Aligned[Y] 2 | Aligned[Y] 23 |
|---|---|---|---|---|---|---|
| 1 | -0.183976869 | -0.226770875 | -0.18250754 | -0.041041391 | 0.020746073 | -0.212573934 |
| 2 | -0.197085587 | -0.230940535 | -0.2091474 | -0.05108816 | 0.019489241 | -0.180548819 |
| 3 | -0.190759278 | -0.232518953 | -0.212206165 | -0.048987718 | 0.021592621 | -0.219878791 |
| 4 | -0.189503247 | -0.224407533 | -0.21259814 | -0.043529195 | 0.024677164 | -0.200497615 |
| 9 | -0.186096918 | -0.250693493 | -0.19587706 | -0.047008523 | 0.031478195 | -0.179959175 |
| 10 | -0.206581605 | -0.250606704 | -0.15523264 | -0.061329445 | 0.015800656 | -0.161872615 |
| 11 | -0.197229019 | -0.239294307 | -0.17922737 | -0.045679241 | 0.032075052 | -0.195173033 |
| 12 | -0.196537462 | -0.233050899 | -0.17602151 | -0.03662676 | 0.029629346 | -0.216925515 |
| 13 | -0.188637614 | -0.233109966 | -0.18765424 | -0.043426331 | 0.014048497 | -0.197791812 |
| 287 | -0.196008258 | -0.249341677 | -0.16467106 | -0.041390276 | 0.014612638 | -0.165859388 |
| 288 | -0.20204889 | -0.258072094 | -0.17768488 | -0.042640392 | 0.009274972 | -0.181600684 |
| 289 | -0.197217086 | -0.243549727 | -0.18646235 | -0.062798479 | 0.004970138 | -0.179681639 |
| 290 | -0.20127956 | -0.244801344 | -0.16999047 | -0.0602259 | -0.000205832 | -0.171260009 |
| 291 | -0.176277983 | -0.226593831 | -0.17876317 | -0.04364683 | 0.013897182 | -0.183456411 |
| 292 | -0.215585853 | -0.237085935 | -0.17739563 | -0.049354967 | 0.008053121 | -0.1835817 |
| 293 | -0.207668095 | -0.252438564 | -0.18206924 | -0.057774452 | 0.002964363 | -0.187255619 |
| 302 | -0.193707907 | -0.244638374 | -0.17863563 | -0.060605458 | 0.012485552 | -0.198396403 |

| Individual ID | Puma Jaguar | Shape ID | H1_1 | H1_27 | Probability (=Jaguar) | Probability (=Puma) | Most Likely Puma Jaguar | Validation Fold2 | Canon[1] |
|---|---|---|---|---|---|---|---|---|---|
| Seymour-Chessie | Jaguar | 1 | -0.873 | 1 | 0.99209321 | 0.00790679 | Jaguar | 0 | 0.53151161 |
| Seymour-Chessie | Jaguar | 2 | -0.998 | 1 | 0.99976671 | 0.00023329 | Jaguar | 0 | 2.211800386 |
| Seymour-Chessie | Jaguar | 3 | -0.996 | 1 | 0.99838999 | 0.00161001 | Jaguar | 1 | 1.169165652 |
| F Cabocla | Jaguar | 9 | -0.772 | 1 | 0.99899451 | 0.00100549 | Jaguar | 0 | 0.93769488 |
| F Cabocla | Jaguar | 10 | 0.6459 | -0.8907 | 0.99607462 | 0.00392539 | Jaguar | 0 | 1.38386533 |
| F Cabocla | Jaguar | 11 | -0.881 | 0.9998 | 0.97708127 | 0.02291873 | Jaguar | 0 | 0.3913319122 |
| F Cabocla | Jaguar | 12 | -0.891 | 0.9988 | 0.9668281 | 0.0331719 | Jaguar | 0 | -0.386947885 |
| F Cabocla | Jaguar | 13 | -0.826 | 0.9996 | 0.99642541 | 0.00357459 | Jaguar | 0 | 0.877559964 |
| Female Squeezy | Puma | 287 | -0.247 | -1 | 0.00167729 | 0.99832271 | Puma | 0 | -3.165679814 |
| Female Squeezy | Puma | 288 | -0.308 | -1 | 0.0005826 | 0.9994174 | Puma | 0 | -1.880988918 |
| Female Squeezy | Puma | 289 | 0.8814 | -1 | 0.04767157 | 0.95232843 | Puma | 0 | -0.953744503 |
| Female Squeezy | Puma | 290 | 0.0944 | -0.9999 | 0.00901356 | 0.99098644 | Puma | 0 | -1.533055778 |
| Female Squeezy | Puma | 291 | 0.9308 | -0.9985 | 0.02584041 | 0.97415959 | Puma | 0 | -0.792324635 |
| Female Squeezy | Puma | 292 | 0.7454 | -0.9996 | 0.17040358 | 0.82959642 | Puma | 0 | -1.431435986 |
| Female Squeezy | Puma | 293 | 0.744 | -0.9703 | 0.07686215 | 0.92313785 | Puma | 0 | -0.133393502 |
| Male Oldex | Puma | 302 | 0.4422 | -1 | 0.00220261 | 0.99779739 | Puma | 0 | -1.644403841 |
| Male Oldex | Puma | 303 | -0.205 | -0.9995 | 0.02526955 | 0.97473045 | Puma | 0 | -0.979113807 |

1041 1042 1043 1044 1045 1046 1047 1048 1049

1040

Figure 17A:
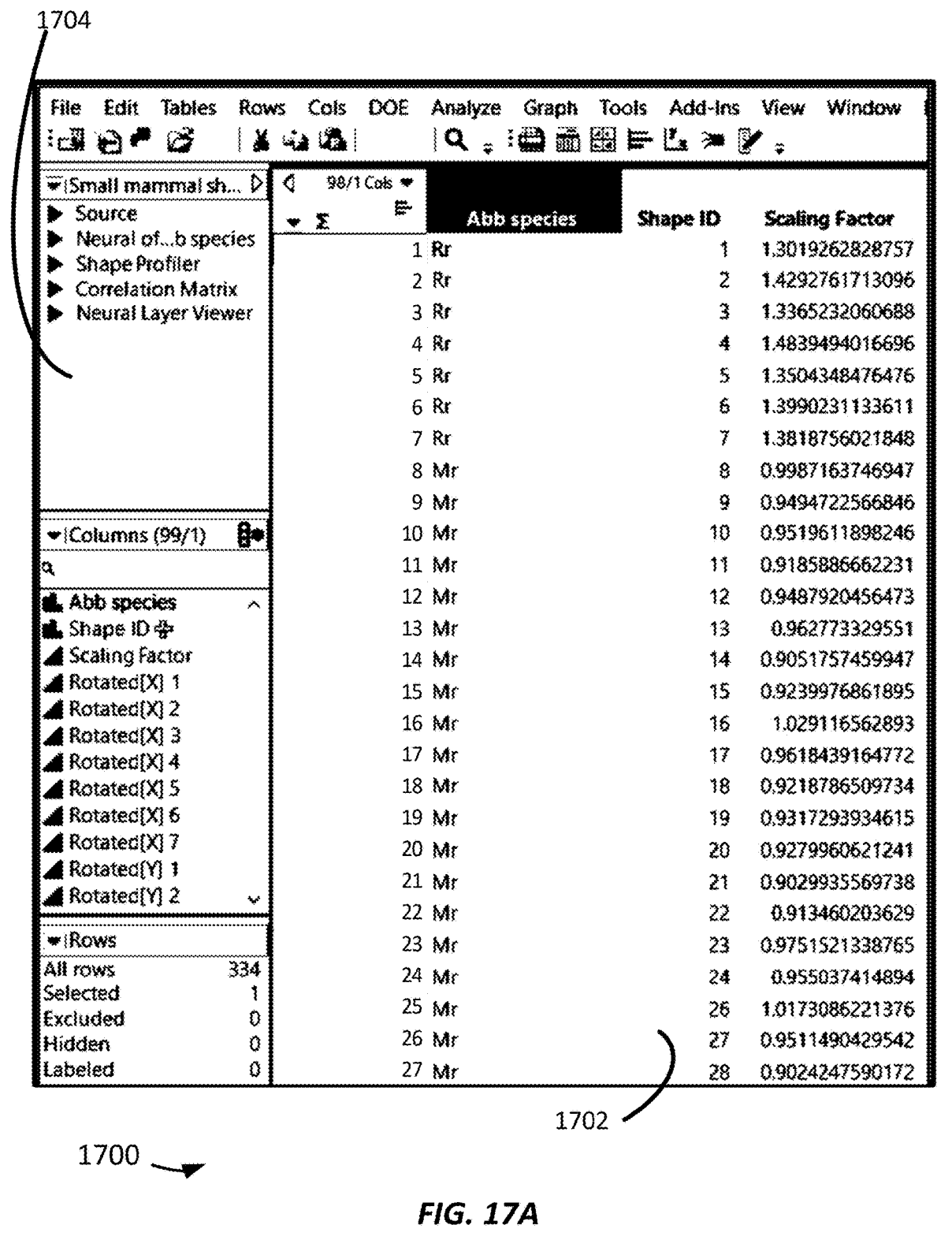

| File | Edit | Tables | Rows | Cols | DOE | Analyze | Graph | Tools | Add-Ins | View | Window |
|------|------|--------|------|------|-----|---------|-------|-------|---------|------|--------|

▼ Small mammal sh... ▷

▶ Source
▶ Neural of...b species
▶ Shape Profiler
▶ Correlation Matrix
▶ Neural Layer Viewer ▼ Columns (99/1)

🔍

🔺 Abb species
🔺 Shape ID ⊕
◢ Scaling Factor
◢ Rotated[X] 1
◢ Rotated[X] 2
◢ Rotated[X] 3
◢ Rotated[X] 4
◢ Rotated[X] 5
◢ Rotated[X] 6
◢ Rotated[X] 7
◢ Rotated[Y] 1
◢ Rotated[Y] 2

▼ Rows

| All rows | 334 |
|----------|-----|
| Selected | 1 |
| Excluded | 0 |
| Hidden | 0 |
| Labeled | 0 |

◁   98/1 Cols ▼

| | Abb species | Shape ID | Scaling Factor |
|---|---|---|---|
| 1 | Rr | 1 | 1.3019262828757 |
| 2 | Rr | 2 | 1.4292761713096 |
| 3 | Rr | 3 | 1.3365232060688 |
| 4 | Rr | 4 | 1.4839494016696 |
| 5 | Rr | 5 | 1.3504348476476 |
| 6 | Rr | 6 | 1.3990231133611 |
| 7 | Rr | 7 | 1.3818756021848 |
| 8 | Mr | 8 | 0.9987163746947 |
| 9 | Mr | 9 | 0.9494722566846 |
| 10 | Mr | 10 | 0.9519611898246 |
| 11 | Mr | 11 | 0.9185886662231 |
| 12 | Mr | 12 | 0.9487920456473 |
| 13 | Mr | 13 | 0.962773329551 |
| 14 | Mr | 14 | 0.9051757459947 |
| 15 | Mr | 15 | 0.9239976861895 |
| 16 | Mr | 16 | 1.029116562893 |
| 17 | Mr | 17 | 0.9618439164772 |
| 18 | Mr | 18 | 0.9218786509734 |
| 19 | Mr | 19 | 0.9317293934615 |
| 20 | Mr | 20 | 0.9279960621241 |
| 21 | Mr | 21 | 0.9029935569738 |
| 22 | Mr | 22 | 0.913460203629 |
| 23 | Mr | 23 | 0.9751521338765 |
| 24 | Mr | 24 | 0.955037414894 |
| 25 | Mr | 26 | 1.0173086221376 |
| 26 | Mr | 27 | 0.9511490429542 |
| 27 | Mr | 28 | 0.9024247590172 |

| Abb species | Shape ID | Scaling Factor | Rotated[X] 1 | Rotated[X] 2 | Rotated[X] 7 | Rotated[Y] 1 | Rotated[Y] 2 | Rotated[Y] 7 | H1_1 | H1_2 | H1_68 |
|---|---|---|---|---|---|---|---|---|---|---|---|
| Rx | 1 | 1.301926263 | -0.482962128 | -0.011916614 | -0.242304169 | 0.017783408 | 0.362583149 | -0.11078356 | -0.9875 | 0.694933 | -0.99997 |
| Rx | 2 | 1.429276171 | -0.488071703 | -0.121593579 | -0.191669266 | -0.024209987 | 0.372381861 | -0.298609862 | -0.99989 | 0.976082 | -1 |
| Rx | 3 | 1.336823206 | -0.477957834 | -0.06714340 | -0.247844889 | -0.011566326 | 0.352280364 | -0.284637028 | -0.98853 | 0.98128 | -0.999999 |
| Rx | 4 | 1.483549402 | -0.487203552 | -0.074584534 | -0.234580451 | -0.039963823 | 0.354531931 | -0.26706621 | -0.99977 | 0.98713 | -1 |
| Mx | 30 | 0.869893464 | -0.450578292 | -0.204709101 | -0.177722967 | 0.042214624 | 0.336611727 | -0.282758721 | -0.02229 | 0.69151 | -0.96192 |
| Mx | 31 | 0.895885428 | -0.464340120 | -0.167860364 | -0.192696965 | 0.850876015 | 0.334291954 | -0.395996448 | -0.89789 | 0.771477 | -0.97722 |
| Mx | 32 | 0.886005074 | -0.475612848 | -0.171634201 | -0.186189775 | 0.03615088 | 0.389112609 | -0.312230174 | -0.31162 | 0.562414 | -0.74988 |
| Mx | 33 | 0.903441172 | -0.440506746 | -0.191134619 | -0.169884733 | 0.071888135 | 0.345186994 | -0.329082576 | -0.1637 | 0.191583 | -0.98838 |
| Sa | 34 | 0.475248975 | -0.437185941 | -0.11431212 | -0.208842096 | 0.02715383 | 0.386942079 | -0.337230653 | 0.944349 | -0.46802 | 0.989916 |
| M min | 35 | 0.565311672 | -0.448594941 | -0.151985057 | -0.145772758 | -0.07576858 | 0.421931977 | -0.269578809 | 0.931523 | -0.87782 | 0.985126 |
| M min | 36 | 0.504030272 | -0.457846548 | -0.088202205 | -0.191701276 | 0.081333342 | 0.416034784 | -0.302195761 | 0.94384 | -0.8977 | 0.999677 |
| M min | 37 | 0.451004686 | -0.429903833 | -0.073740604 | -0.208836375 | 0.006385774 | 0.364509411 | -0.305800577 | 0.932598 | -0.93868 | 0.999981 |
| M min | 38 | 0.432913041 | -0.41055218 | -0.034331183 | -0.234630272 | 0.011567104 | 0.362778627 | -0.347722953 | 0.902081 | -0.98709 | 0.999997 |
| M min | 39 | 0.493319326 | -0.45445366 | -0.106885681 | -0.169828211 | -0.064208895 | 0.388881947 | -0.283375290 | 0.953631 | -0.73881 | 0.99757 |
| M min | 40 | 0.452248931 | -0.452278878 | -0.097559774 | -0.157559857 | -0.060805784 | 0.424257487 | -0.380165819 | 0.96883 | 0.92931 | 0.99973 |
| M min | 41 | 0.484673446 | -0.431918808 | -0.075165325 | -0.177949726 | -0.046647615 | 0.416989803 | -0.312707769 | 0.95071 | -0.95107 | 0.999377 |
| Mm | 42 | 0.570283575 | -0.392778591 | -0.130611803 | -0.21851512 | -0.006137181 | 0.384642976 | -0.327768417 | 0.819363 | -0.7696 | 0.965296 |
| Mm | 43 | 0.835303949 | -0.395288765 | -0.137148988 | -0.213788529 | 0.01854763 | 0.376480254 | -0.386622876 | 0.902996 | -0.77637 | 0.577634 |
| Mm | 44 | 0.607115809 | -0.405371987 | -0.234678656 | -0.184132484 | -0.042573115 | 0.373326714 | -0.287406136 | 0.860264 | 0.931188 | 0.661883 |

| Abb species | Shape ID | Probability( Abb species=Af ) | Probability( Abb species=Ah ) | Probability( Abb species=Am ) | Probability( Abb species=Sa ) | Most Likely Abb species | Validation Fold4 | Hidden Validation | Validation Fold5 | Validation Fold2 |
|---|---|---|---|---|---|---|---|---|---|---|
| Rz | 1 | 8.04E-06 | 7.33E-06 | 0.002565199 | 4.86E-08 | Rz | 0 | 0 | 0 | 0 |
| Rz | 2 | 0.000576156 | 2.94E-07 | 0.163081958 | 1.66E-06 | Rz | 1 | 0 | 1 | 1 |
| Rz | 3 | 3.28E-06 | 2.56E-07 | 0.00208964 | 2.92E-08 | Rz | 0 | 0 | 1 | 1 |
| Rz | 4 | 0.000152094 | 9.41E-08 | 0.0161161 | 1.52E-07 | Rz | 1 | 0 | 0 | 0 |
| Mr | 30 | 1.07E-06 | 2.42801E-05 | 0.002481725 | 1.63E-06 | Mr | 0 | 0 | 1 | 1 |
| Mr | 31 | 2.41E-07 | 2.67794E-05 | 0.000630688 | 4.66E-07 | Mr | 1 | 1 | 0 | 0 |
| Mr | 32 | 3.22E-06 | 0.000226233 | 0.018663483 | 5.09E-06 | Mr | 0 | 1 | 1 | 1 |
| Mr | 33 | 4.00E-06 | 1.71E-06 | 0.00438089 | 3.04E-06 | Mr | 0 | 1 | 0 | 0 |
| Sa | 34 | 0.000114942 | 0.246412963 | 0.200029777 | 0.010483674 | Mm | 0 | 0 | 0 | 0 |
| M min | 35 | 0.000974515 | 8.48E-06 | 0.000208615 | 2.71082E-05 | M sgr | 1 | 0 | 1 | 0 |
| M min | 36 | 0.000233127 | 3.35163E-05 | 0.004998502 | 0.000391735 | M min | 0 | 1 | 1 | 0 |
| M min | 37 | 0.001445552 | 0.000012453 | 0.017148387 | 0.000897407 | M min | 0 | 0 | 1 | 1 |
| M min | 38 | 0.000474863 | 4.69207E-05 | 0.016526514 | 0.000859986 | M min | 1 | 0 | 0 | 1 |
| M min | 39 | 0.000432455 | 1.20E-06 | 0.000588715 | 5.80669E-05 | M min | 0 | 1 | 0 | 0 |
| M min | 40 | 0.000317566 | 2.02E-07 | 0.000521321 | 3.26119E-05 | M min | 0 | 0 | 1 | 0 |
| M min | 41 | 0.001015863 | 1.90E-06 | 0.001342296 | 0.000136318 | M min | 1 | 0 | 1 | 1 |
| Mm | 42 | 0.000434796 | 1.31269E-05 | 0.002956836 | 0.000152479 | Mm | 0 | 0 | 0 | 0 |
| Mm | 43 | 0.000110081 | 4.13E-07 | 0.000417095 | 1.96817E-05 | Mm | 0 | 1 | 1 | 1 |
| Mm | 44 | 0.000431402 | 0.000221424 | 0.001568802 | 0.000137822 | Mm | 1 | 0 | 0 | 0 |

PROFILER TOOL FOR ASSESSING IMPACT OF SHAPE ON A CONTINUOUS AND/OR CATEGORICAL RESPONSE

CROSS-REFERENCE TO RELATED APPLICATIONS

This application claims the benefit of, and priority based on, 35 U.S.C. § 119 to U.S. Provisional Application No. 63/574,691, filed Apr. 4, 2024, and U.S. Provisional Application No. 63/725,330, filed Nov. 26, 2024, the disclosures of each of which are incorporated herein by reference in their entirety.

BACKGROUND

The shape of an object can have an impact on a continuous or categorical response for a computer model. For instance, the shape of a footprint could have an impact on a response for a prediction model predicting the type of animal that would leave such a footprint.

Shape of an object can be determined using many different approaches. For instance, in a landmark approach, landmark points are points on an object that characterize certain features of a shape (e.g., the location of eight vertices could characterize an octagon polygon shape).

SUMMARY

In an example embodiment, a computer-program product tangibly embodied in a non-transitory machine-readable storage medium is provided. The computer-program product includes instructions operable to cause a computing system to display, in a graphical user interface, a graphical representation of position information. The position information defines a first representation of a shape of at least two dimensions. The computer-program product includes instructions operable to cause a computing system to obtain a computer model that predicts an initial response according to the first representation input to the computer model. The computer-program product includes instructions operable to cause a computing system to receive, via the graphical user interface, a manipulation of the graphical representation that changes the position information to define a second representation of the shape of the at least two dimensions. The computer-program product includes instructions operable to cause a computing system to generate an updated response according to the second representation input to the computer model.

In another example embodiment, a method of generating an updated response according to the second representation input to the computer model is provided.

In another example embodiment, a computing device is provided. The computing device includes, but is not limited to, a processor and memory. The memory contains instructions that when executed by the processor control the computing device to display, in a graphical user interface, a graphical representation of position information. The position information defines a first representation of a shape of at least two dimensions. The memory contains instructions that when executed by the processor control the computing device to obtain a computer model that predicts an initial response according to the first representation input to the computer model. The memory contains instructions that when executed by the processor control the computing device to receive, via the graphical user interface, a manipulation of the graphical representation that changes the position information to define a second representation of the shape of the at least two dimensions. The memory contains instructions that when executed by the processor control the computing device to generate an updated response according to the second representation input to the computer model.

Other features and aspects of example embodiments are presented below in the Detailed Description when read in connection with the drawings presented with this application.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 8 illustrates a flow diagram for generating a computer model response according to at least one embodiment of the present technology.

FIGS. 10A-10E illustrate data for generating a computer model with binary response for a shape profiler according to at least one embodiment of the present technology.

FIGS. 17A-17C illustrate data for generating a computer model with multi-response for a shape profiler according to at least one embodiment of the present technology.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
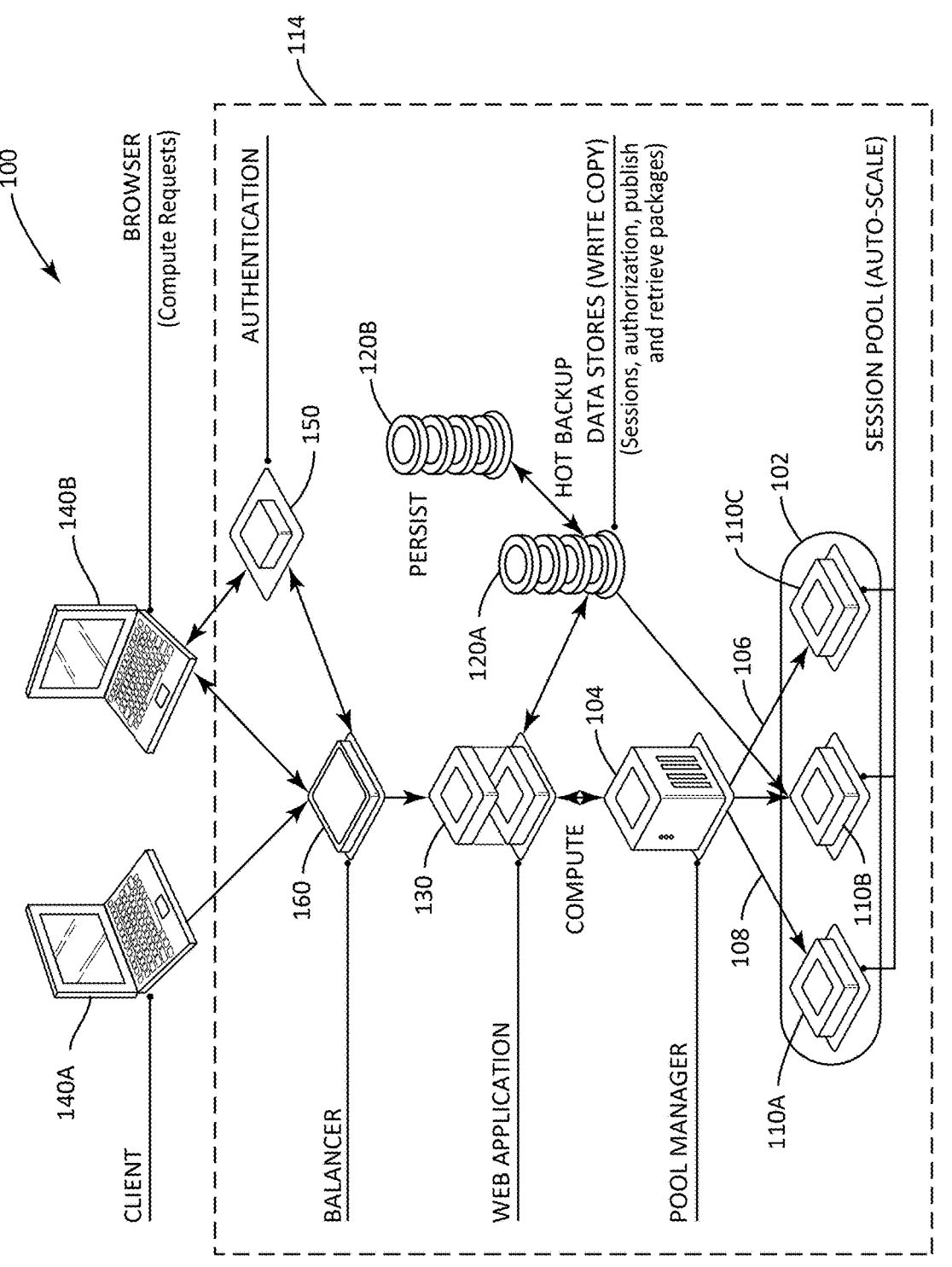
FIG. 1 illustrates an example network, including an example set of devices communicating with each other, according to at least one embodiment of the present technology.

FIG. 1 illustrates an example network 100 including an example set of devices communicating with each other (e.g., over one or more of an exchange system or a network), according to embodiments of the present technology. Network 100 includes network devices configured to communicate with a variety of types of client devices, for example, client devices 140, over a variety of types of communication channels. A client device 140 may be configured to communicate over a public or private network (e.g., client device 140B is configured to support a browser for computing requests or providing authentication).

Network devices and client devices can transmit a communication over a network 100. Network 100 may include one or more of different types of networks, including a wireless network, a wired network, or a combination of a wired and wireless network. Examples of suitable networks include the Internet, a personal area network, a local area network (LAN), a wide area network (WAN), a wireless local area network (WLAN), cloud network, or a cellular network. A wireless network may include a wireless interface or combination of wireless interfaces. As an example, a network in the one or more networks may include a short-range communication channel, such as a Bluetooth® or a Bluetooth® Low Energy channel. A wired network may include a wired interface. The wired and/or wireless networks may be implemented using routers, access points, base stations, bridges, gateways, or the like, to connect devices in the network. The one or more networks can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS), or other available protocols such as according to an Open Systems Interaction model. In addition, data and/or transactional details may be encrypted. Networks may include other devices for infrastructure for the network. For example, a cloud network may include cloud infrastructure system on demand. As another example, one or more client devices may utilize an Internet of Things (IoT) infrastructure where things (e.g., machines, devices, phones, sensors) can be connected to networks and the data from these things can be collected and processed within the things and/or external to the things. IoT may be implemented with various infrastructure such as for accessibility (technologies that get data and move it), embed-ability (devices with embedded sensors), and IoT services. Industries in the IoT space may include automotive (connected car), manufacturing (connected factory), smart cities, energy and retail.

Network devices and client devices can be different types of devices or components of devices. For example, client device 140 is shown as a laptop and balancer 160 is shown as a processor. Client devices and network devices could be other types of devices or components of other types of devices such as a mobile phone, laptop computer, tablet computer, temperature sensor, motion sensor, and audio sensor. Additionally, or alternatively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, and flow rate sensors. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current. The sensors may be mounted to various components used as part of a variety of different types of systems (e.g., an oil drilling operation).

The network devices may detect and record data related to the environment that it monitors, and transmit that data to network 100.

As noted, one type of system that may include various sensors that collect data to be processed and/or transmitted to a computing environment (not shown) according to certain embodiments includes an oil drilling system. For example, the one or more drilling operation sensors may include, for example, surface sensors that measure a standpipe pressure, a surface torque, and a rotation speed of a drill pipe, and downhole sensors that measure a rotation speed of a bit and fluid densities. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration and pump pressure may also be stored and used for modeling, prediction, or classification.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device or client device may include a home automation switch that may be coupled with a home appliance. In another embodiment, a network or client device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment (e.g., computing environment or another computing environment not shown) according to certain embodiments include a manufacturing environment (e.g., manufacturing products or energy). A variety of different network devices may be included in an energy pool, such as various devices within one or more power plants, energy farms (e.g., wind farm, and solar farm) energy storage facilities, factories, homes and businesses of consumers. One or more of such devices may include one or more sensors that detect energy gain or loss, electrical input or output or loss, and a variety of other efficiencies. These sensors may collect data to inform users of how the energy pool, and individual devices within the pool, may be functioning and how they may be made more efficient. In a manufacturing environment, image data can be taken of the manufacturing process or other readings of manufacturing equipment. For example, in a semiconductor manufacturing environment, images can be used to track, for example, process points (e.g., movement from a bonding site to a packaging site), and process parameters (e.g., bonding force, electrical properties across a bond of an integrated circuit).

Network device sensors may also perform processing on data it collects before transmitting the data to a computing environment, or before deciding whether to transmit data to a computing environment. For example, network devices may determine whether data collected meets certain rules, for example by comparing data or values calculated from the data and comparing that data to one or more thresholds. The network device may use this data and/or comparisons to determine if the data should be transmitted to a computing environment for further use or processing.

Devices in computing environment 114 may include specialized computers, servers, or other machines that are configured to individually and/or collectively process large amounts of data (e.g., using a session pool 102). The computing environment 114 may also include storage devices (e.g., data stores 120) that include one or more databases of structured data, such as data organized in one or more hierarchies, or unstructured data. The databases may communicate with the processing devices within computing environment 114 to distribute data to them and store data used in the computing environment 114. Computing environment 114 may collect, analyze and/or store data from or pertaining to communications, client device operations, client rules, and/or user-associated actions stored at one or more devices in computing environment 114. Such data may influence communication routing to the devices within computing environment 114, and how data is stored or processed within computing environment 114, among other actions.

Network 100 may also include one or more network-attached data stores 120. Network-attached data stores 120 are used to store data to be processed by the computing environment 114 as well as any intermediate or final data generated by the computing system in non-volatile memory. For instance, data stores 120 can perform functions such as writing and copying data and can provide data storage for network functions such as sessions, authorization, publishing and retrieving packages. In certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores 120 may store a variety of different types of data organized in a variety of different ways and from a variety of different sources. For example, network-attached data stores 120 may include storage other than primary storage located within computing environment 114 that is directly accessible by processors located therein. Network-attached data stores 120 may include secondary, tertiary, auxiliary, or back-up storage (e.g., data storage 120B), such as large hard drives, servers, and virtual memory, among other types. Storage devices may include portable or non-portable storage devices, optical storage devices, and various other mediums capable of storing and containing data (e.g., computer a machine-readable storage medium or computer-readable storage medium such as computer readable medium 210 in FIG. 2).

Furthermore, the data stores may hold a variety of different types of data. For example, network-attached data stores 120 may hold unstructured (e.g., raw) data, such as manufacturing data (e.g., a database containing records identifying products being manufactured with parameter data for each product, such as performance metrics or criteria) or product sales databases (e.g., a database containing individual data records identifying details of individual product performance).

The unstructured data may be presented to the computing environment 114 in different forms such as a flat file or a conglomerate of data records and may have data values and accompanying time stamps. The computing environment 114 may be used to analyze the unstructured data in a variety of ways to determine the best way to structure (e.g., hierarchically) that data, such that the structured data is tailored to a type of further analysis on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP or MOLAP database, or may be stored in another tabular form, such as in a flat-hierarchy form.

Other devices can further be used to influence communication routing and/or processing between devices within computing environment 114 and with devices outside of computing environment 114. For example, as shown in FIG. 1, computing environment 114 may include a device 130 supporting a web application. Thus, computing environment 114 can retrieve data of interest, such as client information (e.g., product information, client rules, etc.), technical product details, news, current or predicted weather, and so on. Balancer 160 can be used to balance and direct load within the computing environment 114. Authentication device 150 can be used to provide authentication or other security protocols for a client device, user or group accessing computing environment 114.

In addition to computing environment 114 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from sensors as the sensors continuously sense, monitor and track changes in their environments. Devices within computing environment 114 may also perform pre-analysis on data it receives to determine if the data received should be processed as part of an ongoing project. The data received and collected by computing environment 114, no matter what the source or method or timing of receipt, may be processed over a period of time for a client to determine results data based on the client's needs and rules.

FIG. 1 includes a pool of devices with a pool manager 104 and session pool 102. Network 100 includes a variety of pool managers (e.g., pool manager 104) and worker nodes 110 (e.g., devices, servers, or server farms of session pool 102), according to embodiments of the present technology. Devices of session pool 102 are communicatively connected (e.g., via communication path 108 and communication path 106). Therefore, the pool manager may transmit information (e.g., related to the session pool 102 or notifications), to and receive information from each other. Although only one pool manager 104 is shown in FIG. 1, the network 100 may include more pool managers or a different kind of device manager (e.g., a dedicated resource manager).

Session pool 102 includes one or more worker nodes (e.g., worker node 110A). Shown in FIG. 1 are three worker nodes 110A-C merely for illustration, more or less worker nodes could be present. For instance, the pool manager 104 may itself be a worker node and may not need further worker nodes to complete a task. A given worker node could include dedicated computing resources or allocated computing resources as needed to perform operations as directed by the pool manager 104. The number of worker nodes included in a session pool 102 may be dependent, for example, upon how large the project or data set is being processed by the session pool 102, the capacity of each worker node, and the time designated for the session pool 102 to complete the project. Each worker node within the session pool 102 may be connected (wired or wirelessly, and directly or indirectly) to pool manager 104. Therefore, each worker node may receive information from the pool manager 104 (e.g., an instruction to perform work on a project) and may transmit information to the pool manager 104 (e.g., a result from work performed on a project). Furthermore, worker nodes 110 may communicate with each other (either directly or indirectly). For example, worker nodes 110 may transmit data between each other related to a job being performed or an individual task within a job being performed by that worker node. However, in certain embodiments, worker nodes 110 may not, for example, be connected (communicatively or otherwise) to certain other worker nodes. In an embodiment, worker nodes may only be able to communicate with the pool manager 104 that controls it and may not be able to communicate with other worker nodes in the session pool 102.

The pool manager 104 may connect with other devices of network 100 or an external device (e.g., a pool user, such as a server or computer). For example, a server or computer may connect to pool manager 104 and may transmit a project or job to the node. The project may include a data set. The data set may be of any size. Once the pool manager 104 receives such a project including a large data set, the pool manager 104 may distribute the data set or projects related to the data set to be performed by worker nodes 110. Alternatively, for a project including a large data set, the data set may be received or stored by a machine other than a pool manager 104 or worker node 110 (e.g., a Hadoop data node).

Pool manager may maintain knowledge of the status of the worker nodes 110 in the session pool 102 (i.e., status information), accept work requests from clients, subdivide the work across worker nodes 110, and coordinate the worker nodes 110, among other responsibilities. Worker nodes 110 may accept work requests from a pool manager 104 and provide the pool manager 104 with results of the work performed by the worker nodes 110. A session pool 102 may be started from a single node (e.g., a machine, computer, server, etc.). This first node may be assigned or may start as the primary pool manager 104 that will control any additional nodes that enter the session pool 102.

When a project is submitted for execution (e.g., by a client or a pool manager 104), it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A pool manager may be designated as the primary pool manager among multiple pool managers. A server, computer or other external device may connect to the primary pool manager. Once the pool manager receives a project, the primary pool manager may distribute portions of the project to its worker nodes for execution. For example, when a project is initiated on session pool 102, primary pool manager 104 controls the work to be performed for the project to complete the project as requested or instructed. The primary pool manager may distribute work to the worker nodes 110 based on various factors, such as which subsets or portions of projects may be completed most efficiently and in the correct amount of time. For example, a worker node may perform analysis on a portion of data that is already local (e.g., stored on) the worker node. The primary pool manager also coordinates and processes the results of the work performed by each worker node after each worker node executes and completes its job. For example, the primary pool manager may receive a result from one or more worker nodes, and the pool manager may organize (e.g., collect and assemble) the results received and compile them to produce a complete result for the project received from the end user.

Any remaining pool manager (not shown) may be assigned as backup pool manager for the project. In an embodiment, backup pool manager may not control any portion of the project. Instead, backup pool manager may serve as a backup for the primary pool manager and take over as primary pool manager if the primary pool manager were to fail.

To add another node or machine to the session pool 102, the primary pool manager may open a pair of listening sockets, for example. A socket may be used to accept work requests from clients, and the second socket may be used to accept connections from other pool nodes. The primary pool manager may be provided with a list of other nodes (e.g., other machines, computers, servers) that will participate in the pool, and the role that each node will fill in the pool. Upon startup of the primary pool manager (e.g., the first node on the pool), the primary pool manager may use a network protocol to start the server process on every other node in the session pool 102. Command line parameters, for example, may inform each node of one or more pieces of information, such as: the role that the node will have in the pool, the host name of the primary pool manager, and the port number on which the primary pool manager is accepting connections from peer nodes. The information may also be provided in a configuration file, transmitted over a secure shell tunnel, and recovered from a configuration server. While the other machines in the pool may not initially know about the configuration of the pool, that information may also be sent to each other node by the primary pool manager. Updates of the pool information may also be subsequently sent to those nodes.

For any pool manager other than the primary pool manager added to the pool, the pool manager may open multiple sockets. For example, the first socket may accept work requests from clients, the second socket may accept connections from other pool members, and the third socket may connect (e.g., permanently) to the primary pool manager. When a pool manager (e.g., primary pool manager) receives a connection from another pool manager, it first checks to see if the peer node is in the list of configured nodes in the pool. If it is not on the list, the pool manager may clear the connection. If it is on the list, it may then attempt to authenticate the connection. If authentication is successful, the authenticating node may transmit information to its peer, such as the port number on which a node is listening for connections, the host name of the node, and information about how to authenticate the node, among other information. When a node, such as the new pool manager, receives information about another active node, it will check to see if it already has a connection to that other node. If it does not have a connection to that node, it may then establish a connection to that pool manager.

Any worker node added to the pool may establish a connection to the primary pool manager and any other pool manager on the pool. After establishing the connection, it may authenticate itself to the pool (e.g., any pool manager, including both primary and backup, or a server or user controlling the pool). After successful authentication, the worker node may accept configuration information from the pool manager.

When a node joins a session pool 102 (e.g., when the node is powered on or connected to an existing node on the pool or both), the node is assigned (e.g., by an operating system of the pool) an identifier (e.g., a universally unique identifier (UUID)). This identifier may help other nodes and external entities (devices, users, etc.) to identify the node and distinguish it from other nodes. When a node is connected to the pool, the node may share its identifier with the other nodes in the pool. Since each node may share its identifier, each node may know the identifier of every other node on the pool. Identifiers may also designate a hierarchy of each of the nodes (e.g., backup pool manager) within the pool. For example, the identifiers of each of the backup pool manager may be stored in a list of backup pool manager to indicate an order in which the backup pool manager will take over for a failed primary pool manager to become a new primary pool manager. However, a hierarchy of nodes may also be determined using methods other than using the unique identifiers of the nodes. For example, the hierarchy may be predetermined or may be assigned based on other predetermined factors.

The pool may add new machines at any time (e.g., initiated from any pool manager). Upon adding a new node to the pool, the pool manager may first add the new node to its table of pool nodes. The pool manager may also then notify every other pool manager about the new node. The nodes receiving the notification may acknowledge that they have updated their configuration information.

Primary pool manager 104 may, for example, transmit one or more communications to backup pool manager or other control or worker nodes within the session pool 102). Such communications may be sent using protocols such as periodically, at fixed time intervals, or between known fixed stages of the project's execution. The communications transmitted by primary pool manager 104 may be of varied types and may include a variety of types of information. For example, primary pool manager 104 may transmit snapshots (e.g., status information) of the session pool 102 so that backup pool manager 104 always has a recent snapshot of the session pool 102. The snapshot or pool status may include, for example, the structure of the pool (including, for example, the worker nodes in the pool, unique identifiers of the nodes, or their relationships with the primary pool manager) and the status of a project (including, for example, the status of each worker node's portion of the project). The snapshot may also include analysis or results received from worker nodes in the session pool 102. The backup pool manager may receive and store the backup data received from the primary pool manager. The backup pool manager may transmit a request for such a snapshot (or other information) from the primary pool manager, or the primary pool manager may send such information periodically to the backup pool manager.

As noted, the backup data may allow the backup pool manager to take over as primary pool manager if the primary pool manager fails without requiring the pool to start the project over from scratch. If the primary pool manager fails, the backup pool manager that will take over as primary pool manager may retrieve the most recent version of the snapshot received from the primary pool manager and use the snapshot to continue the project from the stage of the project indicated by the backup data. This may prevent failure of the project as a whole.

A backup pool manager may use various methods to determine that the primary pool manager has failed. In one example of such a method, the primary pool manager may transmit (e.g., periodically) a communication to the backup pool manager that indicates that the primary pool manager is working and has not failed, such as a heartbeat communication. The backup pool manager may determine that the primary pool manager has failed if the backup pool manager has not received a heartbeat communication for a certain predetermined period of time. Alternatively, a backup pool manager may also receive a communication from the primary pool manager itself (before it failed) or from a worker node that the primary pool manager has failed, for example because the primary pool manager has failed to communicate with the worker node.

Different methods may be performed to determine which backup pool manager of a set of backup pool manager will take over for failed primary pool manager 104 and become the new primary pool manager. For example, the new primary pool manager may be chosen based on a ranking or "hierarchy" of backup pool manager based on their unique identifiers. In an alternative embodiment, a backup pool manager may be assigned to be the new primary pool manager by another device in the session pool 102 or from an external device (e.g., a system infrastructure or an end user, such as a server or computer, controlling the session pool 102). In another alternative embodiment, the backup pool manager that takes over as the new primary pool manager may be designated based on bandwidth or other statistics about the session pool 102.

A worker node within the session pool 102 may also fail. If a worker node fails, work being performed by the failed worker node may be redistributed amongst the operational worker nodes. In an alternative embodiment, the primary pool manager may transmit a communication to each of the operable worker nodes still on the session pool 102 that each of the worker nodes should purposefully fail also. After each of the worker nodes fail, they may each retrieve their most recent saved checkpoint of their status and re-start the project from that checkpoint to minimize lost progress on the project being executed.

Figure 2:
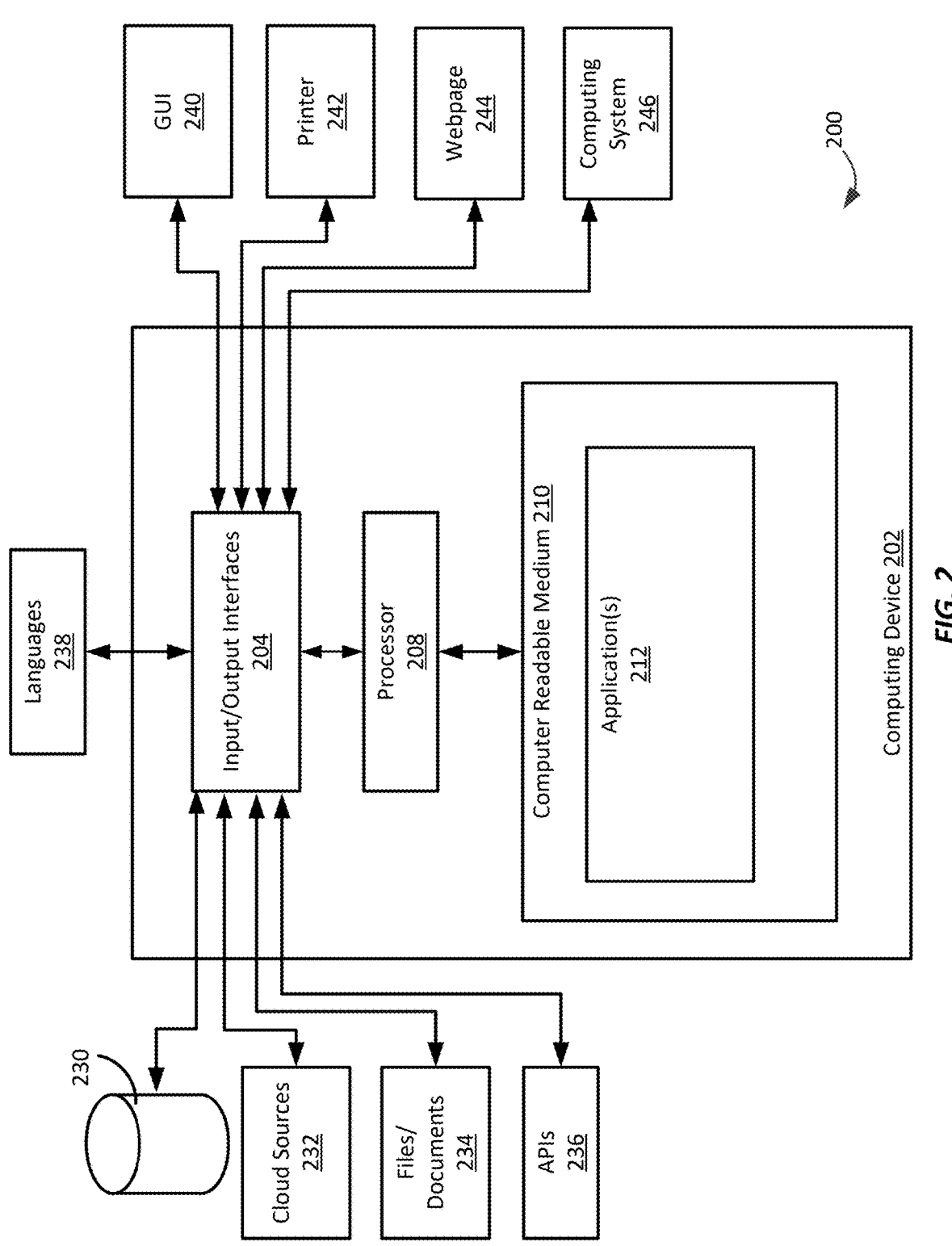
FIG. 2 illustrates a block diagram that provides an illustration of the hardware components of a first computing system according to at least one embodiment of the present technology.

While each device in FIG. 1 is shown as a single device, it will be appreciated that multiple devices may instead be used. FIG. 2 shows an example computing structure 200 for a device in FIG. 2. FIG. 2 includes a computing device 202. The computing device 202 has a computer-readable medium 210 and a processor 208. Computer-readable medium 210 is an electronic holding place or storage for information so the information can be accessed by processor 208. The computer readable medium 210 is a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including, for example, memory sharing, message passing, token passing, and network transmission. Computer-readable medium 210 can include, but is not limited to, any type of random-access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc.

Processor 208 executes instructions (e.g., stored at the computer-readable medium 210). The instructions can be carried out by a special purpose computer, logic circuits, or hardware circuits. In one or more embodiments, processor 208 is implemented in hardware and/or firmware. Processor 208 executes an instruction, meaning it performs or controls the operations called for by that instruction. The term "execution" is the process of running an application (e.g., applications(s) 212)) or the carrying out of the operation called for by an instruction. The instructions can be written using one or more programming language, scripting language, assembly language, etc. Processor 208 in one or more embodiments can retrieve a set of instructions from a permanent memory device and copy the instructions in an executable form to a temporary memory device that is generally some form of RAM, for example. Processor 208 operably couples with components of computing device 202 (e.g., input/output interface 204 and with computer readable medium 210) to receive, to send, and to process information.

For instance, in one or more embodiments, computing device 202 sends and/or receives information from one or more of databases 230, cloud sources 232, application programming interfaces 236 (API's), graphical user interfaces 240 (GUIs), printers 242, webpages 244, and computing systems 246. The input/output interface 204 may be configured to receive languages 238 (e.g., to communicate with other computing systems 246) or specific electronic files or documents 234 (e.g., inputs for building models or designing experiments). The input/output interface 204 may be a single interface (e.g., an output interface only to output reports to a printer 242), multiple interface (e.g., a graphical user interface 240 may be interactive and send and receive data over input/output interface 204), or a set of interfaces (e.g., to connect with multiple devices).

In one or more embodiments, computer-readable medium 210 stores instructions for execution by processor 208. In one or more embodiments, one or more applications stored on computer-readable medium 210 are implemented in software (e.g., computer-readable and/or computer-executable instructions) stored in computer-readable medium 210 and accessible by processor 208 for execution of the instructions.

Figure 3:
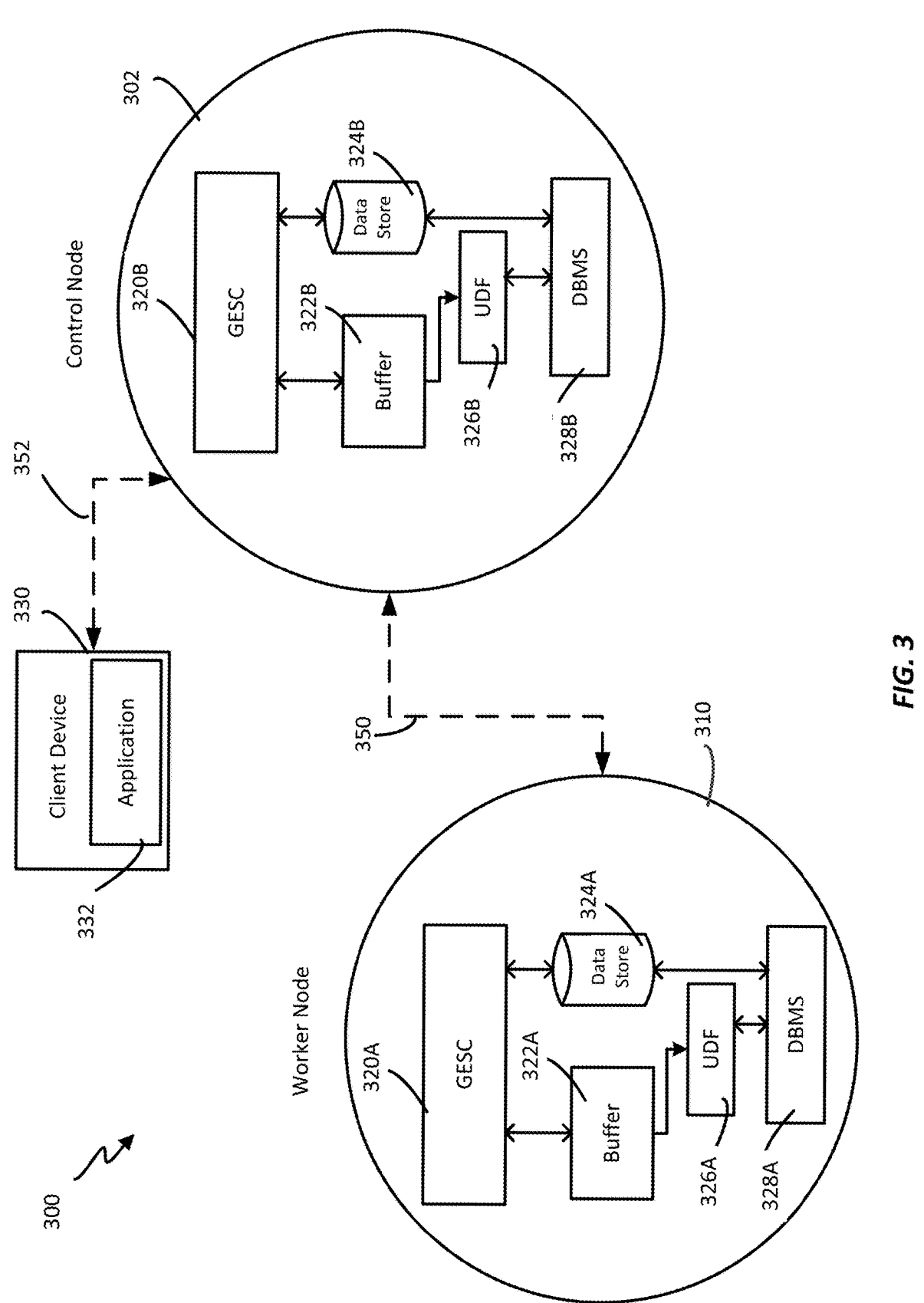
FIG. 3 illustrates a portion of a communications grid first computing system, including a control node and a worker node, according to at least one embodiment of the present technology.

FIG. 3 illustrates a system 300 including a control node (e.g., pool manager 104 of FIG. 1) and a worker node (e.g., worker nodes 110 of FIG. 1), according to embodiments of the present technology. System 300 includes one control node (control node 302) and one worker node (worker node 310) for purposes of illustration but may include more worker and/or control node. The control node 302 is communicatively connected to worker node 310 via communication path 350. Therefore, control node 302 may transmit information (e.g., related to the session pool 102 or notifications), to and receive information from worker node 310 via path 350.

System 300 includes data processing nodes (e.g., control node 302 and worker node 310). Control node 302 and worker node 310 can include multi-core data processors. Each control node 302 and worker node 310 in this example includes a grid-enabled software component (GESC) 320 that executes on the data processor associated with that node and interfaces with buffer memory 322 also associated with that node. Each control node 302 and worker node 310 in this example includes a database management software (DBMS) 328 that executes on a database server (not shown) at control node 302 and on a database server (not shown) at worker node 310.

Each control node 302 and worker node 310 in this example also includes a data storage 324. Data storage 324, similar to network-attached data stores 120 in FIG. 1, are used to store data to be processed by the nodes in the computing environment. Data storage 324 may also store any intermediate or final data generated by the computing system after being processed, for example in non-volatile memory. However, in certain embodiments, the configuration of the system 300 allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the pool receives queries (e.g., ad hoc) from a client device 330 and when responses, which are generated by processing large amounts of data, need to be generated quickly or on-the-fly. In such a situation, the pool may be configured to retain the data within memory so that responses can be generated at different levels of detail and so that a client may interactively query against this information.

Each control node 302 and worker node 310 in this example also includes a user-defined function (UDF) 326. The UDF 326 provides a mechanism for the DBMS 328 to transfer data to or receive data from the database stored in the data storage 324 that are managed by the DBMS. For example, UDF 326 can be invoked by the DBMS 328 to provide data to the GESC 320 for processing. The UDF 326 may establish a socket connection (not shown) with the GESC 320 to transfer the data. Alternatively, the UDF 326 can transfer data to the GESC 320 by writing data to shared memory accessible by both the UDF 326 and the GESC 320.

The GESC 320 at the control node 302 and worker node 310 may be connected via a network. Therefore, control node 302 and worker node 310 can communicate with each other via the network using a predetermined communication protocol such as, for example, the Message Passing Interface (MPI). Each GESC 320 can engage in point-to-point communication with the GESC at another node or in collective communication with multiple GESCs via the network. The GESC 320 at each node may contain identical (or nearly identical) software instructions. Each control node 302 and worker node 310 may be configured to operate as either a pool manager or a worker node. The GESC 320B at the control node 302 can communicate, over a communication path 352, with a client device 330. More specifically, control node 302 may communicate with client application 332 hosted by the client device 330 to receive queries and to respond to those queries after processing large amounts of data.

DBMS 328 may control the creation, maintenance, and use of database or data structure (not shown) within control node 302 and worker node 310. The database may organize data stored in data storage 324. The DBMS 328 at control node 302 may accept requests for data and transfer the appropriate data for the request. With such a process, collections of data may be distributed across multiple physical locations. In this example, each control node 302 and worker node 310 stores a portion of the total data managed by the management system in its associated data storage 324.

Furthermore, the DBMS 328 may be responsible for protecting against data loss using replication techniques. Replication includes providing a backup copy of data stored on one node on one or more other nodes. Therefore, if one node fails, the data from the failed node can be recovered from a replicated copy residing at another node. Data or status information for each node in the session pool 102 may also be shared with each node on the pool.

Figure 4:
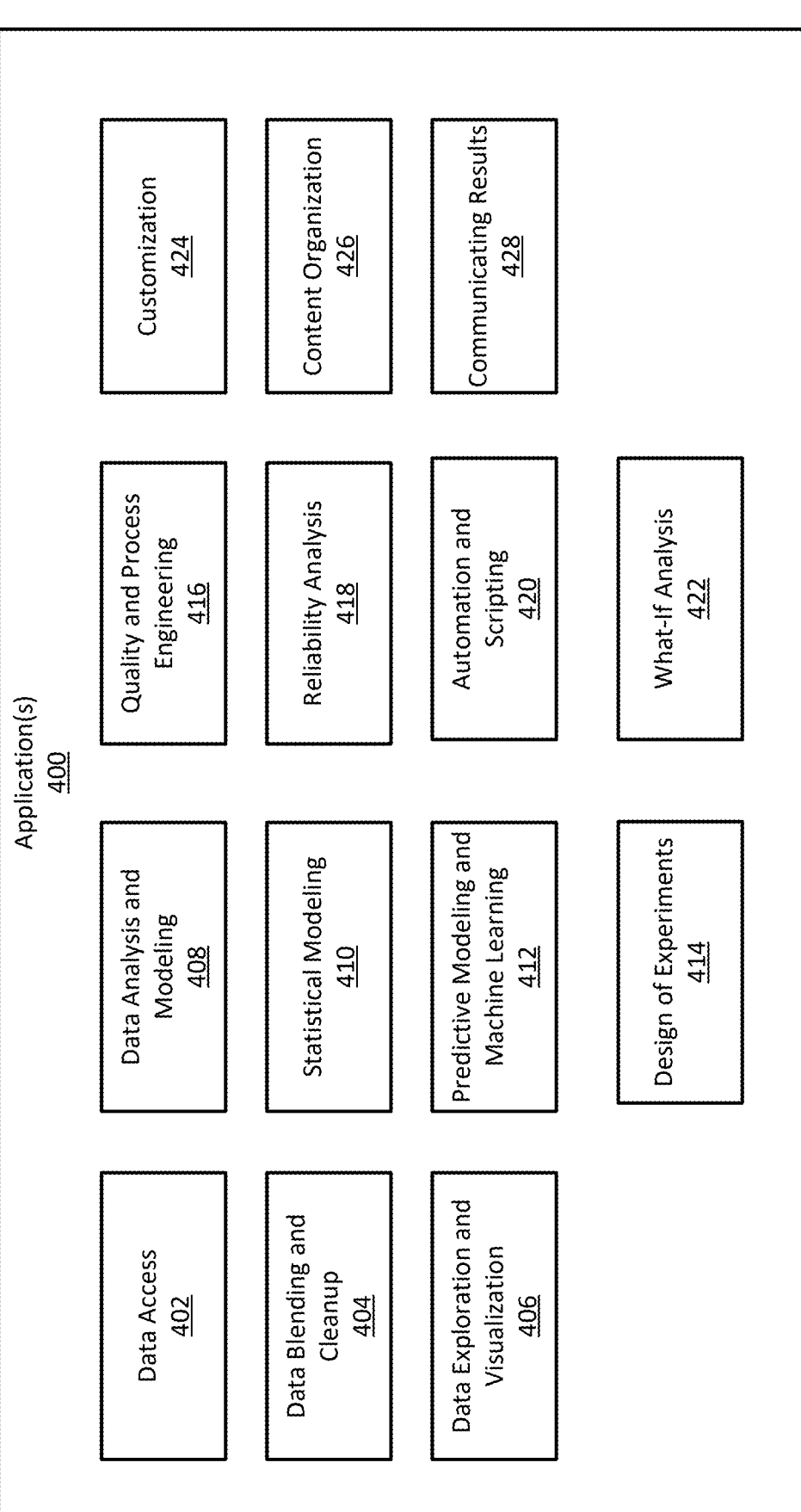
FIG. 4 illustrates a block diagram of example applications according to at least one embodiment of the present technology.

FIG. 4 provides example applications 400 (e.g., applications executed by a computing device 202, worker node 310, or control node 302) for performing one or more tasks or operations.

For example, data access operations 402 can be used for accessing data from different sources (e.g., importing and/or reading Excel files, flat files, relational databases, APIs, R, Python, and SAS® files and databases). For instance, data can be imported for data visualization, exploration and analysis. Data can be formatted or optimized. For instance, data blending and cleanup operations 404 can be used to remove complexity (e.g., in text, images and functions data) and for screening data (e.g., screening data for outliers, entry errors, missing values and other inconsistencies that can compromise data analysis). This can be useful for visual and interactive tools. Data can also be transformed, blended, grouped, filtered, merged into a single table or into subsets, or otherwise arranged for a particular scenario.

In one or more embodiments, one or more applications 400 include data exploration and visualization operations 406 that can be used to support plot and profiler tools. For instance, plot tools can be used to create data plots (e.g., to plot data to spot patterns and patterns that do not fit a trend). Some example plots include bubble plots, scatter plots (matrix and 3D), parallel plots, cell plots, contour plots, ternary plots, and surface plots. Profilers are tools that can be used to create a specialized set of plots in which changing one plot changes the other plots. For instance, profiling is an approach to generate visualizations of response surfaces by seeing what would happen if a user changed just one or two factors at a time. Profiler tools can be used to create interactive profiles of data (e.g., to explore and graph data dynamically and uncover hidden relationships between graphed data or interface with linked data, to interpret and understand the fit of equations to data, and to find factor values to optimize responses). Some example profiler tools include prediction profiler, contour profiler, surface profiler, mixture profiler, custom profiler, and excel profiler. A prediction profiler can be used to show vertical slices across each factor, holding other factors at a current value. A contour profiler allows horizontal slices showing contour lines for two factors at a time. A surface profiler generates three-dimensional plots for two factors at a time, or contour surface plot for 3 factors at a time. A mixture profiler is a contour profiler for mixture of factors. A custom profiler is a numerical optimizer. An excel profiler allows for visualization of models or formulas stored in electronic worksheets. Accordingly, profiler tools can allow for one or more of simulation, surface visualization, optimization, and desirability studies. Graphs (e.g., from plot or profiler tools) can be exported to electronic or print reports for presenting findings. Further, data exploration and visualization operations 406 can include text exploration such as computer extraction of symbols, characters, words and phrases; or computer visualization such as to organize symbols, characters, words and phrases to uncover information regarding a text or classify the text.

In one or more embodiments, one or more applications 400 include data analysis and modeling operations 408 can be used to analyze one or many variables or factors in linked analysis. Analysis results may be linked with specific graphs designed for different types of data or metrics (e.g., graphs related to histograms, regression modeling and distribution fitting). Data analysis and modeling can be performed real-time (or just-in-time). For instance, applications 400 can include statistical modeling operations 410. For instance, statistical modeling operations 410 can be used for a diversity of modeling tasks such as univariate, multivariate and multifactor. Data can be transformed from its collected form (e.g., text or functional form) and data can be used for building models for better insights (e.g., discovery trends or patterns in data). As another example, one or more applications 400 can include predictive modeling and machine learning operations 412 to build models using predictive modeling techniques, such as regression, neural networks and decision trees. The operations 412 can be used to fit multiple predictive models and determine the best performing model with model screening. Validation (e.g., cross-validation and k-fold cross-validation) can be used (e.g., to prevent over-fitting or to select a best model). Machine learning methods can be used by the user without having to write code and tune algorithms. Examples of machine learning techniques are described in more detail with respect to FIGS. 5 and 6.

In one or more embodiments, one or more applications 400 include design of experiments (DOE) operations 414 used to create designs for experiments that provide test conditions for one or more factors tested in the experiment. For example, the design of experiments operations 414 can be used to create optimally designed experiments, efficient experiments to meet constraints, process limitations and budget, and/or screening designs to untangle important effects between multiple factors. DOE operations 414 can also be used for evaluating designs (e.g., design diagnostic measures such as efficiency metrics).

In one or more embodiments, one or more applications 400 include quality and process engineering operations 416 to track and visualize quality and processes. For instance, the quality and process engineering operations 416 can generate charts to explore root causes of quality or process problems (e.g., causes of variation in manufacturing processes and drill down into problem processes). Additionally, or alternatively, they can be used to generate notifications for metrics that exceed a threshold such as an out-of-control signal or a control chart warning. Additionally, or alternatively, they can be used to study the capability and performance of one or more variables to identify processes that are not meeting user-defined goals. Objective data from processes or consumer data can be used to release better products and react to market trends.

In one or more embodiments, one or more applications 400 include reliability analysis operations 418. For example, in manufacturing, reliability analysis tools can be used to prevent failure, improve warranty or product performance, find and address important design vulnerabilities, and pinpoint defects in materials or processes. Reliability analysis tools can also be used to determine how to reduce or improve these issues (e.g., by identifying trends and outliers in data and model predictions). What-if Analysis operations 422 can be used to demonstrate patterns of predicted responses and the effect of each factor on the response with scenario analysis. For example, a graphical user interface can be used for a user to put in different inputs, assumptions or constraints for a system and observe responses or effects. For instance, in a measurement system analysis analyzing whether parts would be in-specification, different estimated variances between parts and operators testing the parts could be varied to determine the effect on modeled output for the measurement system analysis.

In one or more embodiments, one or more applications 400 include automation and scripting operations 420. For example, automation can allow code-free access for a user to automation routines all the way up to completely customized applications (e.g., code free access to SAS®, MATLAB®, Python® and R routines). For example, a design created for experiments can be automated such that automatic testing is performed for the design.

In one or more embodiments, one or more applications 400 include operations for greater user control and interaction. For instance, customization operations 424 can be used for user customization (e.g., mass customizations, and customizations of graphics, statistics, and default views). As another example, content organization operations 426 can be used to organize data (e.g., translate statistical results to a simplified view to communicate findings and organize, summarize, and document content to better aid the accountability and reproducibility of projects). As another example, the communicating results operations 428 can be used for presentation of results, models, or other output from one or more applications 400 (e.g., presented in print, graphical user interface, or web-based versions).

In one or more embodiments, fewer, different, and additional components can be incorporated into computing device 202. In one or more embodiments, the input/output interface has more than one interface that uses the same or different interface technology.

In one or more embodiments, the one or more applications 400 can be integrated with other analytic or computing tools not specifically shown here. For instance, one or more applications are implemented using or integrated with one or more software tools such as JMP®, Base SAS, SAS® Enterprise Miner™, SAS/STAT®, SAS® High Performance Analytics Server, SAS® Visual Data Mining and Machine Learning, SAS® LASR™ SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML®.

Figure 5:
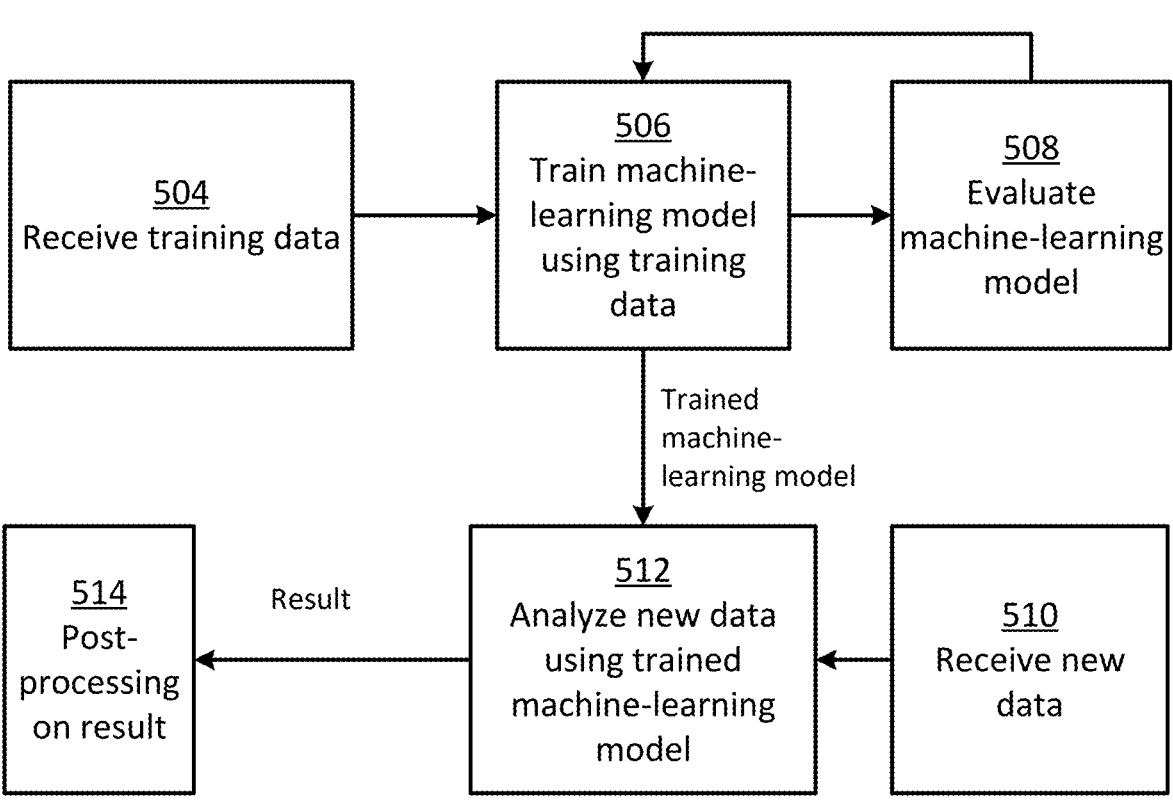
FIG. 5 illustrates a flow chart of an example of a process for generating and using a machine-learning model according to at least one embodiment of the present technology.

One or more embodiments are useful for generating and using machine-learning models. FIG. 5 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector operator (LASSO) classifiers, and support vector machines; (iv) clusterers, such as k-means clustering, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, transformer networks, large language models (LLMs), LLM agents, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models construction can be at least partially automated (e.g., with little or no human involvement) in a training process. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 5.

In block 504, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 506, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 508, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 506, where the machine-learning model can be further trained using additional training data or otherwise modified to improve accuracy. If the machine-learning model has an adequate degree of accuracy for the particular task, the process can continue to block 510.

In block 510, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 512, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 514, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 6:
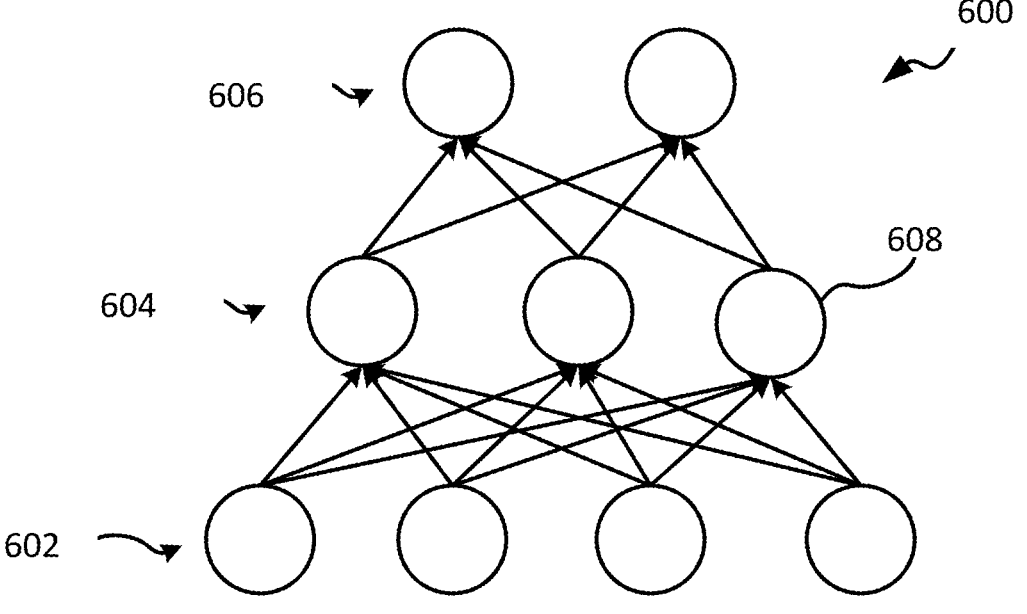
FIG. 6 illustrates an example of a machine-learning model as a neural network according to at least one embodiment of the present technology.

A more specific example of a machine-learning model is the neural network 600 shown in FIG. 6. The neural network 600 is represented as multiple layers of interconnected neurons, such as neuron 608, that can exchange data between one another. The layers include an input layer 602 for receiving input data, a hidden layer 604, and an output layer 606 for providing a result. The hidden layer 604 is referred to as hidden because it may not be directly observable or have its input directly accessible during the normal functioning of the neural network 600. Although the neural network 600 is shown as having a specific number of layers and neurons for exemplary purposes, the neural network 600 can have any number and combination of layers, and each layer can have any number and combination of neurons.

The neurons and connections between the neurons can have numeric weights, which can be tuned during training. For example, training data can be provided to the input layer 602 of the neural network 600, and the neural network 600 can use the training data to tune one or more numeric weights of the neural network 600. In some examples, the neural network 600 can be trained using backpropagation. Backpropagation can include determining a gradient of a particular numeric weight based on a difference between an actual output of the neural network 600 and a desired output of the neural network 600. Based on the gradient, one or more numeric weights of the neural network 600 can be updated to reduce the difference, thereby increasing the accuracy of the neural network 600. This process can be repeated multiple times to train the neural network 600. For example, this process can be repeated hundreds or thousands of times to train the neural network 600.

In some examples, the neural network 600 is a feed-forward neural network. In a feed-forward neural network, every neuron only propagates an output value to a subsequent layer of the neural network 600. For example, data may only move one direction (forward) from one neuron to the next neuron in a feed-forward neural network.

In other examples, the neural network 600 is a recurrent neural network. A recurrent neural network can include one or more feedback loops, allowing data to propagate in both forward and backward through the neural network 600. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 600 operates by receiving a vector of numbers from one layer; transforming the vector of numbers into a new vector of numbers using a matrix of numeric weights, a nonlinearity, or both; and providing the new vector of numbers to a subsequent layer of the neural network 600. Each subsequent layer of the neural network 600 can repeat this process until the neural network 600 outputs a final result at the output layer 606. For example, the neural network 600 can receive a vector of numbers as an input at the input layer 602. The neural network 600 can multiply the vector of numbers by a matrix of numeric weights to determine a weighted vector. The matrix of numeric weights can be tuned during the training of the neural network 600. The neural network 600 can transform the weighted vector using a nonlinearity, such as a sigmoid tangent or the hyperbolic tangent. In some examples, the nonlinearity can include a rectified linear unit, which can be expressed using the following equation:

$$y = \max(x, 0)$$

where y is the output and x is an input value from the weighted vector. The transformed output can be supplied to a subsequent layer, such as the hidden layer 604, of the neural network 600. The subsequent layer of the neural network 600 can receive the transformed output, multiply the transformed output by a matrix of numeric weights and a nonlinearity, and provide the result to yet another layer of the neural network 600. This process continues until the neural network 600 outputs a final result at the output layer 606.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the session pool 102 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network and/or a transformer model to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Statistical models can assess the effect of one or more continuous and/or discrete factors on either a continuous or categorical response. However, there are times where what can be of greater or additional importance is the impact of the shape of some object on a continuous or categorical response. For example, the shape of a shell, skull, footprint, or other animal indicator can inform a classification as to the species or gender that left behind the animal indicator. Small differences in shape can impact a classification, which can be difficult to accurately reflect. Embodiments provide interactive tools to allow a user to directly manipulate elements of a shape in a graphical user interface (e.g., adjusting coordinates interactively) and explore shape effects (e.g., getting feedback on the change of the response or even changes to other elements of the shape). Embodiments can be useful for supporting prediction models using shape input to a model.

Figure 7:
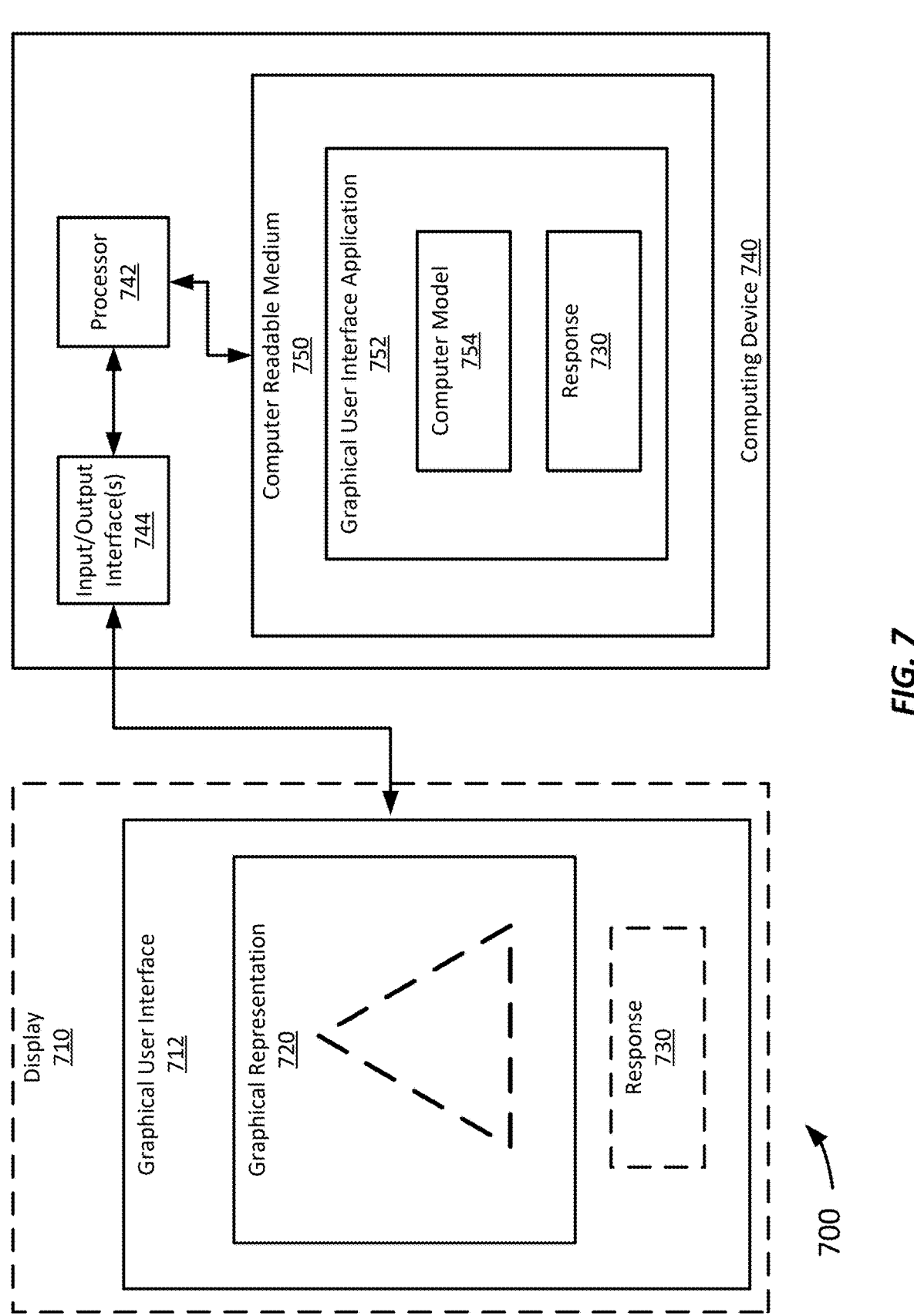
FIG. 7 illustrates a block diagram of a system for displaying a graphical user interface according to at least one embodiment of the present technology.

FIG. 7 illustrates a block diagram of a system 700 for displaying a graphical user interface. System 700 includes a computing device 740 for displaying in a graphical user interface 712 a graphical representation 720. The graphical user interface 712 can be integrated with computing device 740 (e.g., a tablet provides both a display and computing device). Alternatively, or additionally, the graphical user interface 712 is displayed on a display 710. The system 700 is configured to exchange information between devices in the system (e.g., via wired and/or wireless transmission). For example, a network (not shown) can connect one or more devices of system 700 (e.g., computing device 740) to one or more other devices of system 700 (e.g., display 710).

In one or more embodiments, the computing device 740 includes one or more input and/or output interface(s) 744 for receiving manipulation of graphical representation 720. The graphical representation 720 represents position information defining a representation of a shape of at least two dimensions. In this example, a triangle shaped is displayed in graphical user interface 712, but other shapes could be used including three dimensional shapes or multi-dimensional shapes. For instance, a manipulation could change the position information represented in graphical representation 720 to define a second representation of a shape (e.g., moving a vertex of an equilateral triangle to produce a right triangle).

The computing device 740 has a computer-readable medium 750 and a processor 742. Computer-readable medium 750 is an electronic holding place or storage for information so the information can be accessed by processor 742. Computer-readable medium 750 can include, but is not limited to, any type of random access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc.

Processor 742 executes instructions (e.g., stored at the computer-readable medium 750). The instructions can be carried out by a special purpose computer, logic circuits, or hardware circuits. In one or more embodiments, processor 742 is implemented in hardware and/or firmware. Processor 742 executes an instruction, meaning it performs or controls the operations called for by that instruction. The term "execution" is the process of running an application or the carrying out of the operation called for by an instruction. The instructions can be written using one or more programming language, scripting language, assembly language, etc. Processor 742 in one or more embodiments can retrieve a set of instructions from a permanent memory device and copy the instructions in an executable form to a temporary memory device that is generally some form of RAM, for example. Processor 742 operably couples with components of computing device 740 (e.g., input and/or output interface(s) 744 and with computer-readable medium 750) to receive, to send, and to process information.

In one or more embodiments, computer-readable medium 750 stores instructions for execution by processor 742. In one or more embodiments, one or more applications stored on computer-readable medium 750 are implemented in software (e.g., computer-readable and/or computer-executable instructions) stored in computer-readable medium 750 and accessible by processor 742 for execution of the instructions. For example, in one or more embodiments, the computer-readable medium 750 comprises instructions for a graphical user interface application 752 for controlling the graphical user interface 712. For instance, the graphical user interface application 752 can control the computing device 740 and/or display 710 to display the graphical representation 720. Alternatively, or additionally, the graphical user interface application 752 can obtain a computer model 754 that predicts a response 730 according to the graphical representation 720. For instance, the shape of the graphical representation 720 can be input to the computer model 754. The graphical user interface application 752 can generate the computer model or receive it from a device in system 700 (e.g., computing device 740 or another device not shown).

A graphical user interface depicting a model response can be referred to as a prediction profiler because the graphical user interface depicts a visual representation of the effect of changing a variable on a response. When the variable is a shape, the prediction profiler can be considered a shape profiler because the computing system is generating a predicted response according to shape information (e.g., from graphical representation 720) input into a computer model. The graphical user interface can be interactive. For instance, the graphical user interface can change input for a model based on movement of a subset of points representing a shape displayed within a graphical user interface. The points can be coordinate points defining the shape within a coordinate system. The subset of points can be moved within an interactive graphical user interface using various tools such as selection devices (e.g., mouses or touchpads), user selection tools in an augmented reality (e.g., hand selection or eye selection), and/or data manipulation (e.g., changing coordinate values within a data table).

The graphical user interface application 752 can be implemented differently (e.g., in multiple applications) and/or can be integrated or communicate with devices supporting other analytic tools. As an example, the graphical user interface application 752 can be integrated with data analytics software applications and/or software architecture such as that offered by SAS Institute Inc. or JMP Statistical Discovery LLC of Cary, N.C., USA. Merely for illustration, the applications are implemented using or integrated with one or more SAS software tools such as JMP®, Base SAS, SAS® Enterprise Miner™, SAS/STAT®, SAS® High Performance Analytics Server, SAS® Visual Data Mining and Machine Learning, SAS® LASR™ SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML®. For example, operations of a graphical user interface described herein could be part of a JMP® add-in or as part of a statistical analysis platform within JMP® itself.

One or more applications stored on computer-readable medium 750 can be implemented as a Web application. For example, an application can be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

In one or more embodiments, fewer, different, and additional components can be incorporated into computing device 740. For instance, in one or more embodiments, there are multiple input devices or computing systems (e.g., one to generate a computer model 754 and one to display a graphical user interface 712). In the same or different embodiments, there are multiple output devices or computing systems (e.g., one to display the graphical representation 720 and one to display response 730). As another example, different interfaces support both input and/or output interface(s) 744. Alternatively, or additionally, the input and/or output interface(s) 744 has more than one input or output interface that uses the same or different interface technology.

In one or more embodiments, a computing system (e.g., the system 700 or computing device 740) implements a method as described herein (e.g., a method shown in FIG. 8).

FIG. 8 illustrates a flow diagram of a method 800. The method includes an operation 801 for displaying, in a graphical user interface (e.g., graphical user interface 712), a graphical representation of position information. The position information defines a first representation of a shape of at least two dimensions. Position information could include coordinate data (e.g., X and Y for two-dimensional shapes, X, Y and Z for three-dimensional shapes, or similar labeling).

The method includes an operation 802 for obtaining a computer model that predicts an initial response according to the first representation input to the computer model. The initial response could be based on the position information or a combinations of multiple input factor types. The computer model could be generated by the computing system or obtained from another computing system.

The method includes an operation 803 for receiving, via the graphical user interface, a manipulation of the graphical representation that changes the position information to define a second representation of the shape of the at least two dimensions. For example, a point on an outline of shape could be moved within a viewer for the graphical representation.

The method includes an operation 804 for generating an updated response according to the second representation input to the computer model. For instance, the graphical user interface could be a shape profiler that displays the updated response in view of the changes to the graphical representation. Shape profilers, as shown herein, are useful for visualizing how a response changes responsive to changes in representations for a shape.

Figure 9:
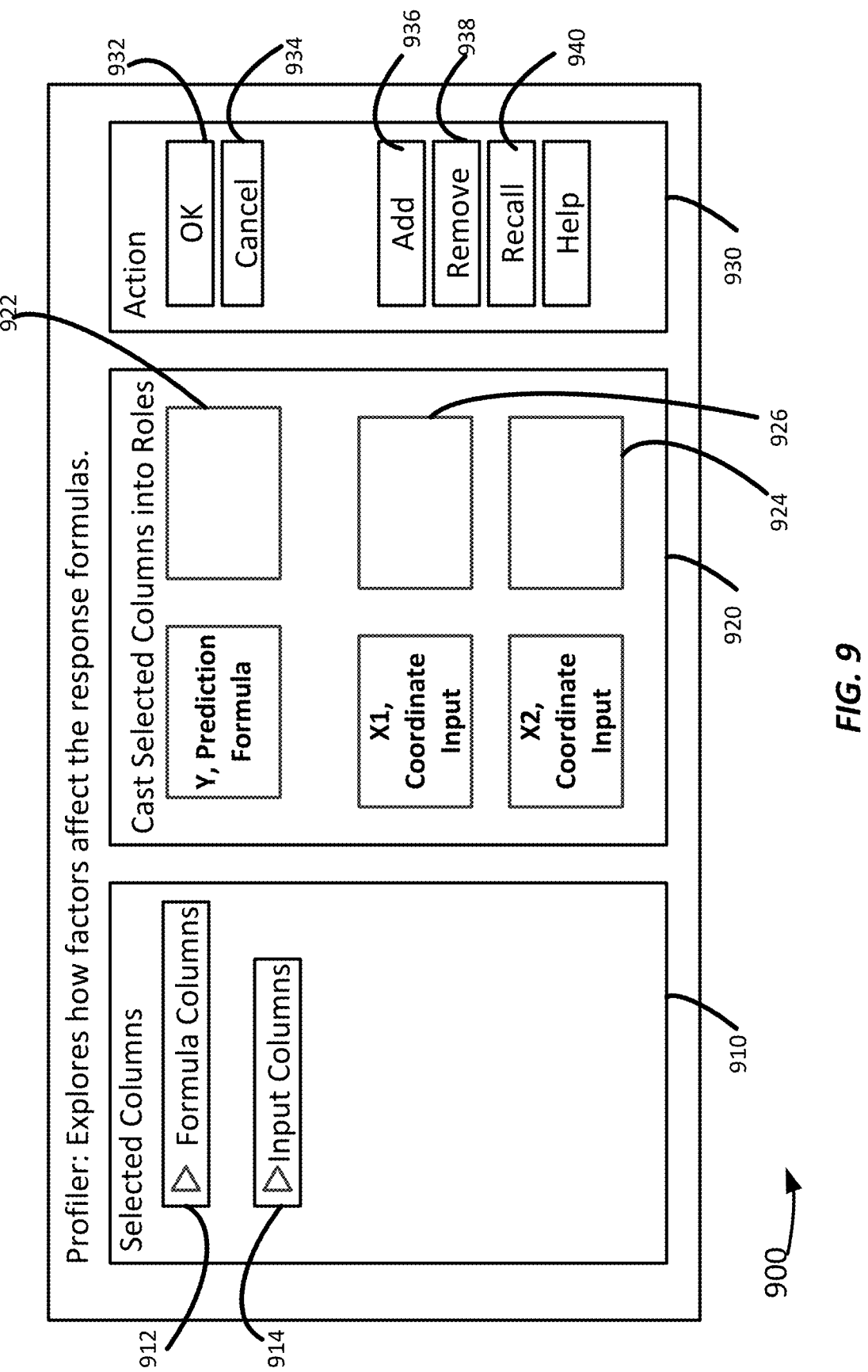
FIG. 9 illustrates a graphical user interface for selecting data for a shape profiler according to at least one embodiment of the present technology.

FIG. 9 illustrates a graphical user interface 900 for selecting data for generating a computer model for a shape profiler. Section 910 allows a user to select data as input for generating a computer model according to available input columns. Section 910 also allows a user to select formula columns for response outputs for training a computer model. Section 920 allows a user to cast selected columns selected in section 910 into particular roles within the computer model. For example, prediction formula column options 912 for a prediction model categorizing a footprint as one of puma or jaguar could be column(s) of data pertaining to a probability of Puma Jaguar=Jaguar, a probability of Puma Jaguar=Puma, and/or a Most Likely Puma Jaguar, and one or more of those response could be selected under formula columns and moved to area 922 to cast that data in the role of Y (or response) for a prediction formula. Input column options 914 could be associated with one or more X inputs (e.g., x, y, and z coordinate inputs, a multivariate input, or additional factors beyond position or shape information). In this example, areas 924 and 926 provide for two coordinate inputs (X1, X2) for a two-dimensional shape.

Section 930 provides action options for generating a computer model. For instance, add control 936 and remove control 938 allow for adding input or output columns into section 920. Control 932 allows for generation of a model based on the selections in section 910 and 920, or control 934 allows for canceling out of moving forward with model generation. Recall 940 allows for recall of previous settings in section 920.

FIGS. 10A-10E illustrate data (e.g., data in columns according to formula column options 912 and input column options 914 of FIG. 9) for generating a computer model with binary response for a shape profiler. The example in these figures relates to images of animal tracks for conservation efforts in helping identify species. The data could be used for other classifications such as to identify gender or to distinguish individual members of a species. Embodiments described herein can also be applicable for other types of data or industries such as other types of processed images where a shape informs the classification of an image by machine learning algorithms. Also, the embodiments are shown with a two-dimensional image merely for example, but the features described can be used for other types of imaging such as three-dimensional images as well or other multiple-dimensional representations as will be shown in other examples herein.

Figure 10A:
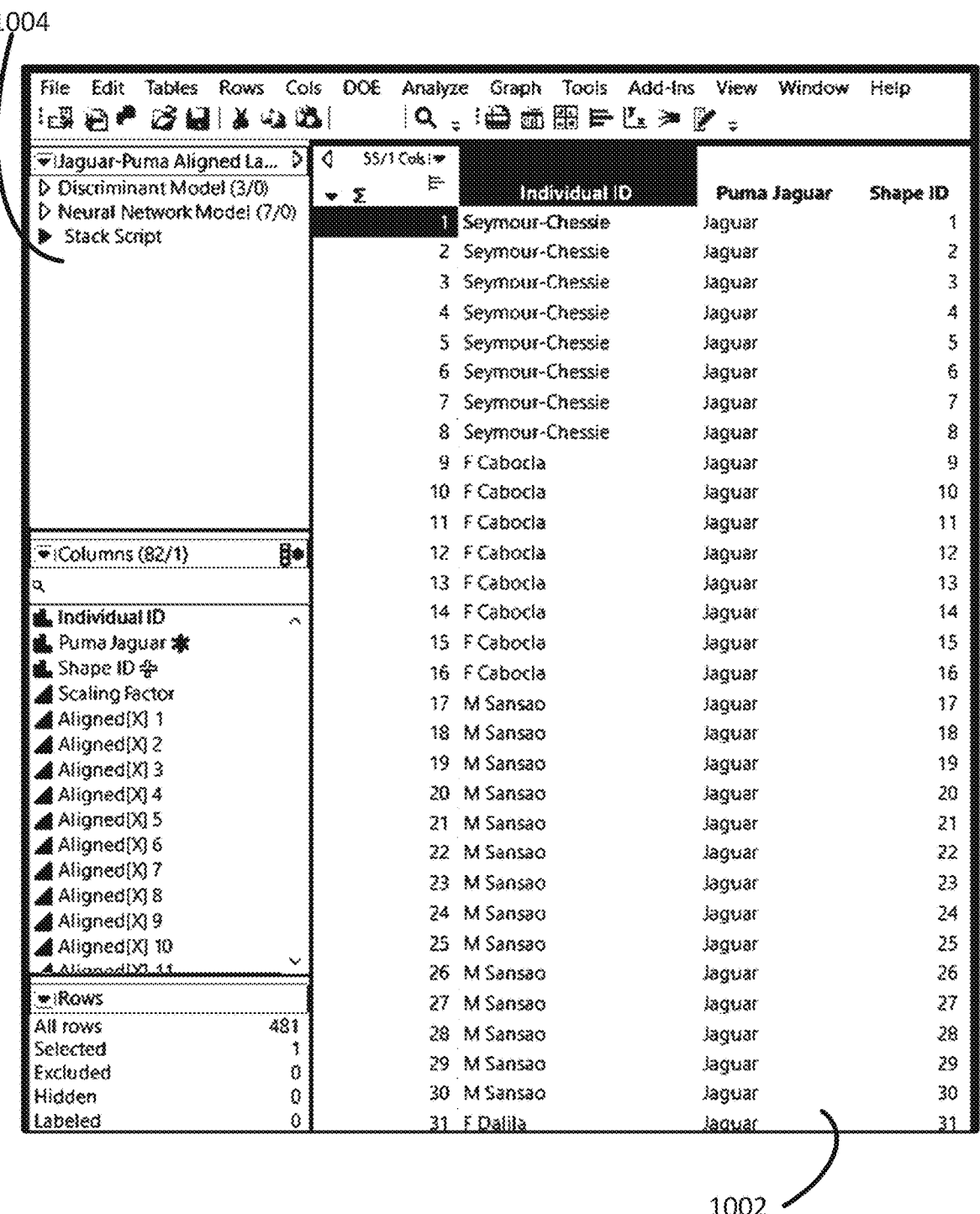

FIG. 10A shows a graphical user interface 1000 displaying a data viewer 1002 for generating a computer model. Panel 1004 provides for selection of different computer models based on the data in data viewer 1002 (e.g., discriminate and neural network models).

FIGS. 10B-10C show representative data from the data viewer 1002 for a computing system to obtain the computer model by training the computer model on multiple objects preclassified into object categories. For instance, FIG. 10B shows a table 1020 of data pertaining to different footprint shapes identified by an id column 1021. Dimensions in an x and y plane are recorded for each of 23 coordinate points for each shape. Representative x and y data for some of the points is shown in columns 1022.

FIG. 10C shows a table 1040 of data pertaining to the different footprint shapes. In this example, the individual animals that left the footprints are known and stored in column 1041. Their species is also known and identified as one of "puma" or "jaguar" in column 1042. The trained computer model trained on the data in FIGS. 10B and 10C according to a neural network gives a probability of classifying the particular shapes into one of two categories. For instance, column 1045 shows the probability of classifying a shape as a jaguar footprint and column 1046 shows the probability of classifying a shape as a puma footprint. Column 1047 shows an overall assessment. Columns 1043 and 1044 show representations of the H1 neurons for a hidden layer between the input and output layer in the neural network. As expected, the computer model should mostly classify the footprints correctly. A computing system can use a validation fold to have test samples of the data for checking the model. Validation column 1048 shows the group assignments for validation. A computing system could perform multiple validation folds.

In some embodiments, computer models can be computed using different mechanisms, and a computing system can select a champion model. For instance, a computing system could generate multiple predictive models and compare predictive model performance for selecting a predictive model. In this example, a computing system also generated a discriminant analysis model and table 1040 shows the canonical values for this discarded model in column 1049.

Figure 10D:
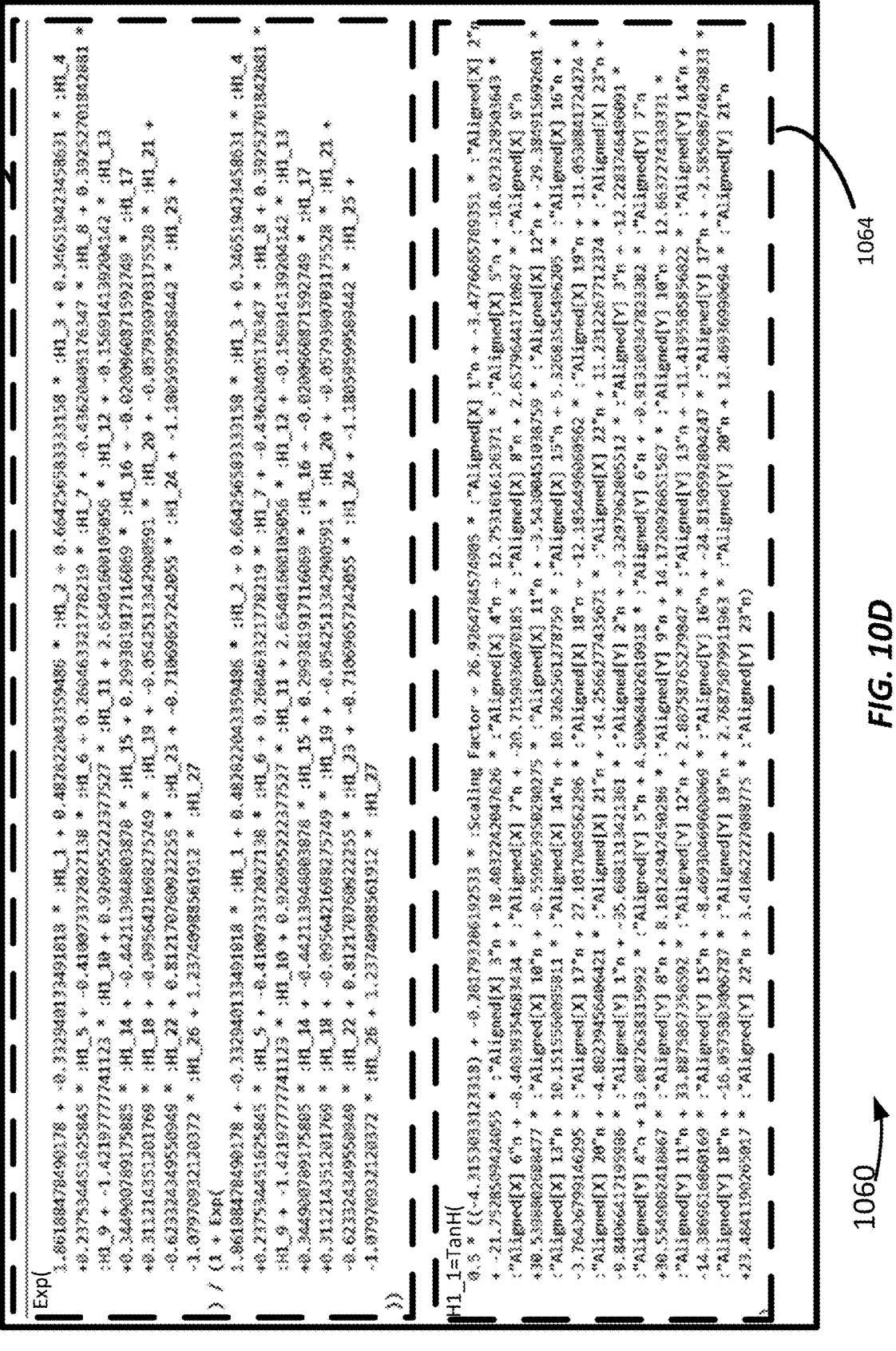

FIG. 10D shows a graphical user interface 1060 of a computer model representation of the neural network generated model based on data in FIGS. 10B-10C. For example, the overall model is expressed according to section 1062 for final probabilities for classifying animal tracks. A computing system can apply this generated model to objects that are not a member of the objects used in generating a model in classifying footprints of unknown animals. For further model exploration, individual hidden layers are expressed in subsequent H1 components for hidden layers of the model. For example, a first H1 component is shown in section 1064.

Figure 10E:
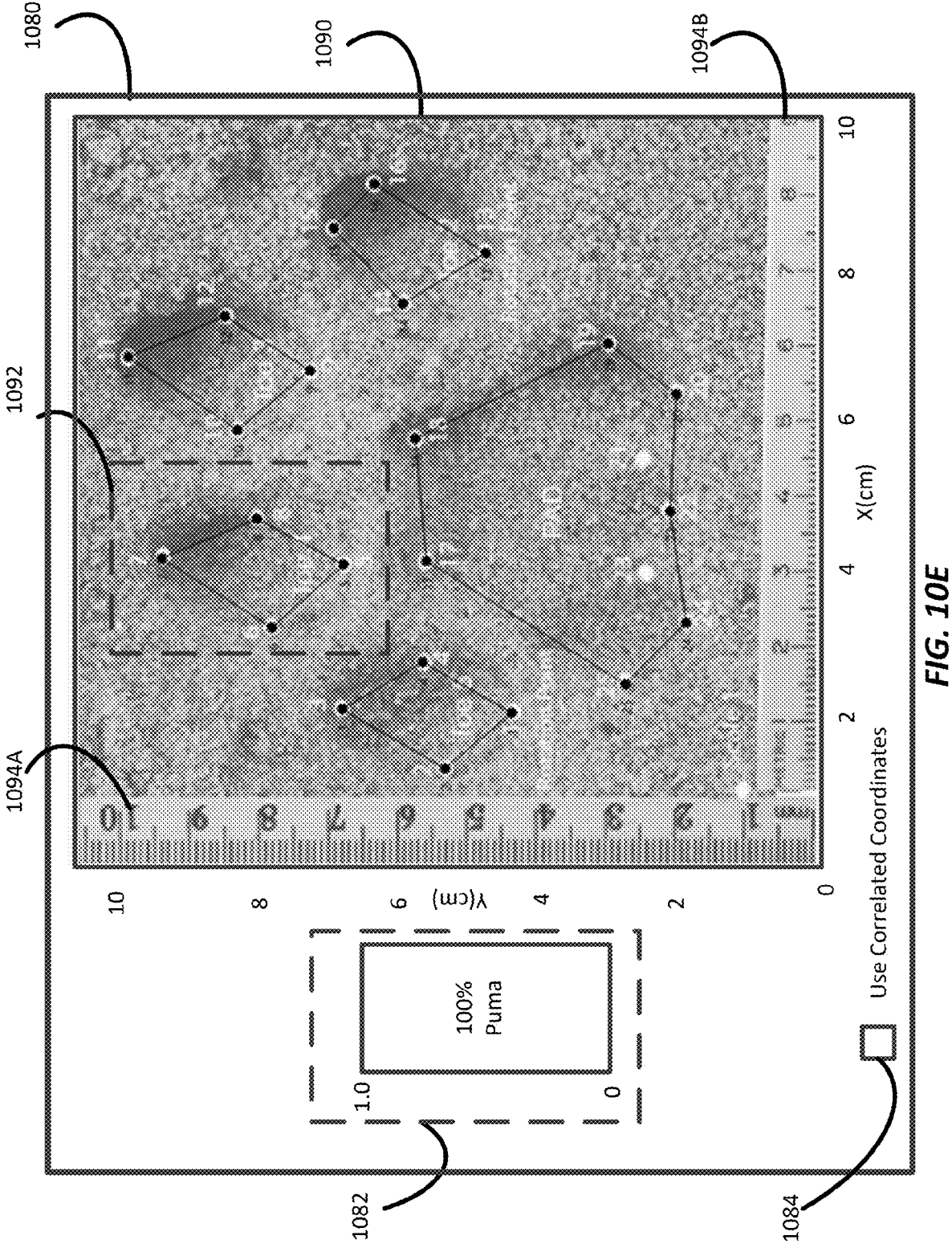

FIG. 10E shows a graphical user interface 1080 for shape analysis on a shape of at least two dimensions (e.g., a footprint found from an unknown animal in a real-world environment). The shape analysis in this example uses a landmark points approach, which are points on the object that help characterize certain features of the shape of the object. The landmark points shown here are applied to a footprint of a puma. As shown, a shape can have one or more components defined by points of the component (e.g., toes and a pad of a footprint). For instance, landmark points of "toe 4" are shown in area 1092. A computing system can store the point locations (e.g., according to a coordinate system) as information or variables.

A computing system can display in a graphical user interface an image representing the object (e.g., graphical representation 1090). For instance, the computing system can receive the image in response to a user adding the image to a graphical user interface, or the computing system can receive an image imported dynamically as part of an image processing process. Using the graphical user interface 1080, a computing system can overlay points onto the image representing position information for a shape in the image. A computing system can overlay points responsive to user input. Alternatively, or additionally, a computing system can detect an object and determine representative coordinate sets for the detected object according to an object template defining landmark features for detected objects. For example, an object template could define mapping for the farthest in each x and y direction for shadowed areas for each of four toes. As shown representative coordinate sets are in graphical representation 1090 and connected to show a shape for a footprint in an image.

A computing system can use references in the image for aligning an image to a reference frame (e.g., of a coordinate reference system). For instance, in this case, rulers 1094 are by the footprint in a captured image. Rulers 1094 can help the computing system align the shape of the detected footprint from the real-world environment. For instance, aligning the shape may include ensuring the scale of the image matches the coordinate system (e.g., the 4 cm point on the ruler 1094A matches the 4 cm point on the Y axis of graphical representation 1090). Additionally, or alternatively, the computing system can rotate the shape, so the footprint sits with toes roughly towards the higher end of the Y axis, and the pad of the footprint sits centered on the X-axis. Alternatively, or additionally, the computing system can reduce translational variation in the shape. One of ordinary skill in the art will appreciate other image processing techniques to align or otherwise prepare a shape for analysis.

A computing system can input points from graphical representation 1090 into a computer model as position information for the captured shape. Graphical user interface 1080 shows the response to the points in section 1082 (e.g., in proximity to the graphical representation 1090). Graphical representation 1090 can be considered an interactive graph in that the points can be manipulated and the response indicator in section 1082 updated. A computing system expresses a response as a probability of a prediction on the type of animal that left the tracks (e.g., a puma). A user of graphical user interface 1080 can drag the points to overlay with the points on the image to cause the computing system to perform real-time predictions on the shape of the image. For instance, changing the points can update the response for the computer model even though the shape of the object shown in the image stays the same. The graphical user interface 1080 can help with improving classification according to the computer model (e.g., an initial mapping and classification performed by a computing system).

Alternatively, or additionally, researches can add points to key features of a map of a shape, then use the map to determine coordinates of those points as variables in analysis. Being able to move the added points and update the response can aid researches in understanding choices in identifying the features.

Other approaches could be used to determine a shape or points of a shape on an image. For example, an alternative approach for a detected object is to use a parametrized curve, where the outline of the shape is traced or outlined at some fixed rate and the coordinates of the trace route or curve at each point in time that are recorded at regular intervals are treated as a function of that time point. For instance, a computing system can apply an outline to a detected object. The computing system can generate and display coordinate sets in a graphical representation for several points along the outline where each coordinate set defines a position for a respective point along the outline within the at least two dimensions. Alternatively, or additionally, the generated coordinate sets could be synthesized points such as taking an average or medium location of points (e.g., to find a center of a "toe 4" in area 1092).

Alternatively, or additionally, a computing system can process an image to align the shapes to a common reference frame or system through a systematic process of moving shapes to the same place (removing translation variation), rotating to the same orientation (removing rotational variation), and/or scaling to the same size (removing scaling variation). What remains should be variation only due to shape. In embodiments, such as imprints, a computing system can process images using traditional image processing techniques or software to match an image map (e.g., to rotate, translate, scale, or remove transformations in an image to match an image map). In FIG. 10C the image is aligned to a common reference frame or system, and coordinates for landmark point are defined for the shape (e.g., in area 1092 the farthest points in each of the coordinate directions for an imprint are marked for a toe 4 position).

With defined coordinates for a shape (e.g., once a computing system completes an alignment process), a computing system can fit a computer model using either the coordinates of the shape directly or some function thereof for displaying a response (e.g., as shown in section 1082). Common techniques include principal component analysis to assess variation in shape or discriminant models to classify shapes into categories.

One advantage of this tool beyond simple exploration of the underlying model is the ability to make predictions from the tool. In short, a user can drag an image into a graph of graphical representation 1090 (after the dimensions have been appropriately set), adjust the points to match those in the image, and then read off the predicted response. A computer algorithm (e.g., a landmark or parametrized curve approach) can enhance a computing system's ability to automate the selection and adjustment of the points in the profiler to match those in the image, allowing for faster predictions. For example, an artificial intelligence algorithm could place the points (e.g., landmark points or parameterized curve points), and a user can do their own validation. Another implementation could have the location of landmark points predicted after setting some (e.g., using an estimated correlation matrix). This would alleviate some of the work of manually placing landmark points but still allow some user control over the placement of points. In graphical user interface described herein, images can be optionally displayed in a graphical user interface (e.g., to fine tune a computing system's assessment of points defining a boundary of a shape).

The graphical user interface 1080 can include other settings for controlling graphical representation 1090. For instance, control 1084 allows a user to correlate coordinates so that if changes occur to one or more points, the computing system can automatically adjust other coordinates. In this example, instead of moving points independent of one another, correlated points are now correlated based on a correlation matrix estimated from the data. Moving one point will cause one or more other points to move as well. This might be desirable in situations where having points move independently does not accurately represent a studied object. If control 1084 is unchecked in this example, the coordinates function as independent coordinates rather than correlated components and moving one point will not adjust the others. Other settings for graphical user interface with shape profilers are described in more detail herein.

Figure 11:
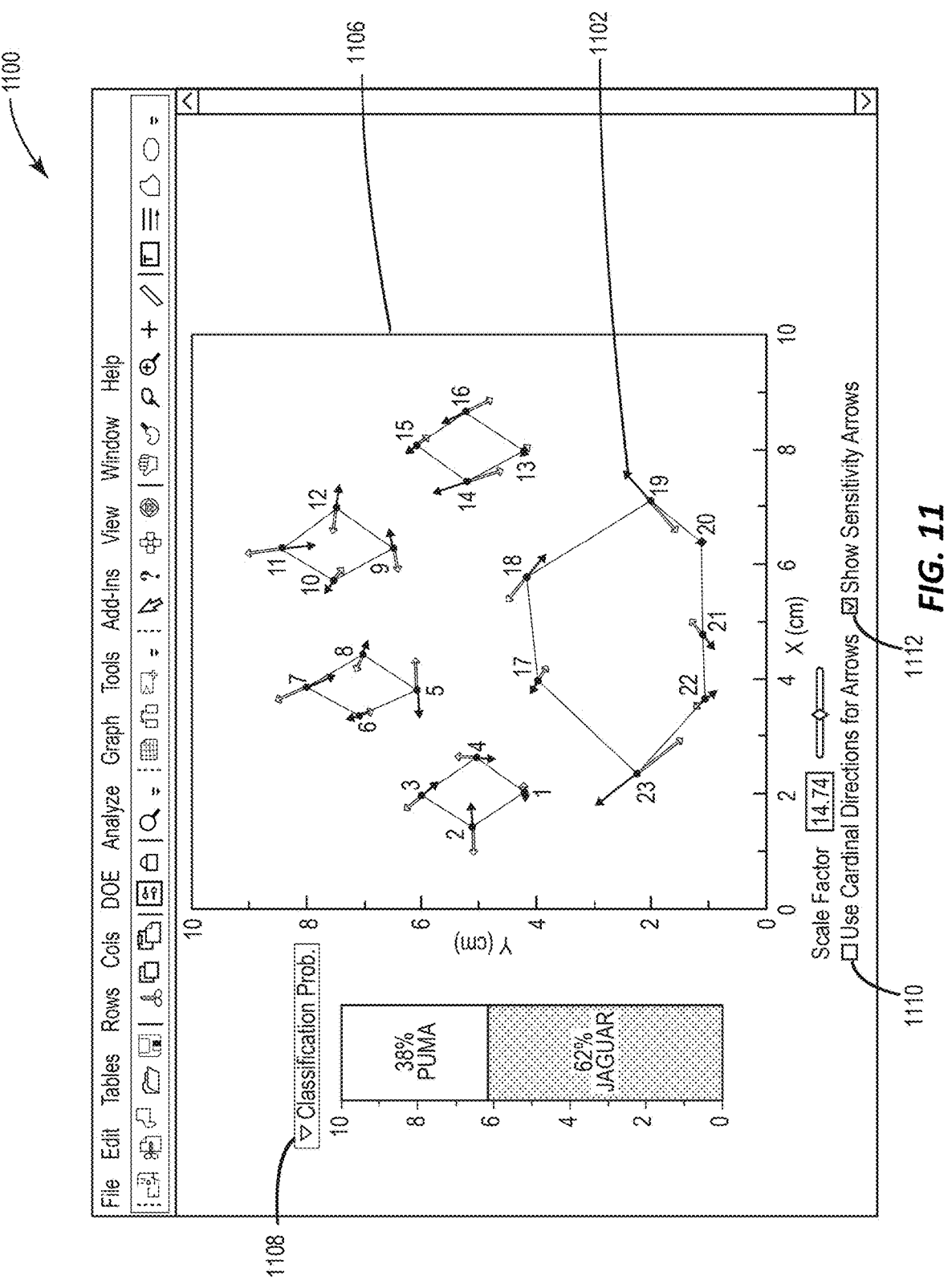
FIG. 11 illustrates a shape profiler with sensitivity arrows according to at least one embodiment of the present technology.

FIG. 11 illustrates a graphical user interface 1100 of a shape profiler. This shape profiler has a viewer 1106 for depicting points of a graphical representation approximating a shape (e.g., position information for key features of a shape) for an object. The object could be a physical object with measurable features defining the shape. As another example, the object could be a represented object such as a simulated object with simulated features defining the shape or an abstract object such as a network representation with abstract features. In this example, the points could be derived from an image (e.g., an image of a physical object or a represented object) as described with respect to FIG. 10E. A response panel 1108 provides a response of a computer model according to the shape. The response panel 1108 is a response indicator consisting of shaded boxes with the probability of falling into a particular category serving as the box label (e.g., white and black boxes). The size of the boxes corresponds to the value of the probability. However, a graphical user interface could depict responses differently (e.g., just displaying a percentage for each category or displaying a single categorization with the highest percentage).

Sensitivity arrows in viewer 1106 (e.g., arrow 1102) can inform how specific changes in a shape affect an outcome in the response panel 1108. Users can interactively explore how changing the shape of an object by manipulating graphical representation 1106 affects the probability of falling into a particular category or some other continuous response as shown in other examples described herein.

The sensitivity arrows are a type of prediction indicator. The sensitive arrows predict an extent of change in response (e.g., as indicated based on size of the arrow and its direction in multi-dimensions). For instance, sensitivity arrows can show a user where to place more emphasis on verifying the location of a point on a shape (e.g., moving a point with a larger magnitude arrow could have greater impact on the response). A computing system can also have threshold settings for prediction indicators (e.g., only displaying arrows above a threshold magnitude). Other examples described herein show other types of prediction indicators.

Graphical user interface 1100 is interactive in embodiments. For instance, the computing system can optionally display an original image or object. In this case no image is shown, but the image can be shown behind the position information of graphical representation 1106 as shown in FIG. 10E. Further, the graphical user interface 1100 is interactive to optionally include prediction indicators. For instance, a user can turn off including sensitivity arrows using control 1112 and/or to minimize the response panel 1108 so that a user can manipulate the key points without seeing their impact on response until after adjustments are made.

A graphical user interface could display prediction indicators differently. For instance, rather than having one sensitivity arrow for each classification response type at each displayed point, arrows could be shown for each dimension of possible change in a point (e.g., using cardinal direction indicators control 1110).

A computing system labels the landmark points of the shape 1-23 in viewer 1106. A computing system could label points differently (e.g., using letters), otherwise denote points, or refrain from labeling points. Users can select a point and drag it around the space, with the response updating contemporaneously in real time. The arrows on the points are sensitivity indicators, which show in a relative sense how much the probability increases of falling in the corresponding color-coded category if the point were moved in the indicated direction. These indicators help users understand how changes in the shape will affect the response through a quick glance. The indicators will change size depending on the location of the points and also update dynamically in real time as one or more points are dragged around the space of graphical representation 1106.

Figure 12A:
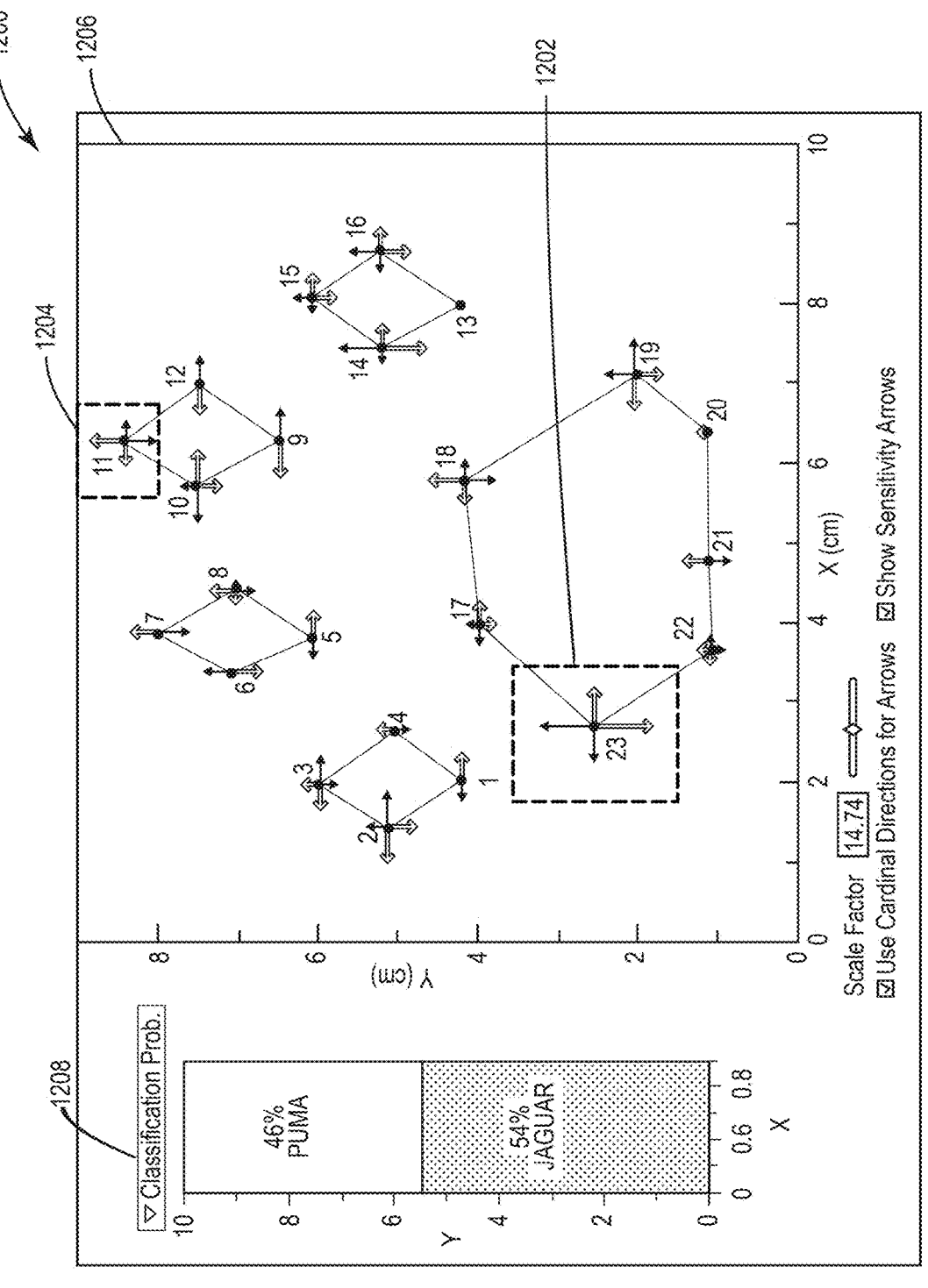
FIGS. 12A-12C illustrate manipulation of a shape in a shape profiler with cardinal direction indicators according to at least one embodiment of the present technology.
Figure 12B:
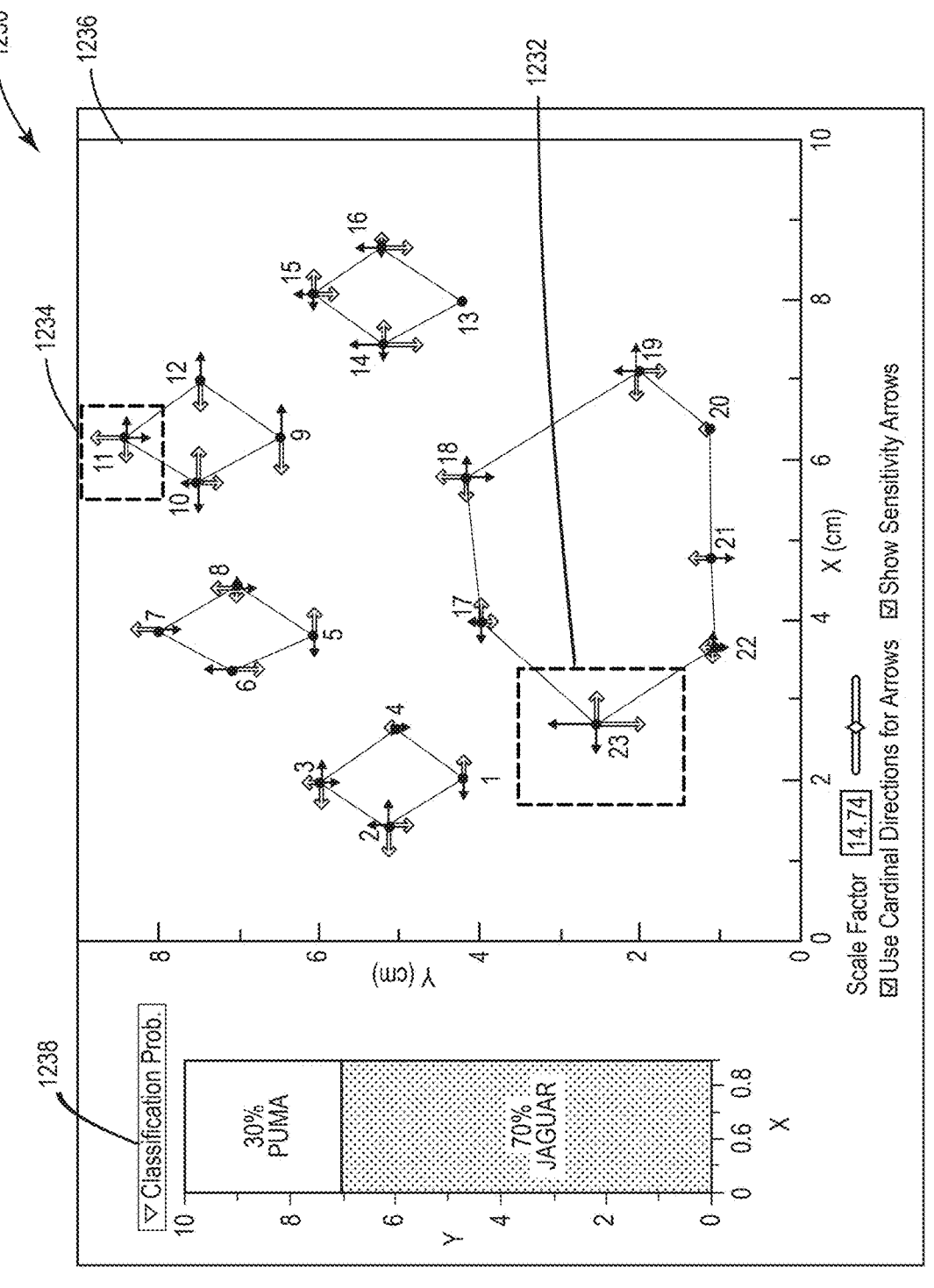
Figure 12C:
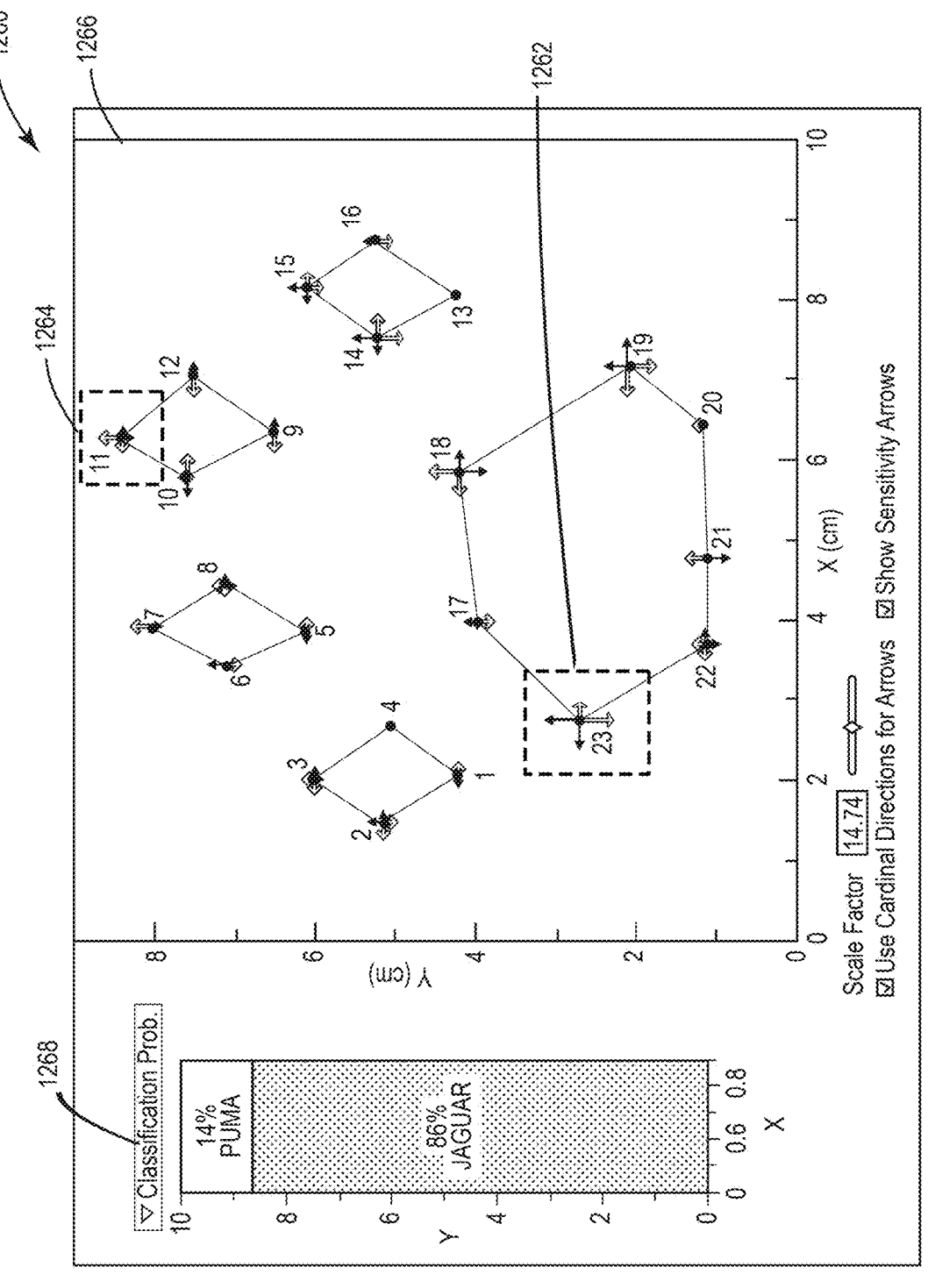

FIGS. 12A-12C illustrate manipulation of a shape in a shape profiler with cardinal direction indicators. In this example, a graphical representation of a shape with key features defined in 23 points labeled from 1 to 23 are shown in a viewer 1206 according to a coordinate system (i.e., specific coordinate sets within an x, y coordinate system). For instance, for point labeled "23" in section 1202, at least one predictor indicator shows changes to each value of a coordinate set corresponding to point labeled "23" (i.e., increasing or decreasing x-value and increasing or decreasing the y-value).

A classification probability viewer 1208 shows a prediction response given the position information of coordinates corresponding to the displayed points of viewer 1206. In this example, there are multiple categorical response types for classifying a paw print corresponding to the key features as defined in the 23 points (i.e., the jaguar and puma categories). For instance, based on the current position information there is a 54% probability that a computing system will classify the paw print represented in viewer 1206 as a "jaguar" and a 46% chance the computing system will classify the paw print as a "puma".

Cardinal direction indicators in the viewer 1206 show users in which cardinal directions moving a point will change the response and give some indication of how much the response will change (e.g., based on the size of the arrow). For instance, in section 1202 for point labeled "23", there are four sensitivity arrows in each of the x and y coordinate directions in proximity to point labeled "23". The magnitude and color of the arrow indicates how changing a particular point will change the response prediction according to the classification probability viewer 1208. For instance, white arrows correspond to a categorical response type for classifying as a "puma" and black arrows correspond to a categorical response type for classifying as a "jaguar".

Each of the points 1-23 are unique positions within the graphical representation of viewer 1206. A computing system can receive a manipulation of the graphical representation by receiving an indication to move one or more of the unique positions (e.g., selecting a point and dragging it within the viewer 1206).

FIG. 12A shows a graphical user interface 1200 with a first representation in viewer 1206 of position information for various points representing a shape of a paw print. Point labeled "23" is a coordinate set of an x-edge feature of the pad of the paw print, and a computing system displays prediction indicators in proximity to it. According to the cardinal direction indicators in section 1202, moving the point labeled "23" to an increased y position would change the initial response predicting a 54% likelihood to classify as jaguar to increase the percentage of likelihood to classify as jaguar. Other predictor indicators in the viewer 1206 can change also in response to a change in a position of another point. For instance, changing point labeled "23" can cause a change in section 1204 corresponding to point labeled "11".

FIG. 12B shows an updated graphical interface 1230 after moving point labeled "23" in section 1232 of viewer 1236 even a small amount to increase the y coordinate value for the point labeled "23" such as moving from (2.36, 2.35) to (2.36, 2.37). While the predictor indicators in section 1232, corresponding to this point labeled "23" have not greatly changed in response to a manipulation of the graphical representation in viewer 1236, the predictor indicators in section 1234 corresponding to point 11 are beginning to shorten in magnitude indicating changes in this point are beginning to become less relevant to the classification response given the changes to the point labeled "23". The response in classification probability viewer 1238 also shows an increased probability of classification of jaguar according to this change compared to the probability viewer 1208 in FIG. 12A.

FIG. 12C shows a graphical user interface 1260 with a viewer 1266 with point labeled "23" moving even more in the direction of a greater y value to a point that is beginning to affect the magnitude of the predictor indicators in section 1262 of updated viewer 1236 such as moving from (2.36, 2.39). The response in classification probability viewer 1268 shows an increased probability of classification of jaguar according to this change, such that it is almost certain a computing system would classify the paw print as a jaguar. Also in response, the predictor indicators shown in section 1264 have shortened considerably to the point that almost any change of that point will not make a meaningful change in a classification of a paw print.

Being able to view the dramatic impact of very small changes on classification can help in fine-tuning classification for paw prints. Indeed, these changes in point locations are so small it is difficult to even visually see a change in location, but these small changes have a big impact on the response. This is especially true in cases like FIG. 12A where the paw print started out with such nearly even odds for classifying as a puma or jaguar as to be in danger of being an ambiguous response. Understanding how the shape impacts the response can also help users or computing systems focus efforts on correcting the most impactful features of a shape. For instance, point labeled "13" in each of FIGS. 12A-12C was insignificant enough to the computer model as to not show meaningful prediction indicators in any of the graphical user interfaces.

Figure 13A:
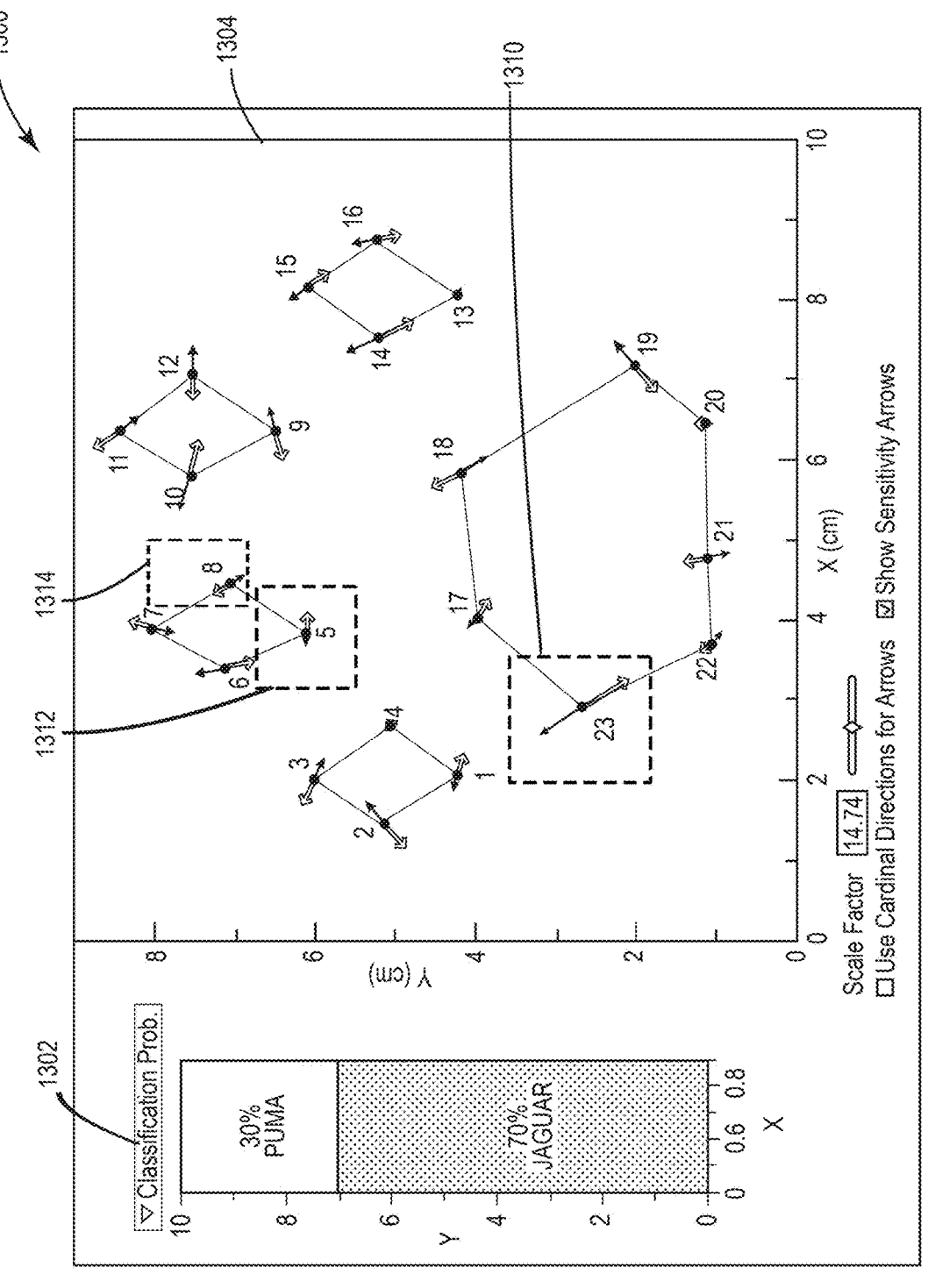
FIGS. 13A-13B illustrate manipulation of a shape in a shape profiler with sensitivity indicators according to at least one embodiment of the present technology.
Figure 13B:
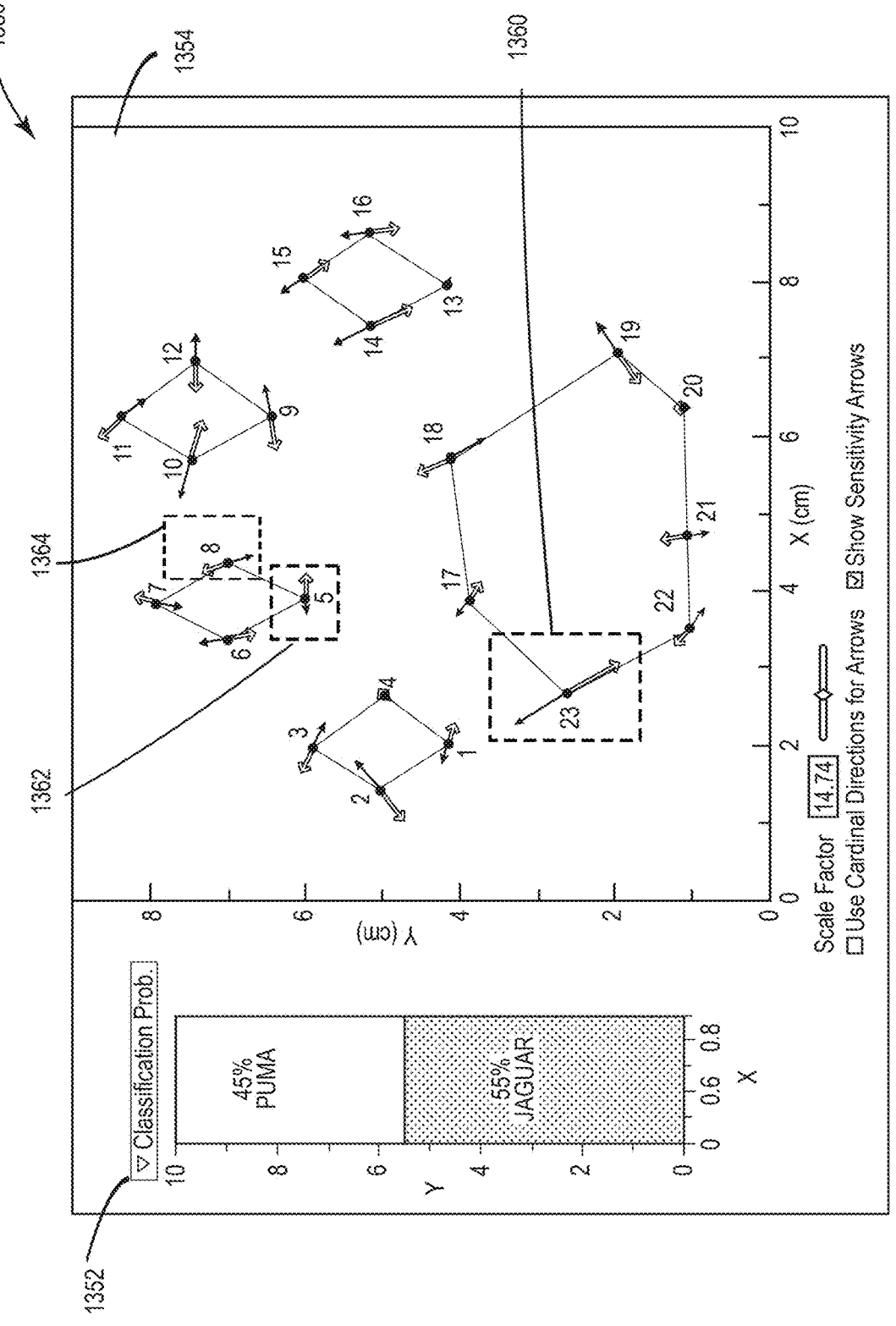

FIGS. 13A-13B illustrate manipulation of a shape in a shape profiler with sensitivity indicators according to at least one embodiment of the present technology. In FIG. 13A, the graphical user interface 1300 has a viewer 1304 for viewing a shape and a classification probability 1302 for viewing the response according to a shape. Each coordinate point in viewer 1304 has only two arrows, one for each possible classification in classification probability 1302. Viewer 1304 is interactive as in other examples with cardinal directions for prediction indicators. For instance, point labeled "23" in area 1310 can be moved and the sensitivity areas affected in other areas of viewer 1304 (e.g., area 1312 for point labeled "5" and area 1314 for point labeled "8"). FIG. 13B shows an updated graphical user interface 1350 in response to moving point labeled "23" shown in area 1360 (e.g., to move the point to a lower value X coordinate spot). Responsive to this manipulation, a computing system increases the magnitude of sensitivity arrows at point labeled "5" in area 1362 to have increased magnitudes. Additionally, the computing system adjusts the directionality of sensitivity arrows at point labeled "8" in area 1364.

In one or more embodiments other factors in addition to shape can contribute to the response such as the scale, rotation, or translational variance for the position information. The computing system can provide an initial estimate for these factors (e.g., described with respect to FIG. 10E). However, in embodiments, a graphical user interface can allow a user to adjust these factors as well.

Figure 14A:
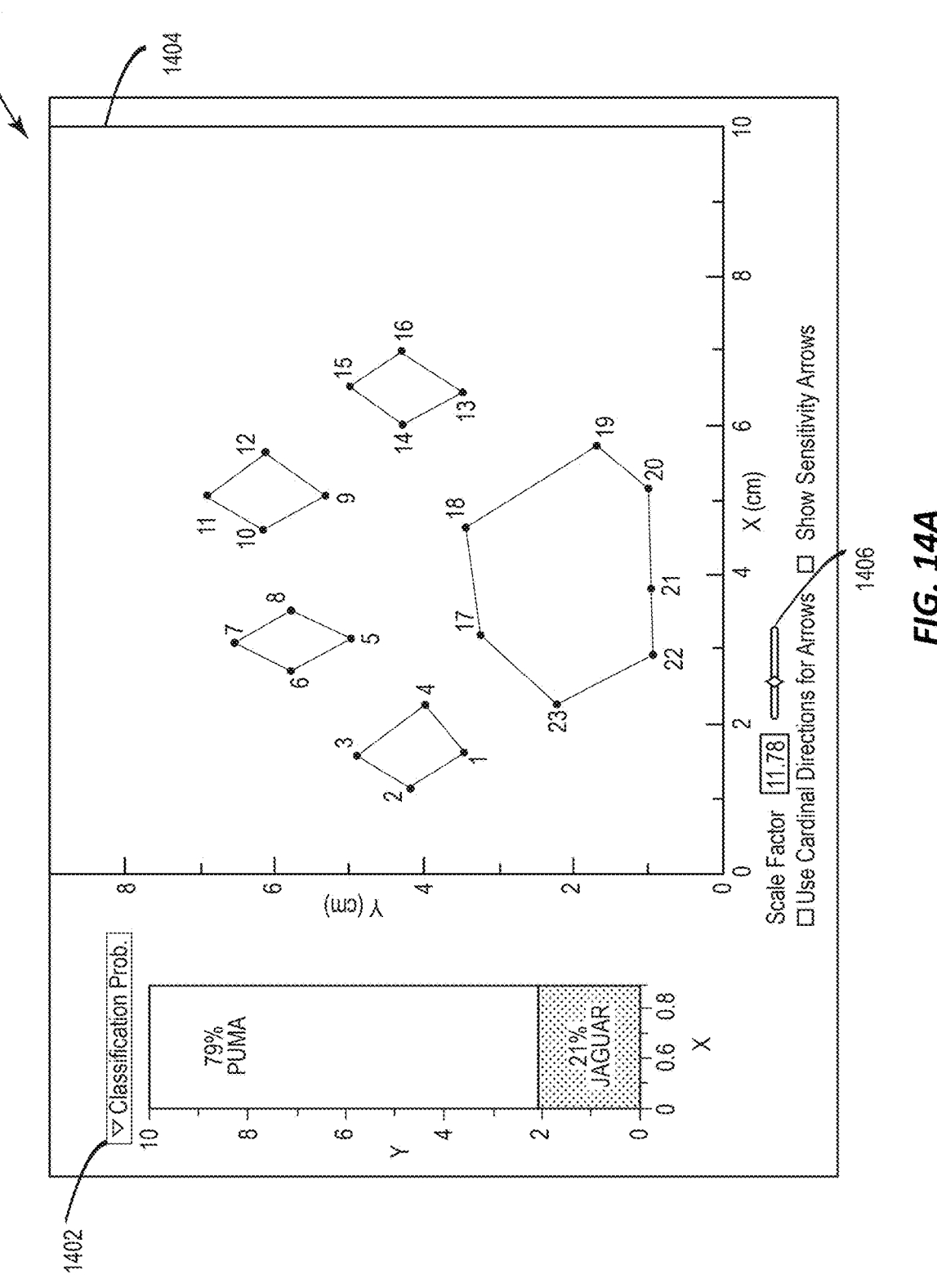
FIGS. 14A-14B illustrate scale factor manipulation in a shape profiler according to at least one embodiment of the present technology.
Figure 14B:
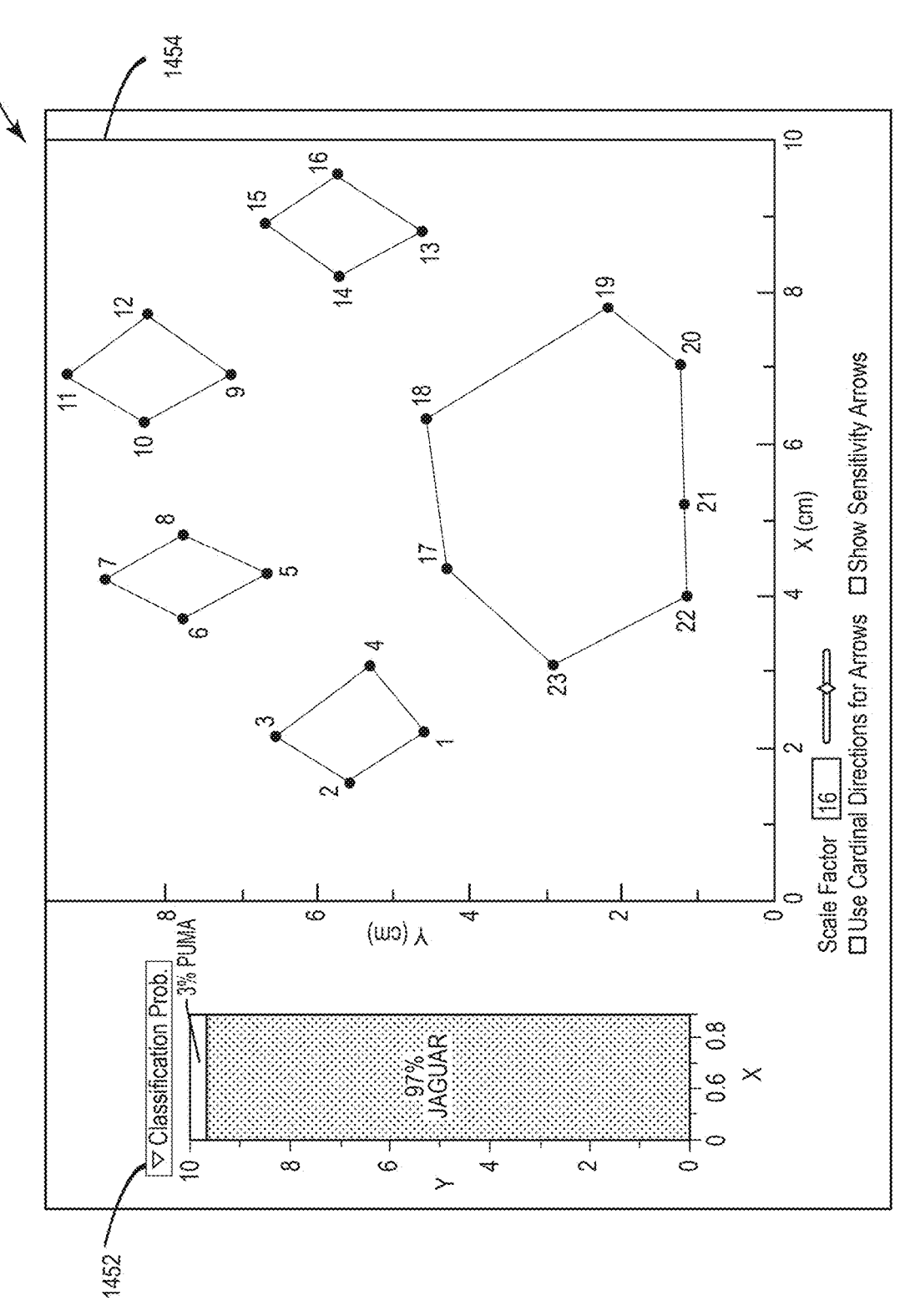

FIGS. 14A-14B illustrate scale factor manipulation in a shape profiler. FIG. 14A shows a graphical user interface 1400 with a control 1406 for adjusting the scale factor. In this example, the control 1406 is a slide with associated editable textbox that allows a user to slide the scale along a range or edit the textbox. Viewer 1404 shows the resulting image. The scale value in FIG. 14A is less than the scale value in FIG. 13A, so the shape in viewer 1404 of FIG. 14A appears smaller than the viewer 1354 in FIG. 13B. The change in scale affects the response predictions. For instance, the prediction according to classification probability viewer 1352 in FIG. 13B shows a prediction of jaguar for the footprint of scale 14.74. In contrast, the classification probability viewer 1402 in FIG. 14A shows an updated response prediction of puma for the footprint of scale 11.78. FIG. 14B shows instead increasing the scale in graphical user interface 1450 causes the updated response to make a jaguar prediction more likely as shown in classification probability viewer 1452. Viewer 1454 shows the enlarged shape representing the footprint with a scale factor of "16". Accordingly, computer models used by a computing system can account for factors other than shape factors. In addition to scale, a computer model could include time, individual, or index factors (e.g., if several footprints were taken all associated with the same animal).

In the examples shown in FIGS. 14A-14B, the categorical response type classifies a shape (i.e., of a footprint) into different object categories (such as jaguar footprint or puma footprint) by assessing a likelihood of a shape being a particular one of multiple object categories (i.e., a jaguar or a puma). As shown here, sometimes when the computing system updates the response, it changes the classification of the shape. For instance, as shown in panel 1402 of FIG. 14A, the most likely classification for the footprint in viewer 1404 is of "puma". However, in panel 1454 of FIG. 14B, the most likely classification for the footprint in viewer 1454 is of "jaguar".

Figure 15:
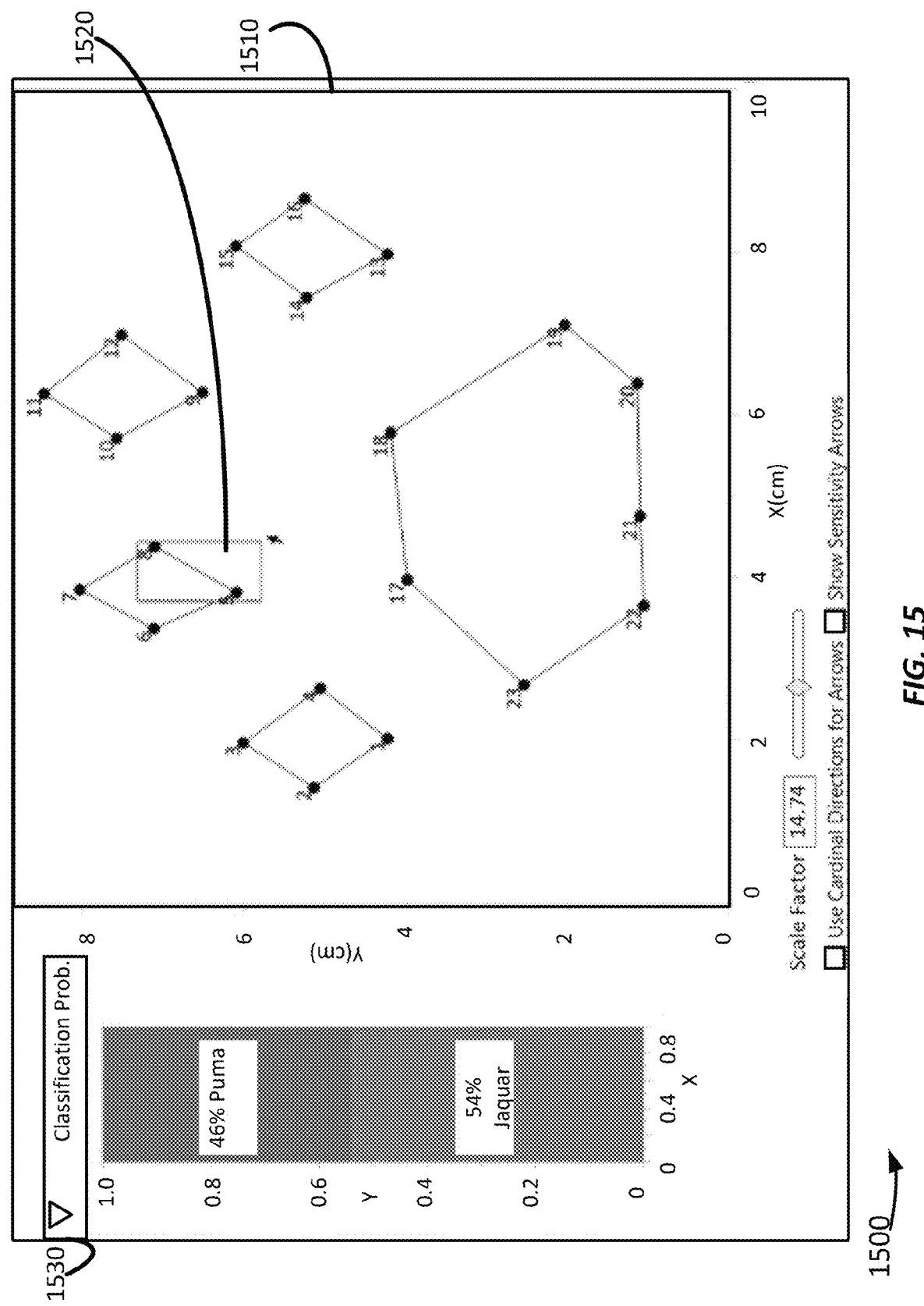
FIG. 15 illustrates multi-point manipulation of a shape in a shape profiler according to at least one embodiment of the present technology.

In embodiments, a user can move points as part of a correlated set. FIG. 15 illustrates multi-point manipulation of a shape in a shape profiler in graphical user interface 1500. In this example, a graphical representation depicts unique positions represented by numbered points in viewer 1510. A cursor selects multiple points in selection area 1520, and then the selection area 1520 can be used to move a set of unique positions within the graphical representation (i.e., points of selection 1520). For instance, depending on computer settings, moving point labeled "5" to a user-defined coordinate set location could cause the computing system to generate, responsive to the manipulation, updates to other coordinate points (e.g., point labeled "8") in a coordinated way. For instance, the computing system could generate a new coordinate set for point labeled "8" to maintain a similar response as shown in response panel 1530. Alternatively, a computing system could move the new coordinate set within the viewer 1510 in a similar direction (e.g., to increase the x and y values of the coordinate set by the same amount for points labeled "5" and "8"). Regardless of how the correlated coordinate sets are manipulated, the computing system could generate an updated response according to the computer model, the user-defined coordinate set, and computer-generated coordinate set.

A computing system could select points in other ways (e.g., in response to user input individually selecting points to include in a correlated set). Alternatively, a mapping or correlation matrix of key features could define points that are correlated. For instance, points of toes of a footprint could all be correlated according to the mapping so changes in one point of the toe would affect changes in others. This could be useful when exploring changes to enlarge or reduce a component of a detected object (e.g., individual toes or a pad of a footprint).

Figure 16A:
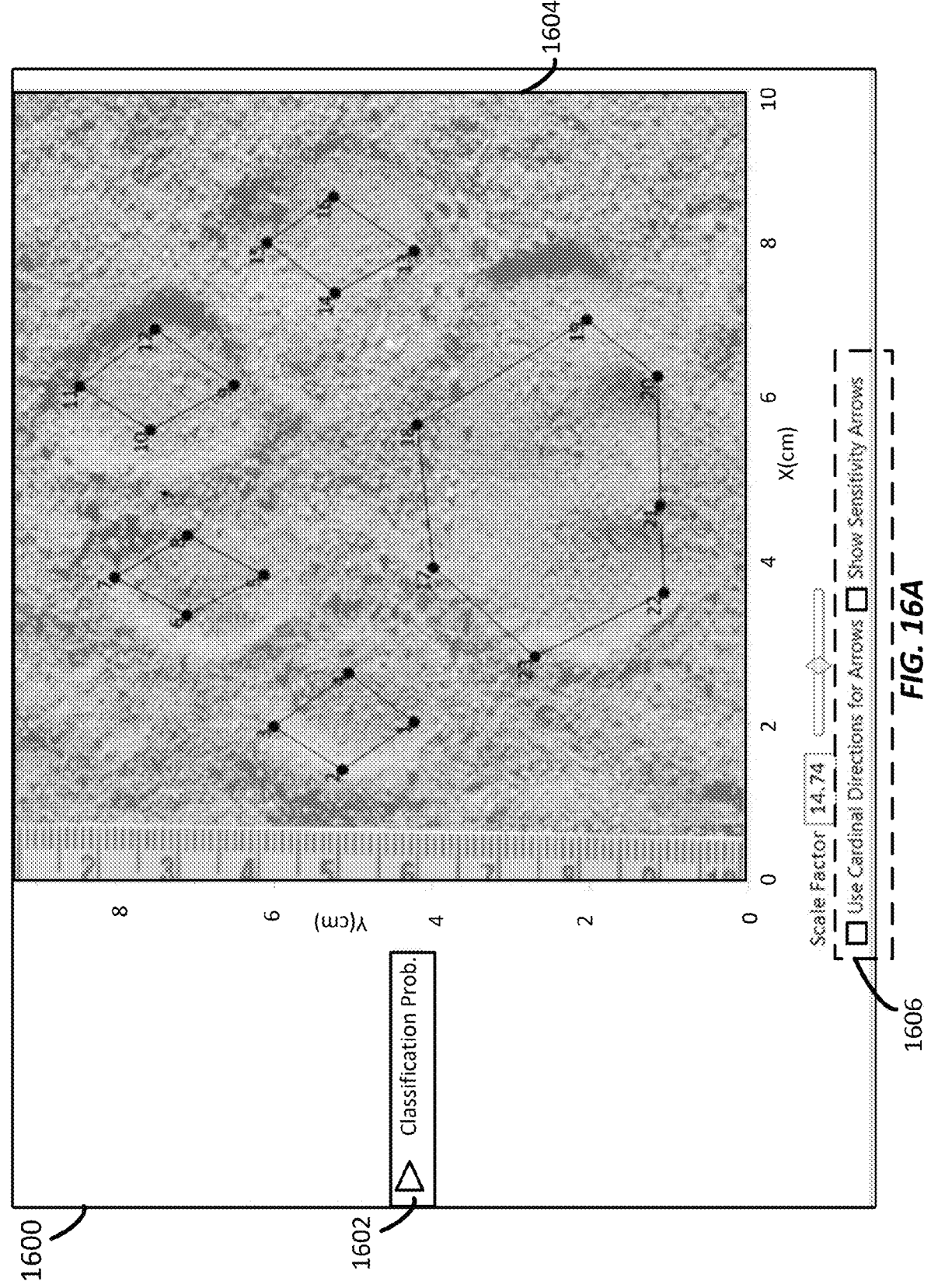
FIGS. 16A-16C illustrate image manipulation in a shape profiler according to at least one embodiment of the present technology.
Figures 16B, 16C:
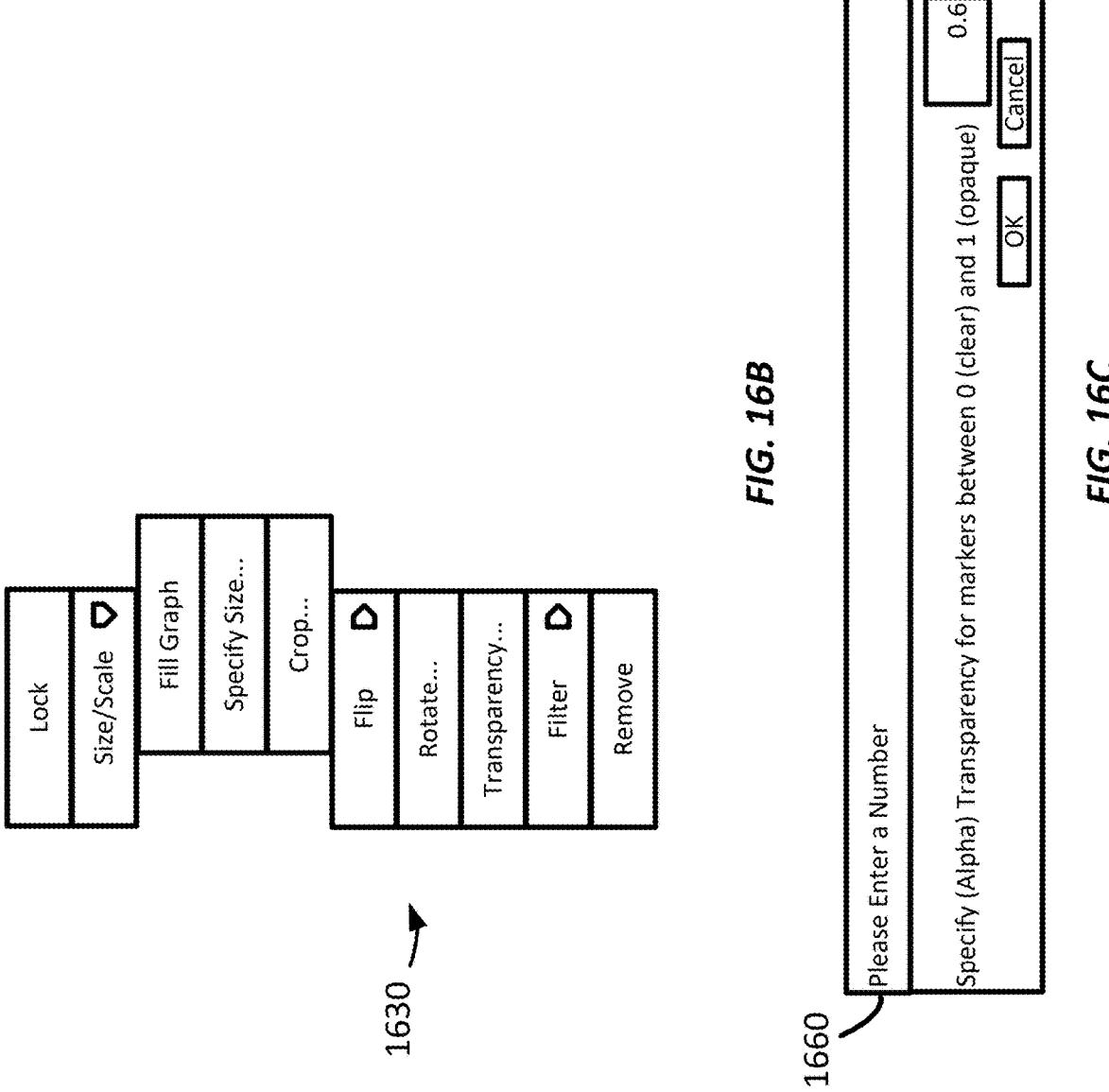

In one or more embodiments, it can be helpful in moving points to see an original image related to the position information. FIGS. 16A-16C illustrate image manipulation in a shape profiler. For instance, FIG. 16A shows a graphical user interface 1600 with an image of a footprint within the viewer 1604. The classification probability viewer 1602 is closed so that a user of the graphical user interface 1600 will not be influenced by the updating response in moving points representing a shape in viewer 1604. Here the user can select points to adjust based on the image under the points. For instance, manipulations may move points out to better align with the edges of the footprint without regard to how this impacts the response. When the user has completed the manual manipulations within the viewer 1604, a user can select to open the viewer 1602 to reveal the updates in response based on the user's changes. Alternatively, or additionally, the user can display prediction indicators (e.g., cardinal directions or sensitivity arrows) for making manual adjustments (e.g., using one or more controls in area 1606).

To better enable placement or movement of coordinate sets to capture the shape in an image, a computing system can receive image instructions (e.g., based on user input). For instance, FIG. 16B shows options 1630 for locking an image location, adjusting the size or scale of an image, changing the orientation of an image (e.g., by flipping or rotating the image), changing the transparency of the image, or filtering unwanted aspects of the image. The image can also be removed to select a new image for analysis.

Selecting an option can open additional windows in a graphical user interface for editing an image in a graphical user interface (e.g., graphical user interface 1600 of FIG. 16A). For example, FIG. 16C shows a window 1660 for setting the transparency on a scale of 0 for a clear image to 1 for an opaque image in viewer 1604 of FIG. 16A). Adjusting the transparency of an image may make it easier for a computing system or user of a graphical user interface to notice edges of an object depicted in an image. Adjustments like changing the size, scale, or orientation of a shape can also help a computing system align an image to a reference frame or system.

Example graphical user interface and computing systems can provide classification for greater than binary options. FIGS. 17A-17C illustrate data for generating a computer model with multiple responses for a shape profiler. FIG. 17A shows a graphical user interface 1700 displaying a data viewer 1702 for generating a computer model. Panel 1704 provides for selection of different computer models based on the data in data viewer 1702 (e.g., neural network models and models generated by the shape profiler). Panel 1704 also allows view of the correlation matrix for correlated points in the shape as described herein.

FIGS. 17B-17C show representative data from the data viewer 1702 for a computing system to obtain the computer model by training the computer model on multiple objects preclassified into object categories. For instance, FIG. 17B shows a table 1720 of data pertaining to different footprint shapes of known species. The species are identified in a species column 1721 and the particular footprint shape is identified by a shape identification column 1722. In this example, there are more than two species possible, and response options show different species options such as Rr, Mr, Sa, M min, Mm. The scaling applied to each footprint after image collection is shown in scaling factor column 1723. Dimensions in an x and y plane are recorded for each of 7 points for each shape. Representative x and y data for some of the points is shown in columns 1724 after rotation of the shape. In this example, a computing system generated a model using a neural network, and representative H1 values are shown in columns 1725 for neurons in a hidden layer of the neural network.

FIG. 17C shows a table 1740 of data pertaining to responses for different footprint shapes. Species columns 1721 and shape identification column 1722 from FIG. 17B are included for reference. The trained computer model gives a probability of classifying the particular shapes into multiple different species (e.g., in probability columns 1741). Validation folds are used to have test samples of the data for checking the model. The group assignments for different validations are shown in validation columns 1742.

Figure 18A:
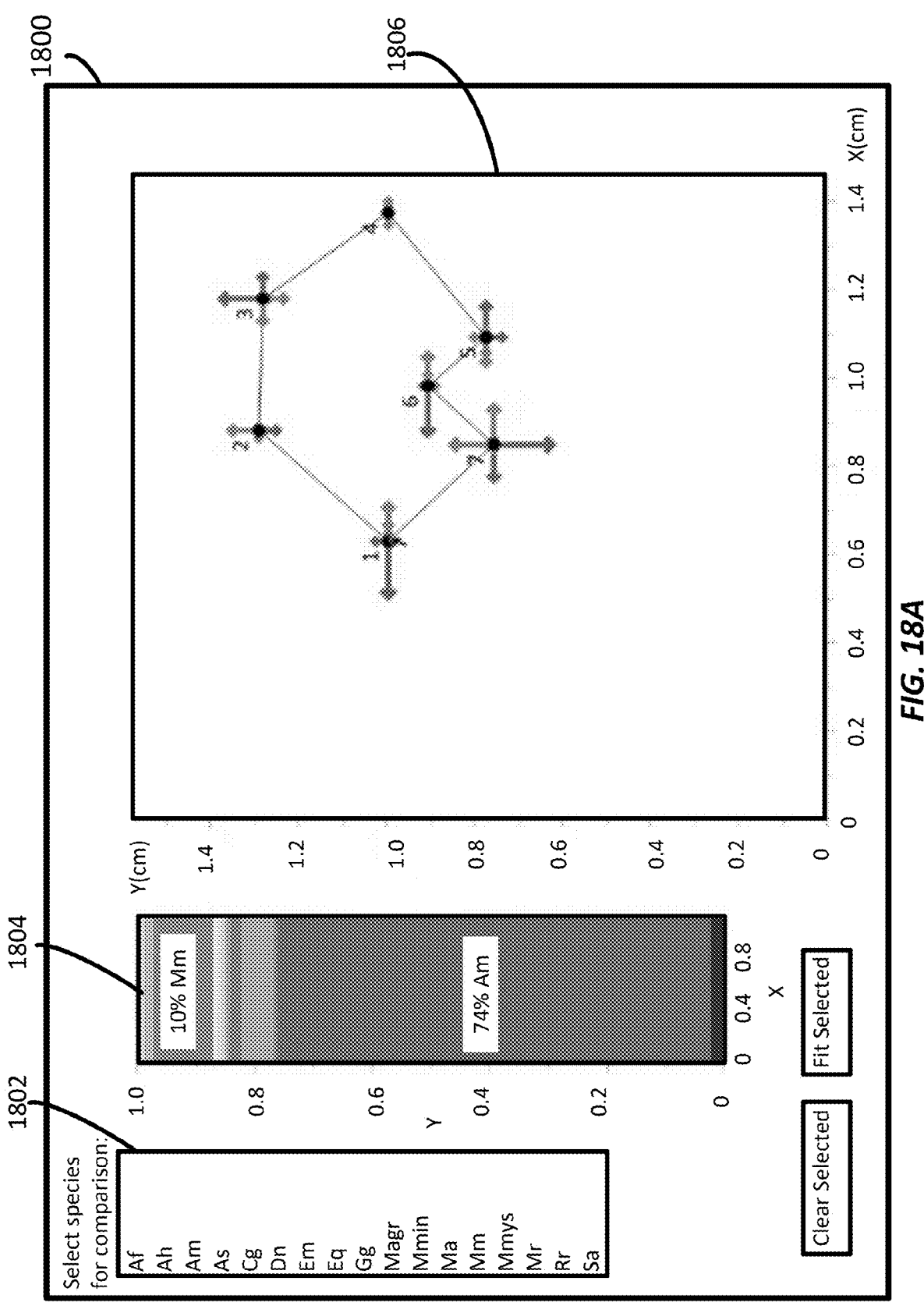
FIGS. 18A-18D illustrate manipulation of response options in a shape profiler for a multi-response computer model according to at least one embodiment of the present technology.

FIGS. 18A-18D illustrate manipulation of response options in a shape profiler for a multi-response computer model according to a computer model trained based on the data shown in FIGS. 17A-17C. FIG. 18A shows an example graphical user interface 1800 where there are many possible response types for a given shape. In this example, there are 17 possible animal classifications for a paw print shown in panel 1802. Response viewer 1804 shows output probabilities according to a shape in viewer 1806. For instance, a species "Am" has the highest probability of having left the paw print in viewer 1806.

Figure 18B:
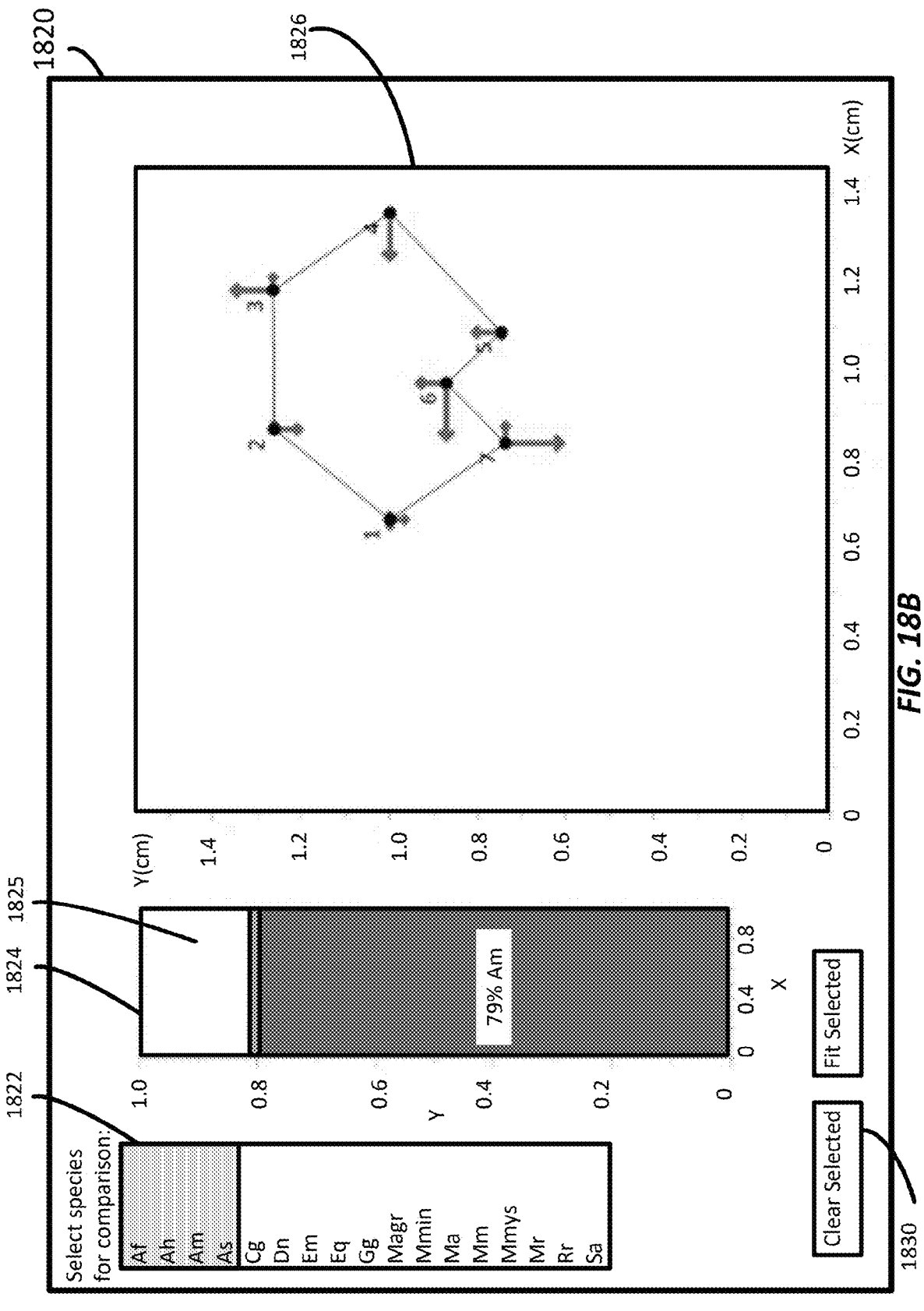

FIG. 18B shows in graphical user interface 1820 selecting particular species in panel 1822 to focus on for classifying (e.g., species of type "Af"-"As"). By selecting the subset of response types, panel 1824 dynamically updates to display predictions relevant to that subset. A portion 1825 in white of the panel 1824 is reserved for other species that were unselected. In other embodiments, the predictions shown in panel 1824 could be rescaled to not include an "other" category. Additionally, the viewer 1826 updates to display prediction indicators that correspond to the selection of the subset of response types. Here, species "Am" is the most likely classification and blue arrows in proximity to coordinate sets corresponding to key features of the paw print show that moving point in certain directions would increase the likelihood of that classification. Sometimes the magnitude of a prediction indicator corresponding to a particular response is so high it can obscure arrows of much smaller magnitude. For instance, even though viewer 1826 is displaying prediction indicators for four different species, prediction indicators corresponding to "Am" response dominate in viewer 1826.

Figure 18C:
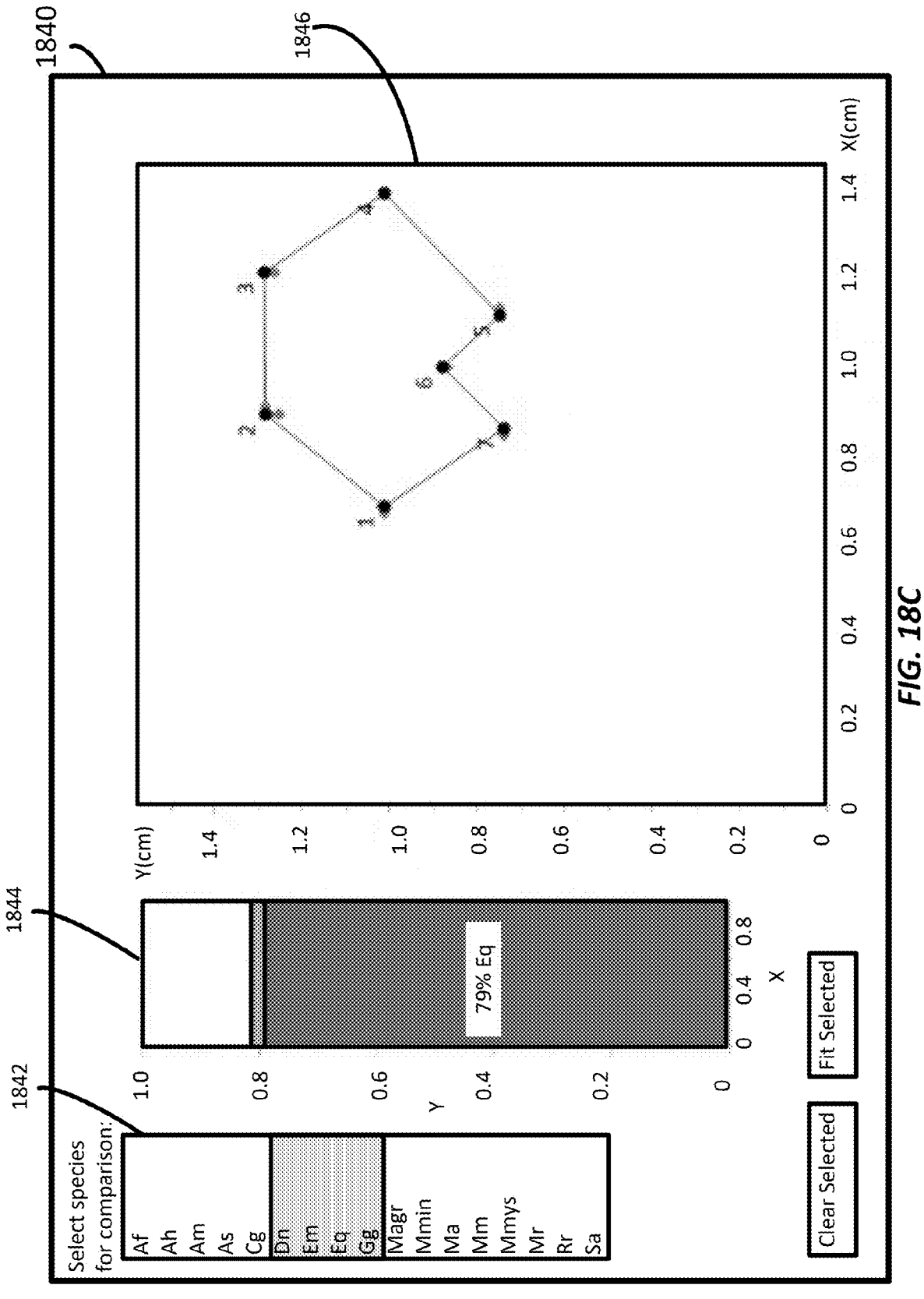
Figure 18D:
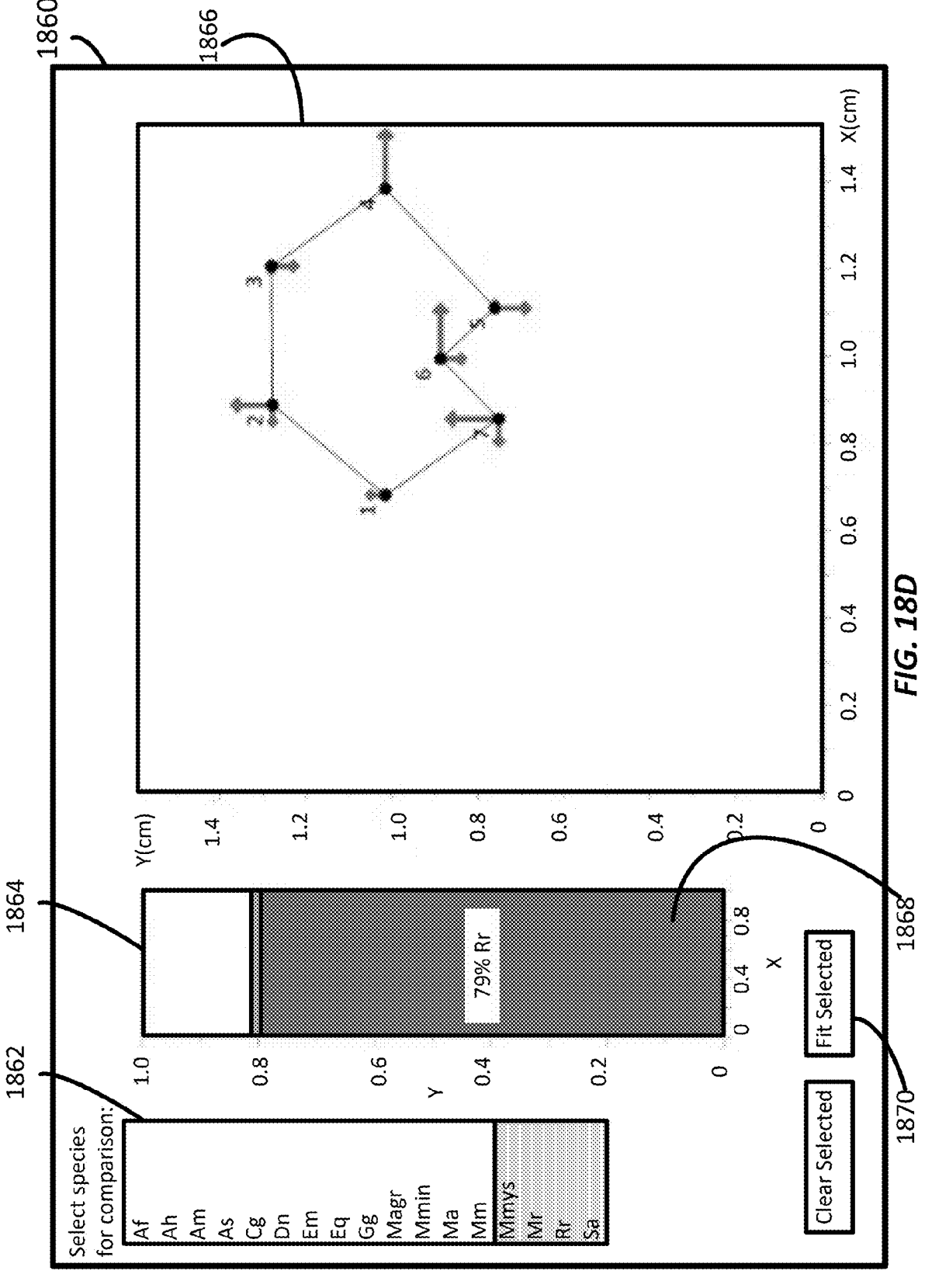

The computing system can remove all response selections responsive to selecting control 1830 or in response to selecting individual responses in panel 1822 to remove. FIG. 18C shows new selections made in a graphical user interface 1840 for responses in panel 1842. In FIG. 18C, panel 1844 shows with this new updated subset of species, species "Eq" is the most likely. However, as shown moving the points in viewer 1846 would increase other species prediction (even ones of so small a percentage they do not appear visually in panel 1844 (i.e., a species corresponding to a red color). FIG. 18D shows a different selection of species in panel 1862 of graphical user interface 1860. Even though panel 1864 shows "Rr" species is most likely, viewer 1866 shows prediction indicators for increasing the likelihood of a species corresponding to a "green" prediction indicator.

In embodiments, an individual response or prediction indicator can be selected for the computing system to generate a computer-generated manipulation of the graphical representation to achieve the updated response. For instance, in FIG. 18D, selecting area 1868 in panel 1864 and selecting control 1870 to "fit selected" can adjust one or more points in viewer 1866 to achieve a certain threshold probability according to computing settings. For instance, the computing system can increase the probability to 80% for Rr though minimum changes of position information according to a computing algorithm. Alternatively, or additionally, certain prediction indicators could be selected so that the computing system can adjust particular points to achieve a highest probability given the direction of particular prediction indicators.

In the example shown, being able to identify species from footprint images accurately using a shape profiler can be a simple but effective non-invasive tool in monitoring endangered species for conservation purposes. However, this is but one use of the computing systems and graphical user interfaces described herein. For instance, embodiments are applicable to analyzing objects of more than two dimensions.

Figure 19:
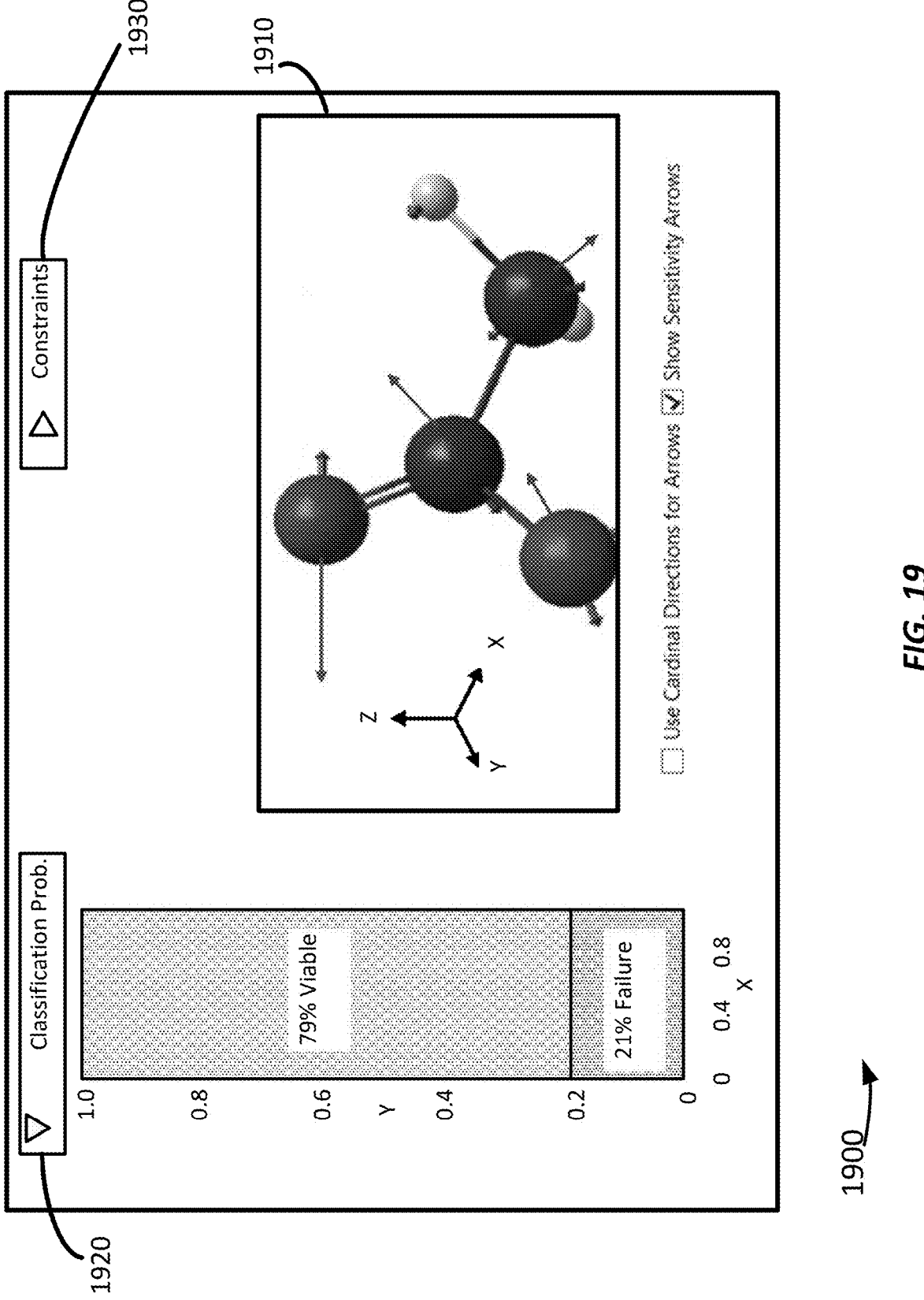
FIG. 19 illustrates a shape profiler for a three-dimensional shape according to at least one embodiment of the present technology.

FIG. 19 illustrates a graphical user interface 1900 of a shape profiler for a three-dimensional shape. Shapes can relate to simulated objects for a simulated environment. For instance, the viewer 1910 of graphical user interface 1900 shows a simulated molecule for a simulated environment. A computing system can receive a manipulation in the viewer 1910 to change the simulated object or the simulated environment. For instance, the manipulation can move an atom of the molecule, change a bond, or change a space around the molecule (e.g., changing the pressure of the environment). A response classifies an outcome for the molecule based on its shape (e.g., whether the molecule is viable or a failure for a particular science purpose such as a molecular switch or molecular identifier). Responses are shown for the particular molecule shape in classification probability viewer 1920. Shape viewer 1910 shows sensitivity arrows originating from center points of the atoms. The sensitivity arrows indicate changes to the molecule shape that would increase viability (blue) or increase odds of failure (red). A computing system can store position information for the center points by storing coordinate sets representing each center in at least three dimensions of the reference system (e.g., a coordinate system of x, y and z). Other colors beyond the predictor indicators could be used in shape viewer 1910 to visually distinguish aspects of the object (e.g., different colors for different atom types of the molecule).

Constraints control 1930 allows constraints for the simulated environment (e.g., a limit to how much an atom of the molecule can move within the coordinate system). These constraints can be accounted for in the prediction indicators (e.g., altering the direction of sensitivity arrows).

In embodiments, one or more responses are continuous responses indicating a value within a range of potential responses. For instance, a response can indicate a shape of the at least two dimensions by quantifying a property of an object along a range based on the shape.

FIGS. 20A-20E illustrate continuous response options for a graphical user interface 2000 for a shape profiler. In this example, a three-dimensional shape is represented in viewer 2010. The three-dimensional shape is related to an eyeglass product merely as an example, but could be related to other three-dimensional objects. The computing system can display selected points in viewer 2010. For instance, point 2012 is shown with a labeled value of "5". Points in viewer 2012 could be labeled in response to a mapping and toggled on and off by a user for further study or could be selected in response to a user manipulation of the viewer 2010.

Response types are displayed also in graphical user interface 2000. These responses can be dependent on a shape in viewer 2010. For instance, ductility response type 2002, resilience response type 2004, and elasticity response type 2006 can all be dependent on the overall shape of the eyeglass product. Various settings can be selected for each response type such as showing prediction indicators to increase or decrease within a range. For instance, the user can select a response type 2006 and an elasticity value 2008 shows in graphical user interface 2000. In this example, the continuous response shows a single continuous value displayed of the current response based on the current shape in viewer 2010.

Figure 20A:
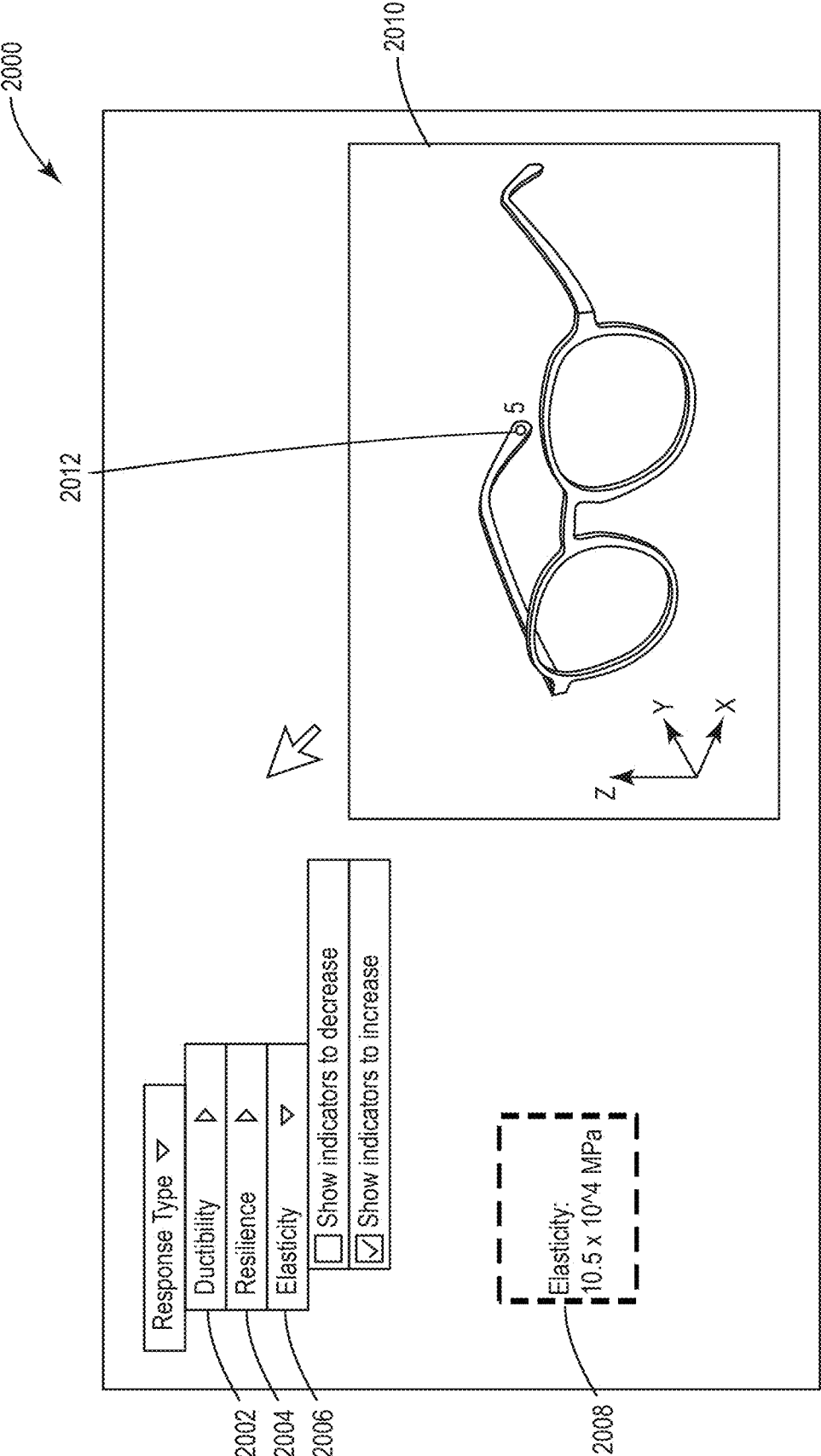
FIGS. 20A-20E illustrate continuous response options for a shape profiler according to at least one embodiment of the present technology.

The user can further select a particular setting for the viewer 2010 (e.g., to show sensitivity arrows to increase the response). For instance, FIG. 20A shows selecting "show indicators to increase" with respect to elasticity output. FIG.

Figures 20B, 20C, 20D, 20E:
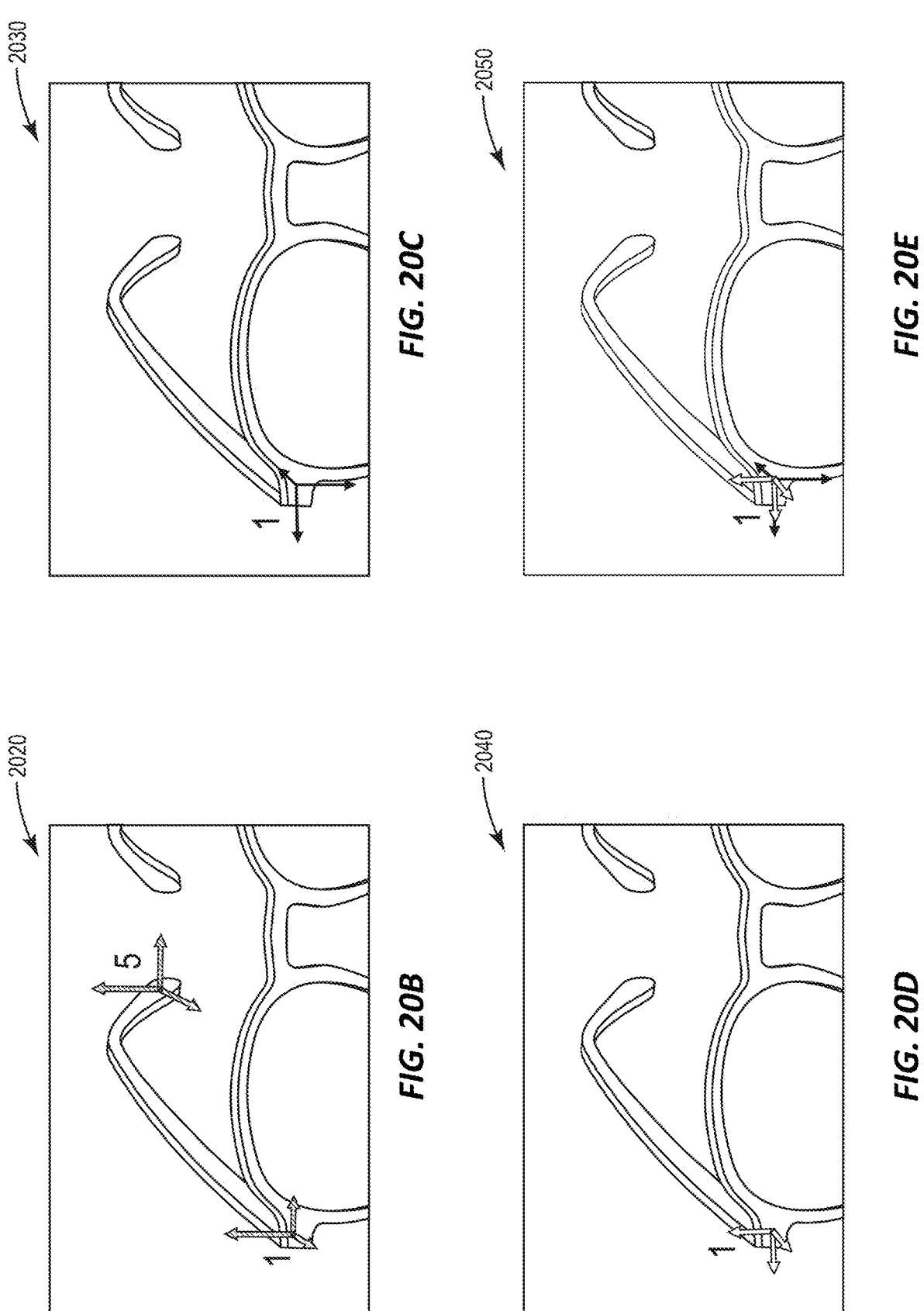

20B shows a first view 2020 for viewer 2010 after selecting points and requesting sensitivity arrows to increase the elasticity value for selected points. At each identified shape point, arrows are shown indicating the extent and direction to change the dimensions of the eyeglass product to increase the elasticity. Predictive indicators could be displayed as sensitivity arrows. Alternatively, or additionally, additional prediction indicators could be shown (e.g., to also indicate decreasing elasticity or showing different response types). For instance, FIG. 20C shows a second view 2030 for viewer 2010 after unselecting a point 2012 and selecting a ductility response type 2002 in FIG. 20A. FIG. 20D shows a third view 2040 for viewer 2010 after selecting resilience response type 2004. FIG. 20E shows a fourth view 2050 for viewer 2010 with multiple responses shown (e.g., a ductility response type 2002 and resilience response type 2004). The user can select within viewer 2010 on FIG. 20A different response type for displaying prediction indicators. A user can also select and move within the viewer 2010 the points on the shape of the eyeglasses to see how this would affect continuous responses. A computing system can display categorical and continuous responses and/or prediction indicators (e.g., also displaying categorization of the style of the glasses).

Figures 21A, 21B, 21C, 21D:
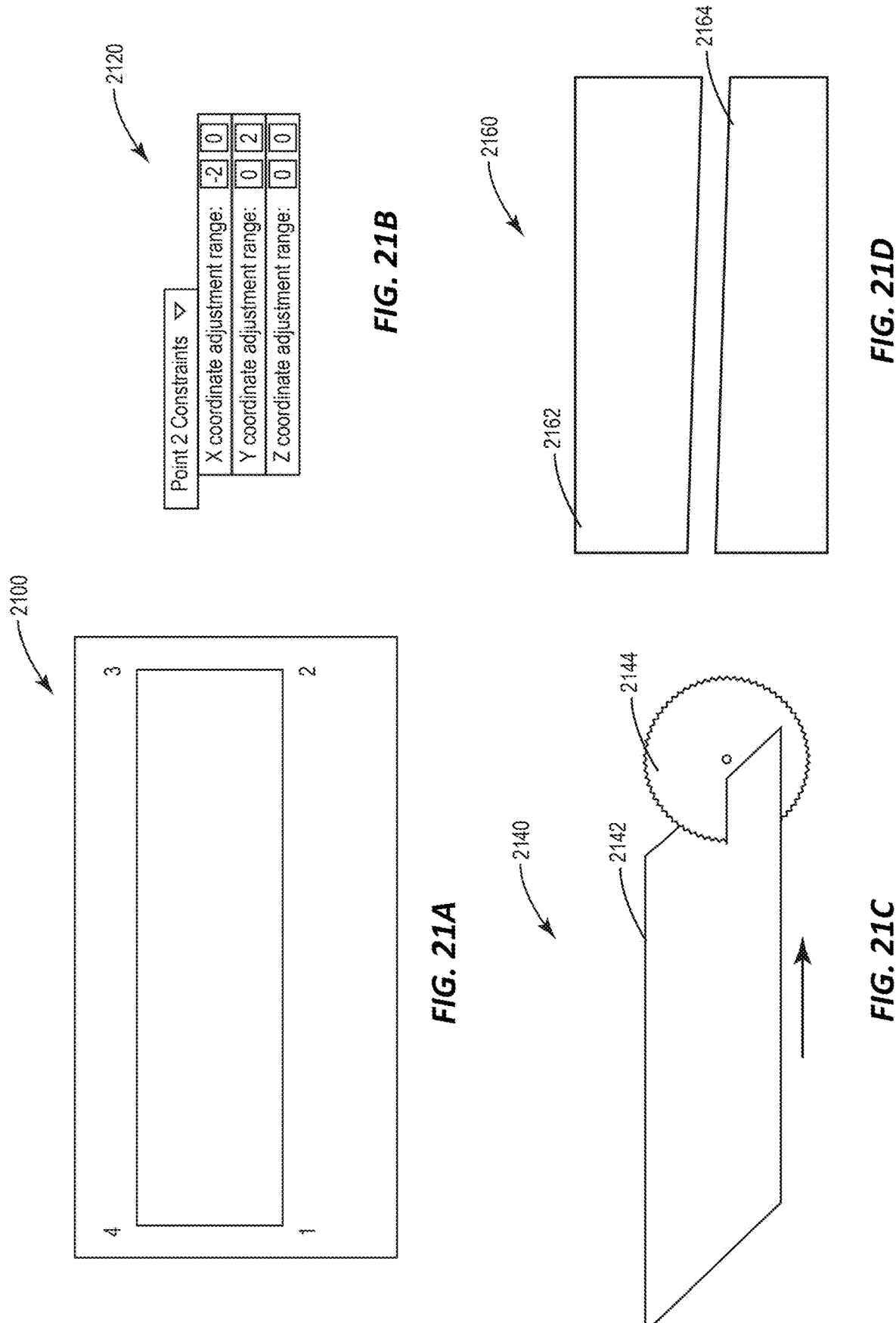
FIGS. 21A-21E illustrate prediction indicator constraints for a shape profiler in a manufacturing environment according to at least one embodiment of the present technology.

When analyzing real-world objects, it can be useful to account for real-world constraints. FIGS. 21A-21E illustrate prediction indicators constraints for a shape profiler in a manufacturing environment. In this example, FIG. 21A shows a template 2100 defining four corners of board cut in a manufacturing environment. FIG. 21B shows constraint options 2120 for prediction indicators. These constraints options can be per coordinate set identified in the template. For instance, the size of the board at point 2 in this example cannot grow, the size can only be reduced in the x and y coordinate, so ranges are specified for those adjustments in constraint options 2120. In this example, the constraints specify no adjustment to changing the height of the board in the z direction, but in other example constraints could allow adjustment in a z direction.

FIG. 21C shows the manufacturing environment 2140 in which a saw 2144 is cutting a board 2142 into two different pieces. A computing system can use image devices (e.g., cameras) to observe the cut pieces. For instance, FIG. 21D shows a top-level view 2160 of the board pieces 2162 and 2164. As shown, the board 2142, through manufacturing error, is not cut properly into intended rectangles by the saw 2144. Embodiments allow inquiry into whether the boards 2162 and 2164 can be salvaged accounting for constraints (e.g., using additional cuts).

Figure 21E:
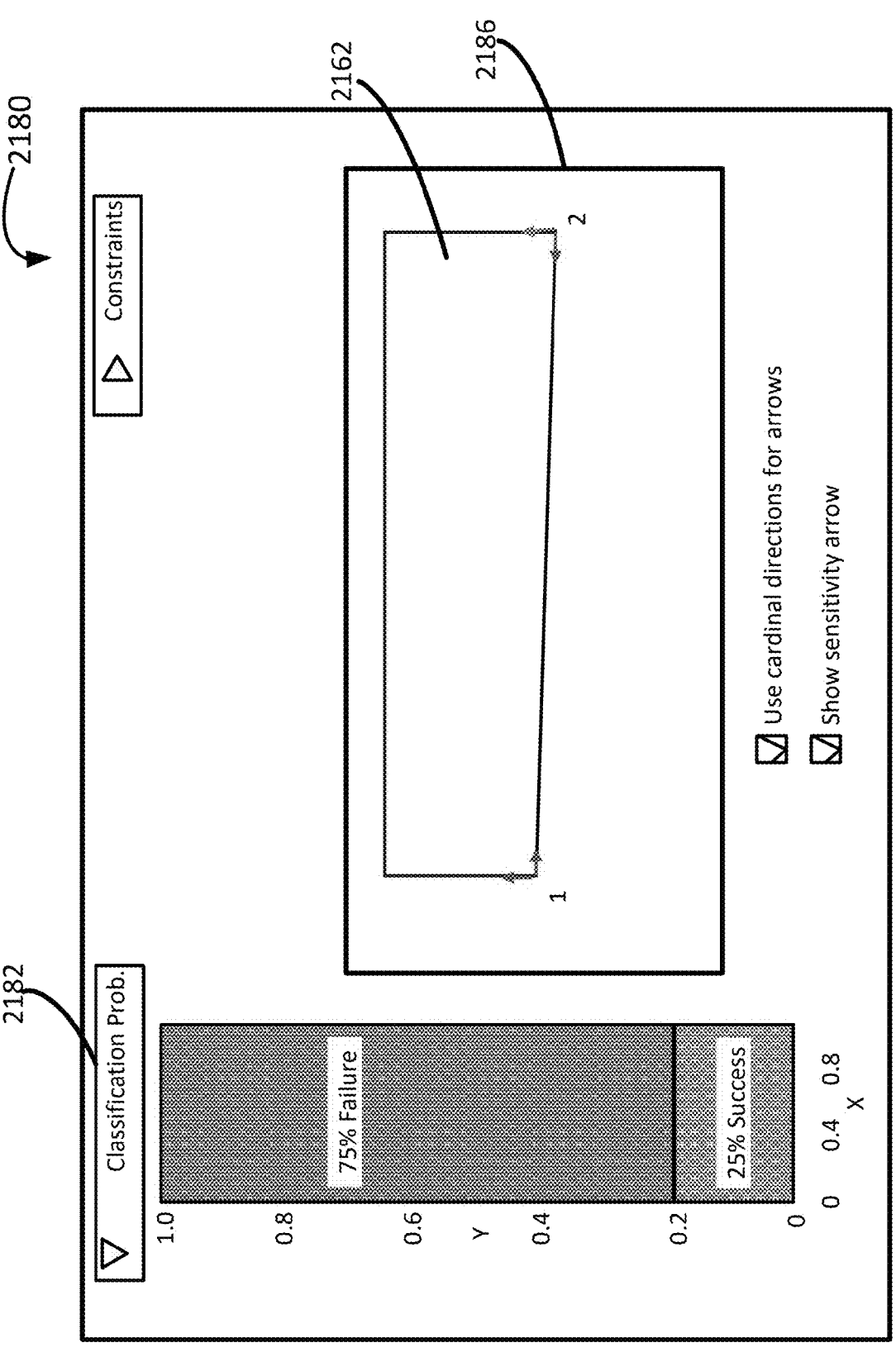

FIG. 21E shows a graphical user interface 2180 for analyzing the shape of board 2162 of FIG. 21D. Viewer 2186 shows the board 2162 with prediction indicators accounting for constraints defined in constraints options 2120 of FIG. 21B at shape points identified according to a template in FIG. 21A. Arrows in viewer 2186 predict change to a response given changes in coordinate sets for the edges of the board accounting for constraints. Due to constraints in FIG. 21B, viewer 2186 only shows arrows for adjustments to board edges that would reduce the size of the board rather than expand the board 2162. Received constraints could limit manipulation of position information for a shape (e.g., points on a board's edges). As shown in viewer 2186, only one adjustment to a point labeled "2" would result in successful use of the board 2162, whereas cuts that would change other points would increase a likelihood of failure for the board 2162. Accordingly, classification probability 2182 shows a likelihood of failure for this board of 75%.

Viewer 2162 is interactive and would allow movement of point labeled "2" up to increase the likelihood of success for the board and cuts could be made inline with the changed shape of the board.

Shape analysis can be particularly helpful in situations where components need to fit together, so individual size tolerances may not be enough to predict whether components will be successful. Instead, the overall shape has more meaning.

Embodiments described herein could have applications for other manufacturing uses such as settings of a 3D printer to inform the quality of a printed object where the shape may be one of the quality metrics of interest. Adding additional factors described herein like time or indexing variables can also be helpful for managing multiple images or shapes, such as found in additive manufacturing. FIG. 21A could be a target shape included as a reference point. This would allow users to assess the ways in which shapes may vary over a process, such as in additive manufacturing. It also helps with visualizing variations in principal components.

As shown, embodiments described herein provide useful applications for many industries including biology, animal conservation, biomedical applications, manufacturing, and image processing. Embodiments are useful for predictive or multivariate models, especially ones that take shape as an input to the model.

What is claimed is:

1. A computer-program product comprising a non-transitory machine-readable storage medium having instructions embodied therewith, the instructions operable to cause a computing system to:

display, in a graphical user interface, a graphical representation of position information, wherein the position information defines a first representation of a shape of at least two dimensions, and wherein the first representation comprises a first coordinate set describing at least one feature of the shape in the at least two dimensions;

obtain a computer model that predicts an initial response according to the first representation input to the computer model, wherein the initial response indicates a likelihood of classifying the shape according to multiple response outcomes;

display, in the graphical user interface, in proximity to the first coordinate set of the first representation, a prediction indicator predicting an extent of change to the likelihood of classifying the shape given changes in the first coordinate set;

receive, via the graphical user interface, a manipulation of the graphical representation that changes the position information to define a second representation of the shape of the at least two dimensions; and generate an updated response according to the second representation input to the computer model.

2. The computer-program product of claim 1, wherein the initial response and the updated response for the computer model both indicate responses of the computer model for the shape of the at least two dimensions; and wherein the initial response and the updated response are different responses.

3. The computer-program product of claim 1, wherein the prediction indicator is a sensitivity indicator that predicts, based on a size, direction, or both of the sensitivity indicator displayed in the graphical user interface, the extent of change to the likelihood of classifying the shape.

4. The computer-program product of claim 1, wherein the graphical user interface displays the multiple response outcomes; and wherein the instructions are operable to further cause the computing system to display, in the graphical user interface, in proximity to the first coordinate set of the first representation, multiple prediction indicators with at least one predictor indicator predicting a respective extent of change to the likelihood of classifying the shape for each of the multiple response outcomes, wherein the multiple prediction indicators comprise the prediction indicator.

5. The computer-program product of claim 4, wherein the instructions are operable to further cause the computing system to:

receive a selection of a subset of the multiple response outcomes; and display, in proximity to the first coordinate set of the first representation, only prediction indicators of the multiple prediction indicators that correspond to the selection of the subset of the multiple response outcomes.

6. The computer-program product of claim 1, wherein the initial response is a categorical response type with at least two categories for the multiple response outcomes; and wherein the instructions are operable to further cause the computing system to display, in the graphical user interface, in proximity to the first coordinate set of the first representation, multiple prediction indicators with at least one predictor indicator for each of the at least two categories, wherein the multiple prediction indicators comprise the prediction indicator.

7. The computer-program product of claim 1, wherein the first coordinate set comprises a value for each dimension of the shape; and wherein the instructions are operable to further cause the computing system to display, in the graphical user interface, in proximity to the first coordinate set of the first representation, multiple prediction indicators with at least one predictor indicator for changes to each value of the first coordinate set, wherein the multiple prediction indicators comprise the prediction indicator.

8. The computer-program product of claim 1, wherein the graphical representation depicts unique positions within the graphical representation based on the position information; and wherein the instructions are operable to further cause the computing system to receive the manipulation by receiving an indication to move one or more of the unique positions within the graphical representation.

9. The computer-program product of claim 1, wherein the graphical representation depicts unique positions within the graphical representation based on the position information; and wherein the instructions are operable to further cause the computing system to receive the manipulation by receiving an indication to move a set of the unique positions within the graphical representation.

10. The computer-program product of claim 1, wherein the first representation comprises a second coordinate set describing another feature of the shape; and wherein the instructions are operable to further cause the computing system to:

receive the manipulation of the graphical representation by receiving an indication to change one or more coordinates in the first coordinate set to a user-defined coordinate set;

responsive to the manipulation of the graphical representation:

generate one or more coordinates updating the second coordinate set to a computer-generated coordinate set; and generate the updated response according to the computer model, the user-defined coordinate set, and the computer-generated coordinate set.

11. The computer-program product of claim 10, wherein the instructions are operable to further cause the computing system to receive the manipulation of the graphical representation by:

receiving an indication to change the initial response to the updated response; and generating a computer-generated manipulation of the graphical representation to achieve the updated response.

12. The computer-program product of claim 1, wherein the initial response is a categorical response type; and wherein the initial response indicates a classification of the shape by assessing a likelihood of the shape being a particular one of multiple object categories; and wherein the instructions are operable to further cause the computing system to generate the updated response by changing the classification of the shape into a different one of the multiple object categories.

13. The computer-program product of claim 1, wherein the initial response is a continuous response type; and wherein the initial response indicates the shape of the at least two dimensions by:

quantifying a property of an object along a range based on the shape; and generating a likelihood of an outcome for a continuous response type.

14. The computer-program product of claim 1, wherein the instructions are operable to further cause the computing system to obtain the computer model by training the computer model on multiple objects preclassified into object categories; and wherein the shape of the at least two dimensions is for an object that is not a member of the multiple objects.

15. The computer-program product of claim 1, wherein the instructions are operable to further cause the computing system to:

receive an indication to display the initial response or the updated response in proximity to the graphical representation; and display, based on the indication, the initial response or the updated response in proximity to the graphical representation.

16. The computer-program product of claim 1, wherein the instructions are operable to further cause the computing system to display the first representation in the graphical user interface by:

obtaining a detected object;

applying an outline to the detected object;

generating coordinate sets for several points along the outline, or synthesized from the several points along the outline, wherein each coordinate set defines a position for a respective point along the outline within the at least two dimensions; and displaying one or more of the coordinate sets in the graphical representation.

17. The computer-program product of claim 1, wherein the instructions are operable to further cause the computing system to display the first representation in the graphical user interface by:

obtaining a detected object;

determining representative coordinate sets for the detected object according to an object template defining landmark features for detected objects; and displaying one or more of the representative coordinate sets in the graphical representation.

18. The computer-program product of claim 1, wherein the shape of the at least two dimensions is generated from an image of a detected object in a real-world environment;

wherein the instructions are operable to further cause the computing system to display, in the graphical user interface, the first representation of the shape of the at least two dimensions by aligning the shape of the at least two dimensions to a reference frame for the graphical representation; and wherein aligning the shape to the reference frame for the graphical representation comprises one or more of:

reducing translation variation in the shape;

rotating the shape; and scaling the shape.

19. The computer-program product of claim 1, wherein the shape of the at least two dimensions is generated from a simulated object in a simulated environment; and wherein the instructions are operable to further cause the computing system to receive the manipulation of the graphical representation according to a change for the simulated object or the simulated environment.

20. The computer-program product of claim 1, wherein the computer model predicts the initial response according to the first representation and at least one other factor other than the shape of the at least two dimensions; and wherein instructions are operable to further cause the computing system to generate the updated response according to the computer model, the manipulation of the graphical representation and an indication to change one or more of the at least one other factor.

21. The computer-program product of claim 1, wherein the shape of the at least two dimensions has at least three dimensions;

wherein the position information defines the first representation by comprising the first coordinate set describing the at least one feature of the shape in the at least three dimensions;

wherein the graphical representation represents the first coordinate set; and wherein the instructions are operable to further cause the computing system to:

receive constraints related to limits for changes to the position information; and display, in the graphical user interface, in proximity to the first coordinate set of the graphical representation, the prediction indicator predicting the extent of change to the likelihood of classifying the shape given the changes in the first coordinate set accounting for the constraints.

22. The computer-program product of claim 1, wherein the graphical user interface is an interactive graphical user interface comprising a shape profiler;

wherein the shape profiler comprises the graphical representation in proximity to a response viewer; and wherein the instructions are operable to further cause the computing system to generate the updated response by causing the response viewer to change a display of the initial response to the updated response in the interactive graphical user interface.

23. A computer-implemented method comprising:

displaying, in a graphical user interface, a graphical representation of position information, wherein the position information defines a first representation of a shape of at least two dimensions, and wherein the first representation comprises a first coordinate set describing at least one feature of the shape in the at least two dimensions;

obtaining a computer model that predicts an initial response according to the first representation input to the computer model, wherein the initial response indicates a likelihood of classifying the shape according to multiple response outcomes;

displaying, in the graphical user interface, in proximity to the first coordinate set of the first representation, a prediction indicator predicting an extent of change to the likelihood of classifying the shape given changes in the first coordinate set;

receiving, via the graphical user interface, a manipulation of the graphical representation that changes the position information to define a second representation of the shape of the at least two dimensions; and generating an updated response according to the second representation input to the computer model.

24. The computer-implemented method of claim 23, wherein the initial response is a categorical response type with at least two categories for the multiple response outcomes; and wherein the computer-implemented method further comprises displaying, in the graphical user interface, in proximity to the first coordinate set of the first representation, multiple prediction indicators with at least one predictor indicator for each of the at least two categories, wherein the multiple prediction indicators comprise the prediction indicator.

25. The computer-implemented method of 23, wherein the first coordinate set comprises a value for each dimension of the shape; and wherein the computer-implemented method further comprises displaying, in the graphical user interface, in proximity to the first coordinate set of the first representation, multiple prediction indicators with at least one predictor indicator for changes to each value of the first coordinate set, wherein the multiple prediction indicators comprise the prediction indicator.

26. The computer-implemented method of 23, wherein the graphical user interface displays the multiple response outcomes; and wherein the computer-implemented method further comprises displaying in the graphical user interface, in proximity to the first coordinate set of the first representation, multiple prediction indicators with at least one predictor indicator predicting a respective extent of change to the likelihood of classifying the shape for each of the multiple response outcomes, wherein the multiple prediction indicators comprise the prediction indicator.

27. The computer-implemented method of 23, wherein the graphical representation depicts unique positions within the graphical representation based on the position information; and wherein the computer-implemented method further comprises receiving the manipulation by receiving an indication to move one or more of the unique positions within the graphical representation.

28. A computing device comprising processor and memory, the memory containing instructions executable by the processor wherein the computing device is configured to:

display, in a graphical user interface, a graphical representation of position information, wherein the position information defines a first representation of a shape of at least two dimensions, and wherein the first representation comprises a first coordinate set describing at least one feature of the shape in the at least two dimensions;

obtain a computer model that predicts an initial response according to the first representation input to the computer model, wherein the initial response indicates a likelihood of classifying the shape according to multiple response outcomes;

display, in the graphical user interface, in proximity to the first coordinate set of the first representation, a prediction indicator predicting an extent of change to the likelihood of classifying the shape given changes in the first coordinate set;

receive, via the graphical user interface, a manipulation of the graphical representation that changes the position information to define a second representation of the shape of the at least two dimensions; and generate an updated response according to the second representation input to the computer model.

\* \* \* \* \*